United States Patent
Tang et al.

(10) Patent No.: US 10,585,534 B2
(45) Date of Patent: Mar. 10, 2020

(54) ULTRASONIC TOUCH FEATURE EXTRACTION

(71) Applicant: UltraSense Systems, Inc., Santa Clara, CA (US)

(72) Inventors: Hao-Yen Tang, San Jose, CA (US); Sina Akhbari, San Jose, CA (US); Mo Maghsoudnia, San Jose, CA (US); Man-Chia Chen, Palo Alto, CA (US)

(73) Assignee: UltraSense Systems, Inc., San Jose, CA (US)

( * ) Notice: Subject to any disclaimer, the term of this patent is extended or adjusted under 35 U.S.C. 154(b) by 0 days.

(21) Appl. No.: 16/417,184

(22) Filed: May 20, 2019

(65) Prior Publication Data
US 2019/0354209 A1 Nov. 21, 2019

Related U.S. Application Data

(63) Continuation-in-part of application No. 16/396,597, filed on Apr. 26, 2019, now Pat. No. 10,466,844.
(Continued)

(51) Int. Cl.
G06F 3/043 (2006.01)
G01S 15/50 (2006.01)

(52) U.S. Cl.
CPC ............. *G06F 3/043* (2013.01); *G01S 15/50* (2013.01)

(58) Field of Classification Search
CPC ..... G06F 3/0416; G06F 3/0436; B60K 37/06; B60K 2370/1446; H04M 1/026
See application file for complete search history.

(56) References Cited

U.S. PATENT DOCUMENTS

| | | |
|---|---|---|
| 4,412,544 A | 11/1983 | Beretsky et al. |
| 8,676,540 B1 | 3/2014 | Welch et al. |

(Continued)

FOREIGN PATENT DOCUMENTS

WO 2018077761 5/2018

OTHER PUBLICATIONS

U.S. Appl. No. 16/396,597, Notice of Allowance dated Jun. 17, 2019, 11 pages.
(Continued)

*Primary Examiner* — Ryan A Lubit
(74) *Attorney, Agent, or Firm* — Kilpatrick Townsend & Stockton LLP

(57) ABSTRACT

An ultrasound input device can be coupled to a material layer having an external surface located opposite the material layer from the ultrasound input device. The ultrasound input device can transmit an emitted signal through the material layer towards the external surface and receive a set of reflected ultrasound signals associated with the emitted signal. The set of reflected ultrasound signals comprises at least one reflected ultrasound signal, and the set of reflected ultrasound signals can be associated with a touch event between an object and the external surface. A system can comprise one or more data processors configured for performing operations including determining an energy signal associated with the set of reflected ultrasound signals, extracting feature information associated with the energy signal, determining an inference associated with the object based on the extracted feature information, and generating an output signal associated with the determined inference.

30 Claims, 40 Drawing Sheets

Related U.S. Application Data

(60) Provisional application No. 62/751,053, filed on Oct. 26, 2018, provisional application No. 62/725,697, filed on Aug. 31, 2018, provisional application No. 62/674,317, filed on May 21, 2018.

(56) References Cited

U.S. PATENT DOCUMENTS

| | | |
|---|---|---|
| 10,466,844 B1 | 11/2019 | Tang et al. |
| 2001/0000666 A1 | 5/2001 | Wood et al. |
| 2002/0005108 A1 | 1/2002 | Ludwig |
| 2003/0144814 A1 | 7/2003 | Hama et al. |
| 2003/0217873 A1 | 11/2003 | Paradiso et al. |
| 2003/0233233 A1 | 12/2003 | Hong |
| 2007/0260425 A1 | 11/2007 | Kim |
| 2008/0316184 A1 | 12/2008 | D'Souza |
| 2009/0157206 A1 | 6/2009 | Weinberg et al. |
| 2009/0224161 A1 | 9/2009 | Fritsch et al. |
| 2010/0117993 A1 | 5/2010 | Kent |
| 2010/0139991 A1 | 6/2010 | Philipp et al. |
| 2010/0258361 A1 | 10/2010 | Yamauchi et al. |
| 2011/0061464 A1 | 3/2011 | Yi-Min |
| 2012/0274609 A1 | 11/2012 | Sheng et al. |
| 2013/0345864 A1 | 12/2013 | Park |
| 2014/0022189 A1 | 1/2014 | Sheng et al. |
| 2014/0071095 A1 | 3/2014 | Godsill |
| 2015/0148674 A1 | 5/2015 | Park et al. |
| 2015/0169136 A1 | 6/2015 | Ganti et al. |
| 2016/0216794 A1 | 7/2016 | Yoon et al. |
| 2016/0246449 A1 | 8/2016 | Jarske |
| 2017/0110504 A1 | 4/2017 | Panchawagh et al. |
| 2017/0255338 A1* | 9/2017 | Medina ................. G06F 3/0416 |
| 2017/0322290 A1 | 11/2017 | Ng et al. |
| 2017/0336903 A1 | 11/2017 | Rivaud et al. |
| 2017/0336926 A1 | 11/2017 | Chaudhri et al. |
| 2018/0032161 A1* | 2/2018 | Shi ............................. G01S 5/22 |
| 2018/0032211 A1 | 2/2018 | King et al. |
| 2018/0039392 A1* | 2/2018 | Kim ...................... G06F 3/0414 |
| 2018/0164937 A1 | 6/2018 | Lynn et al. |
| 2018/0246612 A1* | 8/2018 | Lynn ..................... G06F 3/0416 |
| 2018/0276440 A1 | 9/2018 | Strohmann et al. |
| 2018/0284892 A1 | 10/2018 | Kwon et al. |
| 2018/0323783 A1 | 11/2018 | Bang et al. |
| 2019/0050618 A1* | 2/2019 | Khuri-Yakub ....... A61B 5/0816 |
| 2019/0074833 A1 | 3/2019 | Sheng et al. |
| 2019/0354210 A1 | 11/2019 | Akhbari et al. |
| 2019/0354237 A1 | 11/2019 | Tang et al. |
| 2019/0354238 A1 | 11/2019 | Akhbari et al. |

OTHER PUBLICATIONS

U.S. Appl. No. 16/418,180, Non-Final Office Action dated Jul. 12, 2019, 14 pages.

International Patent Application No. PCT/US2019/033366, Invitation to Pay Additional Fees and, Where Applicable, Protest Fee, Jul. 3, 2019, 2 pages.

U.S. Appl. No. 16/418,180, Final Office Action dated Nov. 1, 2019, 13 pages.

U.S. Appl. No. 16/418,410, Non-Final Office Action dated Aug. 26, 2019, 15 pages.

International Application No. PCT/US2019/033366, International Search Report and Written Opinion dated Sep. 13, 2019, 17 pages.

U.S. Appl. No. 16/418,410, Final Office Action dated Dec. 10, 2019, 17 pages.

U.S. Appl. No. 16/570,995, Non-Final Office Action dated Dec. 3, 2019, 21 pages.

* cited by examiner

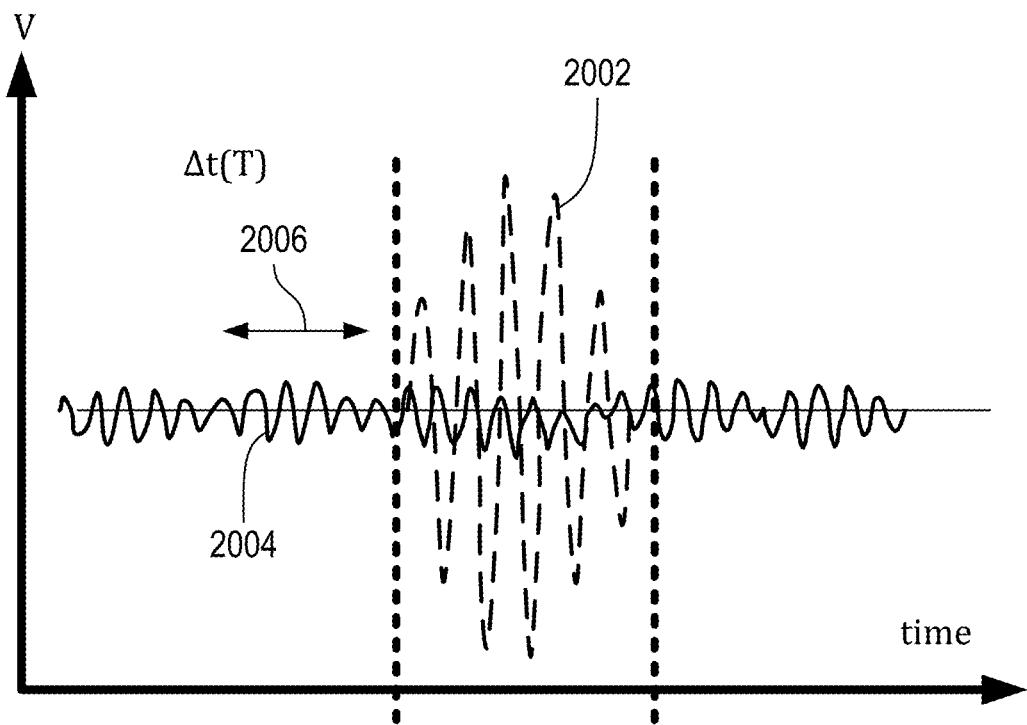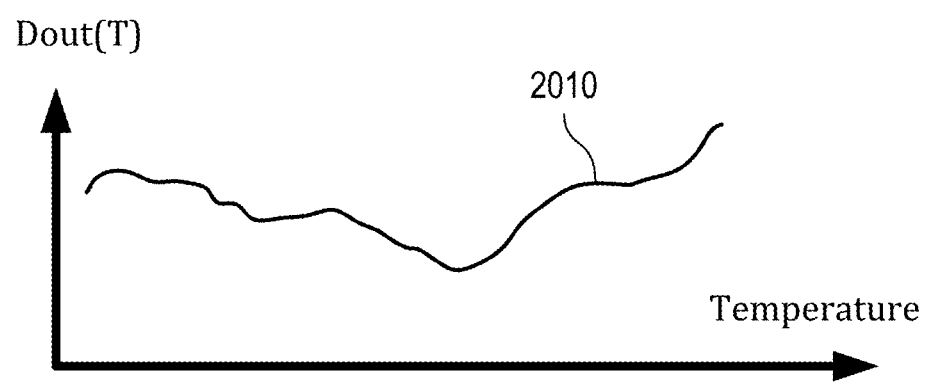
FIG. 20

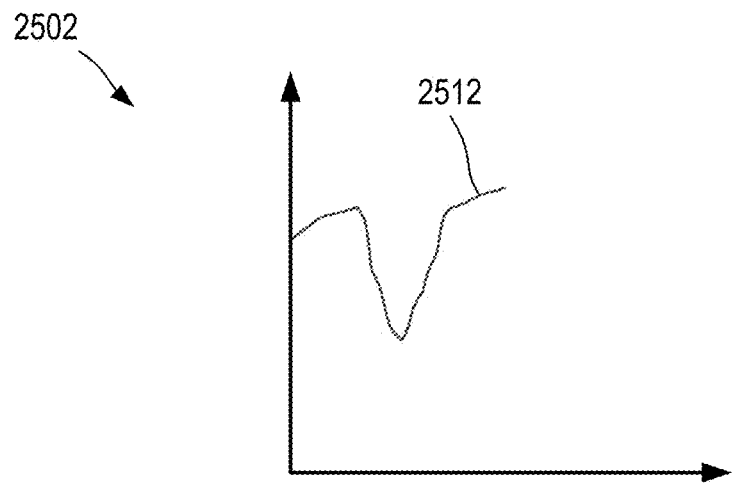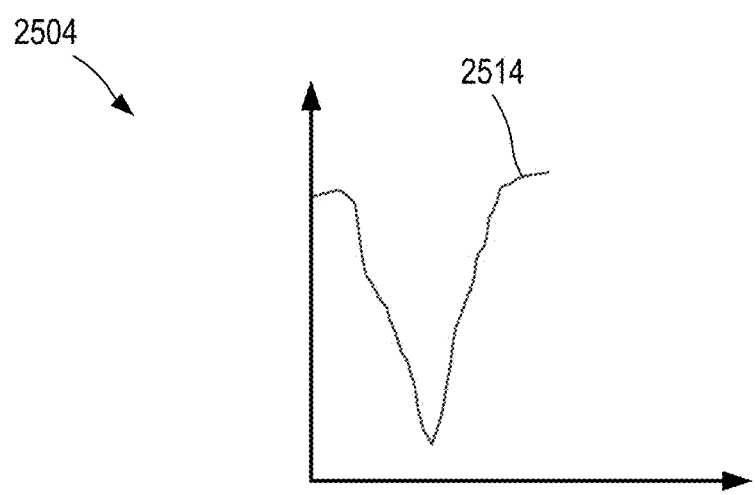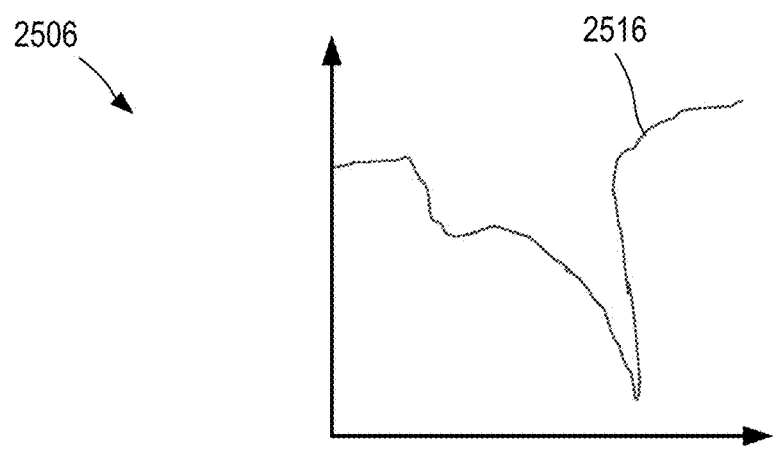
FIG. 25

Material Detection
Normal finger
Plastic glove
(sticky)
FIG. 38

ULTRASONIC TOUCH FEATURE EXTRACTION

CROSS-REFERENCES TO RELATED APPLICATIONS

The present application is a non-provisional of and claims the benefit of U.S. Patent Application No. 62/674,317 filed May 21, 2018 and entitled "ULTRASONIC TOUCH AND FORCE INPUT DETECTION," and U.S. Patent Application No. 62/725,697 filed Aug. 31, 2018 and entitled "ULTRASONIC TOUCH AND FORCE INPUT DETECTION," and U.S. Patent Application No. 62/751,053 filed Oct. 26, 2018 and entitled "ULTRASONIC TOUCH FEATURE EXTRACTION," and is a continuation-in-part of U.S. patent application Ser. No. 16/396,597, filed on Apr. 26, 2019 which are all hereby incorporated by reference in their entirety.

BACKGROUND

Capacitive, resistive and inductive sensing are used in industrial, automotive, medical, and consumer applications to detect touch inputs. The use of capacitive technology to detect a touch input has grown rapidly in human interface devices (HID), such as track-pads and touch-screens. Consumer and industrial applications are beginning to adopt touch-buttons and sliders using capacitive technology in devices such as mobile phones, TV controls, automotive dashboards, remote controls, or industrial controls. Capacitive sensing has proven to be much more appealing than mechanical switches and rotary encoders, both in terms of looks and reliability.

However, the use of capacitive, resistive, or inductive sensing limits creative industrial designs due to challenges in touch input layout and system stack up. Conflicting priorities between design and robustness further complicates the design. It is also to be noted that present input touch sensing methodologies cannot be implemented on metal surfaces. In addition, current sensing technologies has inherent properties that limit water-proof applications. Pressure sensing technologies using strain gauges have emerged as alternative sensing technologies for metal surface touch input. However, the measurement of deflection and strain is often unreliable, specifically in metals. Additional sensing layers (e.g., capacitive) are required to detect an x-y position of an input touch detected using a strain gauge. Increased complexity in touch input interface materials, the implications of complex interfaces on industrial designs, water-proofing, and cost have been key challenges limiting the use of touch-inputs in any environment and in with any material. There is a need for improved systems and methods of detecting touch inputs to human machine interfaces (HMI).

Embodiments of the invention address these and other problems, individually and collectively.

BRIEF SUMMARY

Embodiments of the invention are directed to a system, methods, and apparatuses relating to ultrasonic touch feature extraction. A system can include an ultrasound input device as well as one or more data processors.

The ultrasound input device can be coupled to a material layer which can have an external surface. The external surface can be located opposite of the material layer from the ultrasound input device. The ultrasound input device can be coupled to the material layer to transmit an emitted signal through the material layer towards the external surface as well as receive a set of reflected ultrasound signals associated with the emitted signal. The set of reflected ultrasound signals can include at least one reflected ultrasound signal and can be associated with a touch event between an object and the external surface of the material layer. The touch event can include, for example, an individual touching the external surface with their finger or other object (e.g., a stylus, etc.).

The one or more data processors can be configured to determine an energy signal associated with the set of reflected ultrasound signals and extract feature information associated with the energy signal. The one or more data processor can also be configured to determine an inference associated with the object based on the extracted feature information and then generate an output signal associated with the determined inference.

According to some embodiments, a computer-implemented method is provided. An emitted signal can be transmit using an ultrasound input device coupled to a material layer having an external surface. A set of reflected ultrasound signals can be received. The set of reflected ultrasound signals can be associated with the emitted signal and can include at least one reflected ultrasound signal. The set of reflected ultrasound signals can be associated with a touch event between an object and the external surface of the material layer. An energy signal associated with the set of reflected ultrasound signals can be determined. Feature information associated with the energy signal can then be extracted. Then, an inference can be determined. The inference can be associated with the object based on the extracted feature information. An output signal associated with the determined inference can then be generated.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION

FIG. 20 is a set of charts depicting temperature dependence of reflected ultrasonic signals according to certain aspects of the present disclosure.

FIG. 25 is a set of three charts depicting example signals received by an ultrasound input system attributable to three different users according to certain aspects of the present disclosure.

FIG. 38 is a set of charts depicting the energy measurement signals of an ultrasound input device demonstrating material detection according to certain aspects of the present disclosure.

DETAILED DESCRIPTION

Figure 1:
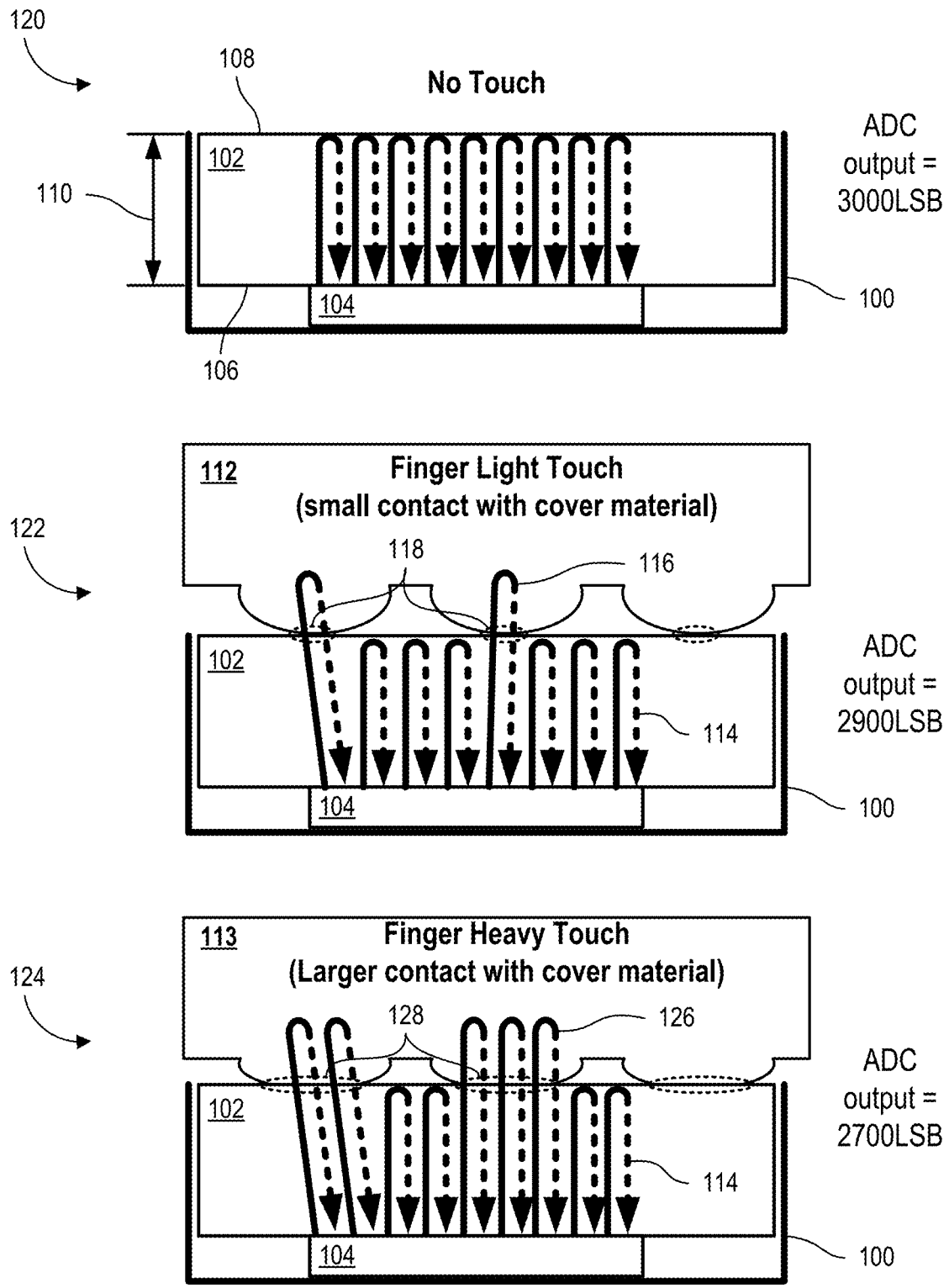
FIG. 1 is a schematic diagram depicting the effect of touch force on the reflected ultrasound signals in an ultrasound input system according to certain aspects of the present disclosure.

A touch input solution is provided for improving detection of touch inputs in HMIs. An ultrasound input device can detect the presence of an object on any surface with a sensor positioned on the reverse side of the surface material. The ultrasound input device enables creative designs without disruption of product skin or design material. Such an ultrasound input device can be implemented in various devices, e.g., input touch buttons, sliders, wheels, etc. The ultrasound input device can be deployed under surfaces comprising a variety of materials simplifying industrial designs and appearance. Furthermore, a grid of the ultrasound input device buttons can be implemented to create key pad, mouse pad, or touch input on any surface anywhere. An ultrasound input device allows touch input deployment of an HMI on surfaces comprising wood, leather, glass, plastic, metal (e.g., aluminum or steel), ceramic, plastic, a combination of one or more materials, etc.

A touch input device implemented using an ultrasound input device can detect a touch input associated with a specific material. For example, an ultrasound input device can distinguish between a touch input from a glove and a touch input from a finger (each having a different reflection/transmission of the ultrasound when touching the material) and thus be configured for only glove triggering. This type of input touch control is ideal for medical devices. A touch input button implemented using an ultrasound input device can be easily implemented on aluminum, glass, titanium, and ceramic surfaces, replacing mechanical smartphone buttons.

An ultrasound input device provides an improvement to the aesthetic features and reliability of touch input detection over capacitive and mechanical devices. A button can be implemented on a surface by defining the button area on a touch surface. An ultrasound input device can be embedded/placed behind the surface and thus limits environmental exposure including dust and moist. An ultrasound input device can increase flexibility of button programmability options. For example, a user can define the functionality of the button through a system controller. In some embodiments, the system controller can monitor user behaviors to improve machine/system preferences and performance. An ultrasound input device mechanically coupled to a surface but positioned away from view, such as underneath or behind an opaque surface, can be used to provide a hidden input not discernable or not easily discoverable to those who do not already know its location. An ultrasound input device can be low powered and battery powered, such as to operate for extended periods of time without requiring direct connection to a mains power source. An ultrasound input device can be or be incorporated into an internet of things (IOT) device capable of providing sensor data (e.g., a button press) to other devices on a local or remote network.

Multiple touch input detection (e.g., number of taps on the buttons or hold or swipe to different directions) can be used to increase the functionality of a single input device. In some embodiments, an ultrasound input device can also enable detection of specific objects as a source of a touch input. For example, an ultrasound input device can be configured to activate the button based on material characteristics of the object. Furthermore, an ultrasound input device allows for monitoring of the touch input. For example, a vehicle using one or more ultrasound input devices can monitor a hands-on steering wheel requirement when auto-pilot is disengaged.

The analog and digital circuits necessary to operate the ultrasonic touch input can be integrated with the ultrasound transducers. This integration allows for achieving very small chip height (e.g., less than 0.5 mm) and foot print (e.g., less than 1 $mm^2$) and enables input touch detection in tight spaces. In some embodiments, the output from the chip can be based on Inter-Integrated Circuit ($I^2C$). This on-chip processing can eliminate the need for separate analog chips for ultrasonic sensor signal amplification and analog to digital conversion. The ultrasonic touch input sensor can process and output a signal indicating a touch input independent from a main microcontroller or any other board component in the system in which the sensor is installed.

Embodiments can allow for a device to extract feature information associated with an energy signal determined from a received set of reflected ultrasound signals. The feature information can include suitable information regarding the touch event. Extracting the feature information can include identifying patterns in the energy signal. For example, the touch input from the glove and the touch input from the finger can affect the determined energy signal. The energy signal can be associated with a dip in energy measurements. In some embodiments, extracting the feature information can include identifying a depth of the dip, a duration of the dip, a presence of a subsequent dip after the dip, a delay between the dip and another dip, and/or a velocity of change in the energy signal at an edge of the dip. Further, identifying the pattern can include identifying changes in the energy signal attributable to temperature shifts.

In some cases an ultrasound input device can be capable of using the feature information to determine a style of touch (e.g., tap, double tap, place and press, etc.) of the touch event, a touch intensity, or a physical characteristic (e.g., a portion of a fingerprint, etc.) of the object.

I. Device Overview

Embodiments of the invention are directed to an ultrasound input device to detect touch inputs. Specifically, embodiments are directed to an ultrasound input device comprising a transducer coupled to a material layer that provides a surface to receive touch input signals to a system. The ultrasound input device can be implemented using a variety of material layers including wood, leather, glass, plastic, metal (e.g., aluminum, steel, or others), stone, concrete, paper, polymers, biological materials (e.g., tissues, such as skin), a combination of one or more materials, etc. The flexibility of material selection enables the use of an ultrasound input device in a variety of applications including front and side buttons of a mobile device; a steering wheel, infotainment unit, center console controls, mirrors, seats, door handles, windows, etc. of a vehicle; internet-of-things devices; medical devices such as bed controls, blood pressure measurement devices; input detection for robotics such as touch sensing for robotic fingers; and hidden input devices such as hidden within furniture or behind walls.

A. Detecting a Touch Input Using Ultrasonic Signals

FIG. 1 is a schematic diagram depicting the effect of touch on the reflected ultrasound signals in an ultrasound input device according to certain aspects of the present disclosure. The ultrasound input device 100 (also referred to as a touch sensor) can include a transducer 104 coupled to a material layer 102. The material layer 102 has a first (interior) surface 106 and a second (exterior) surface 108. The material layer can be characterized by a distance 110 between the first surface 106 and the second surface 108. The material layer 102 can be a cover material of a larger device that integrates an ultrasound input device. In some embodiments, the material layer 102 can form a body or a portion of the body of a device. In these embodiments, the first surface 106 can form an interior surface of the body and the second surface 108 can form the exterior surface of the body. Second surface 108 can be considered exterior as it is exposed to the environment. First surface 106 can be considered interior in that it is not the surface that contact is to be detected or in that it is the surface where the transducer 104 is acoustically coupled to the material layer 102. FIG. 1 shows the ultrasound input device with no touch 120, the ultrasound input device with a light touch 122, and the ultrasound input device with a heavy touch 124.

This touch sensor is triggered based on material acoustic properties of touch surface (material layer 102) and the input object 112. Detection of the light touch 122 is dependent on extent of reflected ultrasonic signals 114 in the material layer 102 versus absorbed ultrasonic signals 116 transmitted through the second surface 108 of the material layer 102 into the input object 112. As used herein, a reflected ultrasonic signal (e.g., reflected ultrasonic signals 114) can refer to a signal that has reflected off the second surface 108 of the material layer 102, and an absorbed ultrasonic signal (e.g., absorbed ultrasonic signals 116) can refer to a signal of which at least a portion of the signal has been absorbed by an input object 112 (e.g., a finger) contacting the second surface 108 of the material layer 102. The contact (e.g., based on pressure) of the input object 112 on the touch surface defines one or more contact areas 118 and an amount of reflection. Thresholds can be set based on the contact area 118 of touch for triggering the button and impedance difference between input object 112 and material layer 102.

The size of the contact areas 118 and space between the contact areas 118 can be indicative of the size and spacing of the finger's ridges, as well as the size and spacing of the valleys of the finger's fingerprint. Certain changes in the size and/or spacing between contact areas 118 can be indicative of different fingers contacting the material layer 102. For example a young individual may have smaller valleys (e.g., a smaller distance between contact areas 118) than an older individual. In some cases, the detected size and/or spacing between contact areas 118 can be used to detect or make an inference as to the user contacting the material layer 102. Such an inference can be used to apply customizations (e.g., have a touch event result in different actions for different users or have different sensing thresholds for different users), test for permissions (e.g., allow an action only if a recognized user is initiating the touch event), or perform other rule-based actions using the inference.

The heavy touch 124 can be distinguished from the light touch 122 by determining that fewer reflected signals or fewer non-attenuated signal are received by the transducer 104 due to an increased number of absorbed ultrasonic signals 126. The ultrasound input device 100 and input object 113 (e.g., a finger) will have a larger contact area 128 if the pressure of the touch is increased, e.g., as the contacting surface flattens. As shown in FIG. 1, the larger contact area 128 increases the number of absorbed ultrasonic signals 126 passing through the second surface 108 of the material layer 102 into the input object 113. In the case of a user's finger, the larger contact area 128 can be indicative of a ridge of the user's finger being flattened against the second surface 108 of the material layer 102. In some cases, with the input object 113 is not a finger or is a finger covered by another material, the larger contact area 128 can be a result of textured elements of the input object 113 being flattened against the second surface 108 of the material layer 102.

Figure 2:
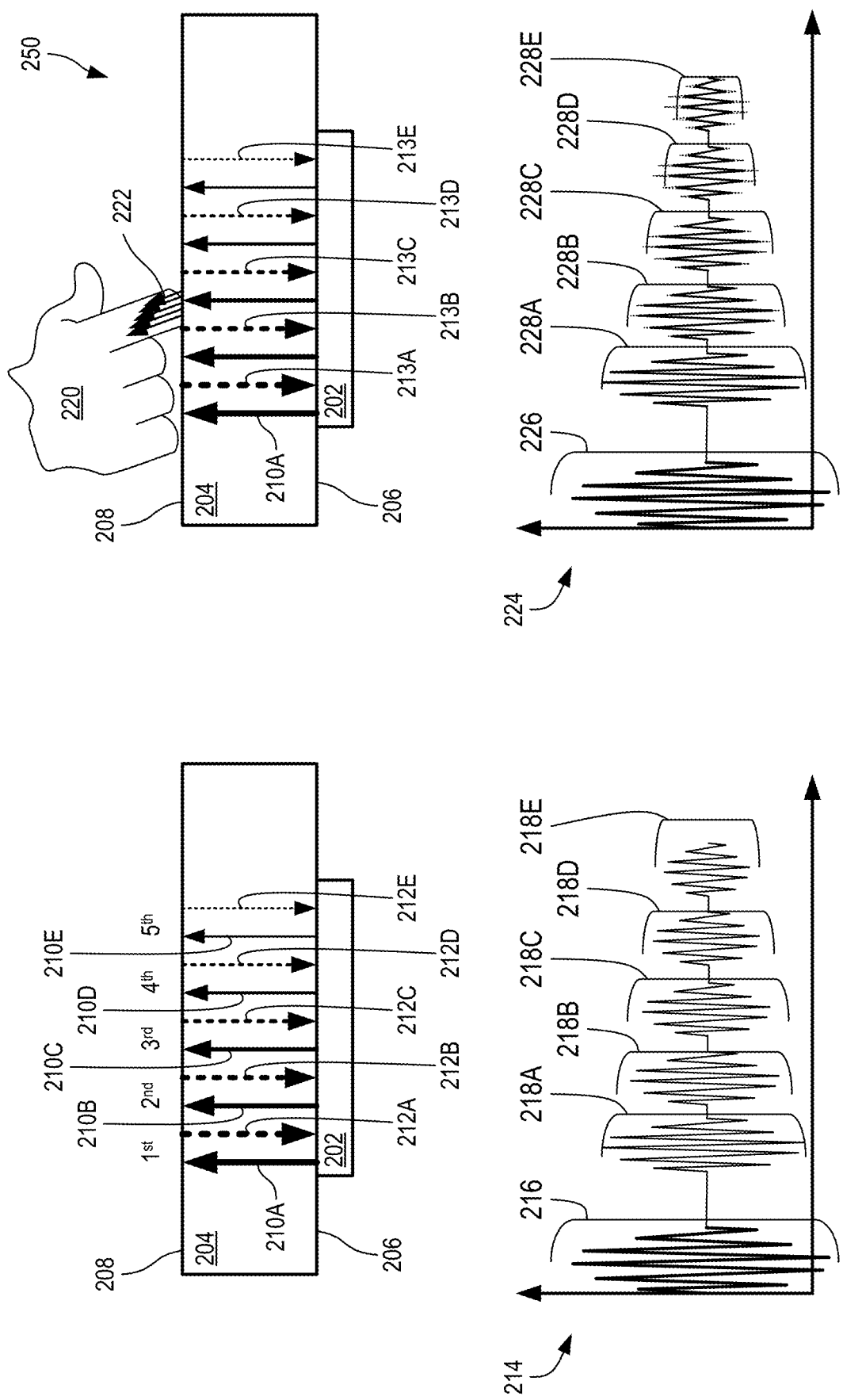
FIG. 2 is a schematic diagram depicting an ultrasound input system in an non-contacted state and a contacted state according to certain aspects of the present disclosure.

FIG. 2 is a schematic diagram depicting an ultrasound input system in a non-contacted state and a contacted state according to certain aspects of the present disclosure. FIG. 2 shows the ultrasound input device with no touch 200 (e.g., a non-contacted state) and with a touch 250 (e.g., a contacted state). The ultrasound input device includes a transducer 202 coupled to the material layer 204. In this embodiment, the material layer 204 is shown as aluminum, but can be any material (e.g., glass, wood, leather, plastic, etc.). The transducer 202 is coupled to a first (interior) surface 206 of the material layer 204. A second (exterior) surface 208 of the material layer 204 is in contact with the air.

For the ultrasound input device with no touch 200, the transducer 202 emits an ultrasonic signal 210A directed into the material layer 204 and toward the second surface 208. Air has an acoustic impedance of approximately zero and causes the second surface 208 to reflect a reflected ultrasonic signal 212A with close to 100% of the emitted ultrasonic signal (e.g., at or more than 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.81%, 99.82%, 99.83%, 99.84%, 99.85%, 99.86%, 99.87%, 99.88%, 99.89%, 99.9%, 99.91%, 99.92%, 99.93%, 99.94%, 99.95%, 99.96%, 99.97%, 99.98%, and/or 99.99%). The reflected ultrasonic signal 212A can itself be reflected off the first surface 206 to generate a reflected-emission signal 210B, which can be reflected off the second surface 208 to result in a second reflected ultrasonic signal 212B. As depicted in FIG. 2, four reflected ultrasonic signals 212A, 212B, 212C, 212D generate four respective reflected-emission signals 210B, 210C, 210D, 210E. Any number of reflected ultrasonic signals 212A, 212B, 212C, 212D, 212E and reflected-emission signals 210B, 210C, 210D, 210E can result from an initial emitted ultrasonic signal 210A until the signals become too attenuated to be reflected and/or detected. Plot 214 shows a first amplitude 216 corresponding to the emitted ultrasonic signal 210A and a set of subsequent amplitudes 218A, 218B, 218C, 218D, 218E corresponding to the reflected ultrasonic signals 212A, 212B, 212C, 212D, 212E. The first subsequent amplitude 218A is smaller than the first amplitude 216 due to losses in the material layer 204. Each of the remaining subsequent amplitudes 218B, 218C, 218D, 218E is smaller than the amplitude of the previous subsequent amplitude 218A, 218B, 218C, 218D due to losses in the material layer 204.

In some cases, the frequency or frequencies selected for use with the ultrasound input device can be selected to achieve a small or minimal attenuation in a non-contacted state, thus achieving a large or maximum number of reflected ultrasonic signals. In some cases, the set of reflected ultrasonic signals 212A, 212B, 212C, 212D, 212E stemming from a single emitted ultrasonic signal 210A can be referred to as a train of reflected signals. For illustrative purposes, the various reflected ultrasonic signals 212A, 212B, 212C, 212D, 212E and reflected-emission signals 210B, 210C, 210D, 210E are depicted spaced apart from left to right in FIG. 2, however it will be understood that these signals are temporally separated and may not necessarily be spatially separated.

For the ultrasound input device with a touch 250, an input object 220, in this case a finger, is in contact with the second surface 208 of the material layer 204. Reflection loss depends on how much the touch input medium versus the input object differ in terms of acoustic impedance. For example, reflection loss (dB) can be represented as $$20 \log 1 - \left(\frac{Z2 - Z1}{Z2 + Z1}\right),$$

where Z1 is the impedance of the material layer 204 and Z2 is the impedance of the input object 220. Once an input object 220 is in contact with material layer 204, the emitted ultrasonic signal 210A is divided into two parts. One part, the echo, consists of a reflected ultrasonic signal 213A and is reflected back towards the transducer. A second part 222 penetrates into the input object 220. The reflected ultrasonic signal 213A can itself be reflected off the first surface 206 to generate a reflected-emission signal. The reflected-emission signal can itself be divided into two parts, one of which is a second reflected ultrasonic signal 212B and another of which is the second part 222 that penetrates into the input object 220. As depicted in FIG. 2, four reflected ultrasonic signals 213A, 213B, 213C, 213D generate four respective reflected-emission signals. Any number of reflected ultrasonic signals 212A, 212B, 212C, 212D, 212E and reflected-emission signals can result from an initial emitted ultrasonic signal 210A until the signals become too attenuated to be reflected and/or detected.

As shown by plot 224, a first amplitude 226 corresponds to the emitted ultrasonic signal 210A. The first subsequent amplitude 228A corresponding to reflected ultrasonic signal 213A is reduced compared to the no touch ultrasound input device due to the second part 222 penetrating the input object 220. Each of the remaining subsequent amplitudes 228B, 228C, 228D, 228E is smaller than the amplitude of the previous subsequent amplitude 228A, 228B, 228C, 228D due to losses in the material layer 204. For illustrative purposes, plot 224 depicts the subsequent amplitudes 228A, 228B, 228C, 228D, 228E in solid line overlaid with the corresponding subsequent amplitudes 218A, 218B, 218C, 218D, 218E in dotted lines. The amount of overall attenuation of the subsequent amplitudes 228A, 228B, 228C, 228D, 228E of the ultrasound input device in a contacted state may be greater than that of the subsequent amplitudes 218A, 218B, 218C, 218D, 218E of the ultrasound device in a non-contacted state. Additionally, the amount of attenuation between each of the subsequent amplitudes 228A, 228B, 228C, 228D, 228E of the ultrasound input device in a contacted state may be greater than that of the subsequent amplitudes 218A, 218B, 218C, 218D, 218E of the ultrasound device in a non-contacted state.

Of note, the subsequent amplitudes 228A, 228B, 228C, 228D, 228E from plot 224 that are associated with a touch event attenuate faster than the corresponding subsequent amplitudes 218A, 218B, 218C, 218D, 218E from plot 214 that are associated with no touch event. In other words, the contrast between subsequent amplitudes of a touch event and subsequent amplitudes of a no touch event is greater with each subsequent reflection number n. In some cases, the ratio of a the n-th subsequent amplitude associated with no touch event to the n-th subsequent amplitude associated with a touch event can be $\Gamma^n:(1-\Gamma^n)$ where $\Gamma$ is the percentage of the signal reflected back from the second surface 208. For example, the ratio of subsequent amplitude 218A to subsequent amplitude 228A may be 100:90; the ratio of subsequent amplitude 218B to subsequent amplitude 228B may be 100:81; the ratio of subsequent amplitude 218C to subsequent amplitude 228C may be 100:72; the ratio of subsequent amplitude 218D to subsequent amplitude 228D may be 100:63; and the ratio of subsequent amplitude 218E to subsequent amplitude 228E may be 100:54.

B. Ultrasound Touch Input Device

Figure 3:
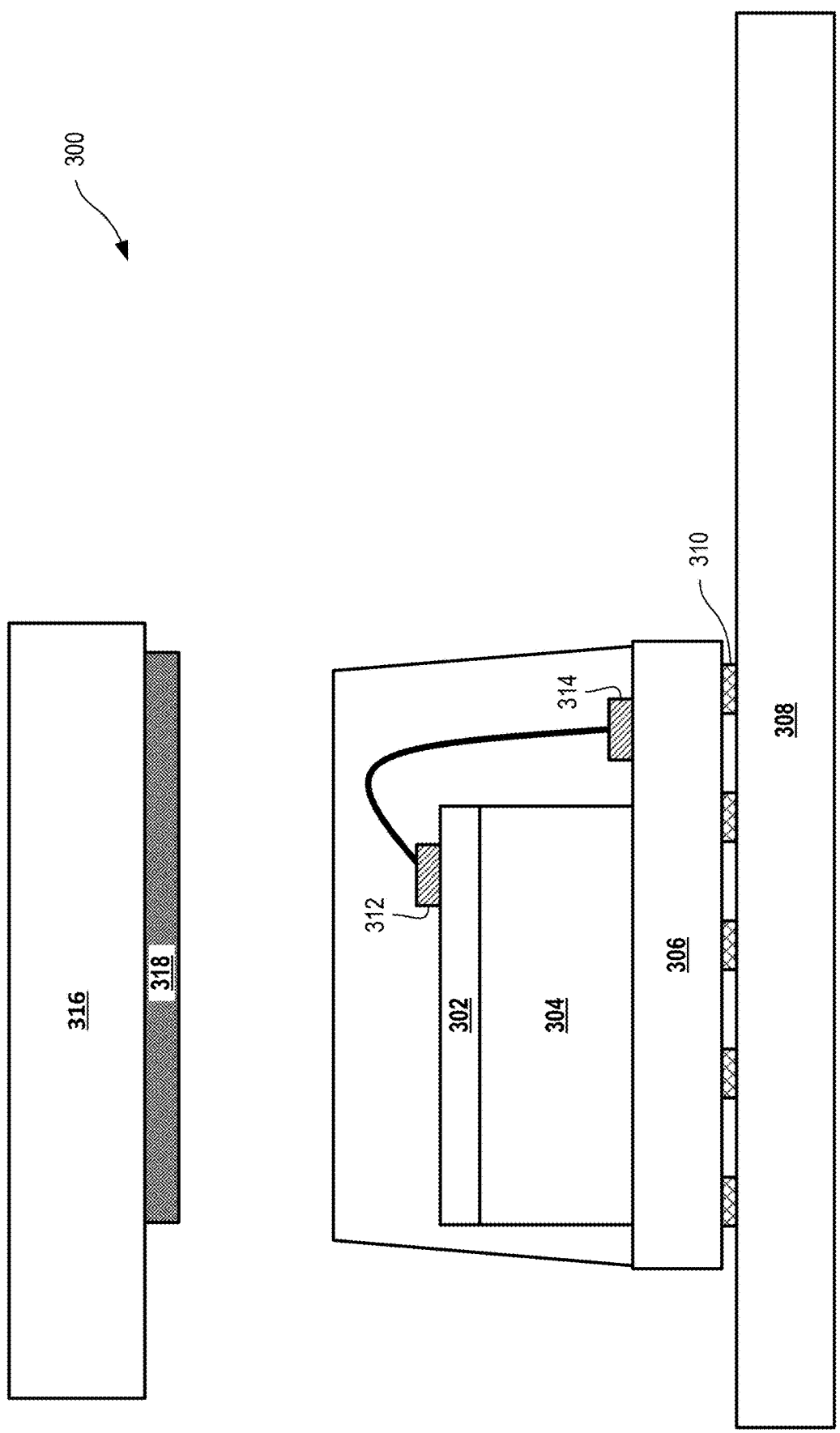
FIG. 3 is a schematic diagram depicting an ultrasound input device according to certain aspects of the present disclosure.

FIG. 3 shows an ultrasound input device according to certain aspects of the present disclosure. Ultrasound input device 300 can be attached to any surface to detect touch inputs. The ultrasound input device 300 can include a sensor 302, such as a piezoelectric micromachined ultrasonic transducer (PMUT). A PMUT transducer is a piezoelectric ultrasonic transducer that comprises a thin membrane coupled to a thin piezoelectric film to induce and/or sense ultrasonic signals. The sensor 302 can be integrated on an application-specific integrated circuit (ASIC), such as CMOS (complementary metal-oxide-semiconductor) ASIC 304 (all-in-one) and formed on a base 306. The ASIC 304 can include electrical circuits and/or modules usable to perform various processes as disclosed herein, such as various analog and/or digital processing as described with reference to at least FIGS. 7-22. For example, ASIC 304 can be used to drive sensor 302, detect reflected ultrasonic signals using sensor 302, and determine amplitudes associated with the reflected ultrasonic signals (e.g., using various analog technologies such as accumulation and integration). In some cases, ASIC 304 can optionally determine a threshold value to which the determined amplitudes can be compared to make a determination about whether or not a touch event has occurred, in which case the ASIC 304 can output a signal associated with the occurrence of the touch event.

In some cases, circuitry of the ASIC 304 can perform certain process in analog, such as signal rectification, integration, mixing, modification, accumulation, and the like. As used herein, analog circuitry can include any circuitry capable of performing an action (e.g., rectification, integration, and the like) on an analog signal without first digitizing the analog signal. In an example, ASIC 304 can include analog circuitry capable of taking a received ultrasonic signal, rectifying the signal, and integrating at least a portion of the rectified signal to provide an integrated signal, such as described with reference to FIG. 8. In another example, ASIC 304 can include analog circuitry capable of taking a received ultrasonic signal, calculating absolute values of the signal, and accumulating the absolute values to provide an accumulated signal, such as described with reference to FIG. 10. In another example, ASIC 304 can include analog circuitry capable of taking a received ultrasonic signal, squaring the signal through self-mixing, and integrating the squared signal to provide an integrated signal, such as described with reference to FIG. 11.

In some cases, a different style of ultrasonic transducer can be used for sensor 302 instead of a PMUT sensor. In some cases, the ultrasonic sensor can be formed using a deposited layer of piezoelectric material (e.g., aluminum nitride, lead zirconate titanate (PZT), or polyvinylidene fluoride (PVDF)). In some cases, the ultrasonic sensor can be a capacitive micromachined ultrasonic transducer (CMUT). In some cases, the ultrasonic sensor can be a resonator array of piezoelectric devices (e.g., piezoelectric cantilevers or piezoelectric pillars).

The base 306 can be bonded 310 to a flexible printed circuit/printed circuit board 308 (FPC/PCB) of a larger integrated device such as a mobile phone. In some embodiments, a contact area 312 on the sensor 302 can be bonded to a base contact 314. As shown, the dimensions of the ultrasound input device 300 can be equal to or less than 1.5 mm×1.5 mm×0.5 mm in size, although other sizes can be used. In some cases, the FPC/PCB 308 to which the base 306 is attached can receive information associated with the amplitude of detected reflected ultrasonic signals and perform some of the functionality disclosed herein, such as determining threshold values and/or determining when a touch event has occurred. However, in some cases, the FPC/PCB 308 simply receives a signal associated with occurrence of a touch event, and thus does not need to perform further analysis of amplitudes of detected reflected ultrasonic signals to perform actions based on a touch event.

The ASIC 304 and the sensor 302 integration enables small form factor that leads placement of buttons or other functionality in many space-limited applications. For example, smartphone side mechanical buttons can easily be replaced with the ultrasound input device 300 under casing. To implement a touch interface of a system or other suitable functionality, the ultrasound input device 300 can be bonded to a surface 316 using an adhesive 318.

Figure 4:
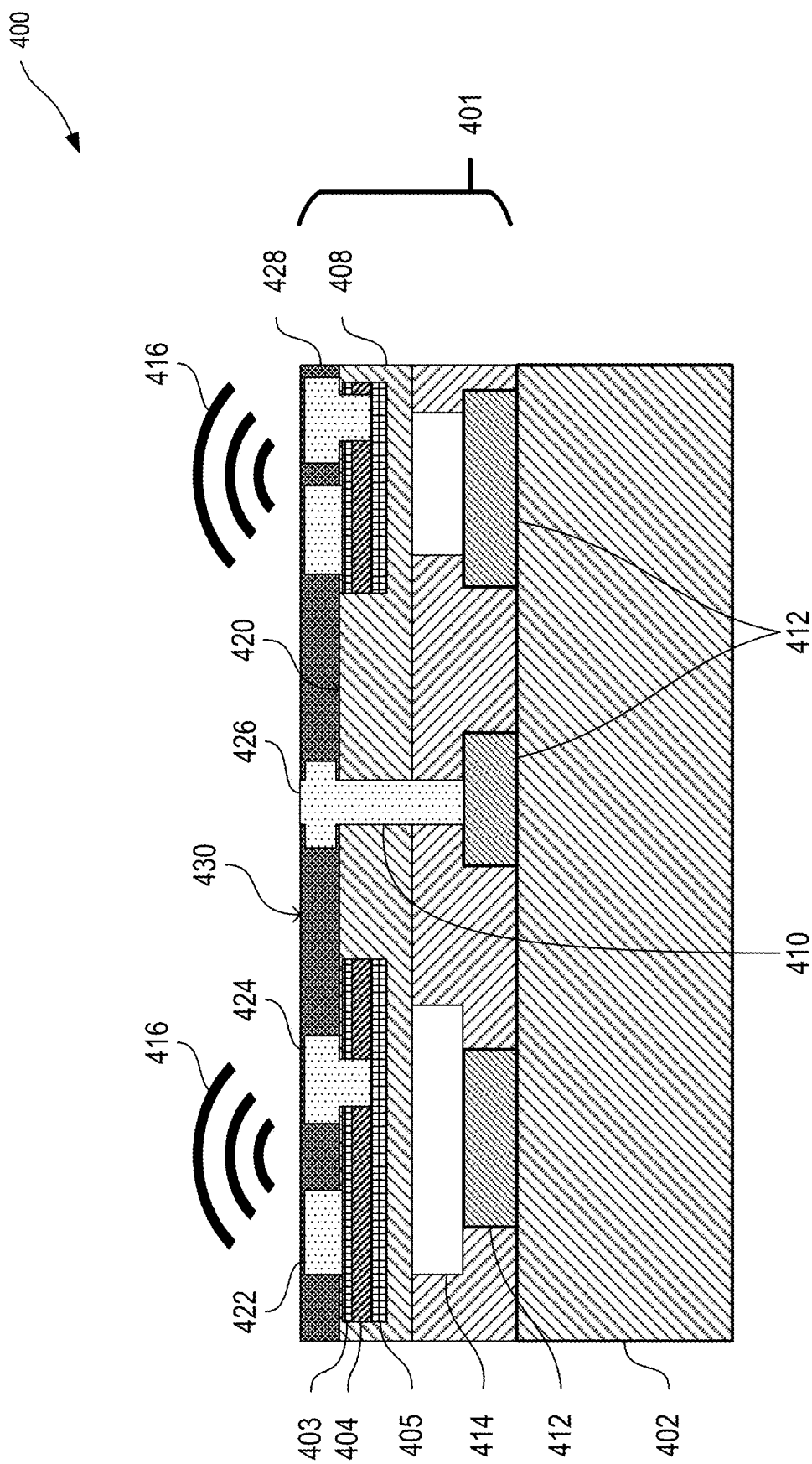
FIG. 4 is a cross-sectional view of two piezoelectric micromachined ultrasonic transducers bonded to a CMOS wafer according to certain aspects of the present disclosure.

FIG. 4 is a cross-sectional view of two piezoelectric micromachined ultrasonic transducers integrated to a CMOS wafer according to certain aspects of the present disclosure. Device 400 shows a cross-sectional view of two PMUTs bonded to a CMOS wafer 402 that can be used in an ultrasound input device. Each PMUT may be formed on a MEMS wafer 401 that is bonded to a CMOS wafer 402. In this way, PMUTs may be coupled to the requisite processing electronics of the CMOS wafer 402. It will be understood that each PMUT may have an active piezoelectric layer 404 along with a first electrode 403 and a second electrode 405. The first electrode 403 and the second electrode 405 can be electrically coupled to the piezoelectric layer 404.

In some embodiments, the PMUTs may include a first contact 422 electrically coupled to the first electrode 403, a second contact 424 electrically coupled to the second electrode 405, and a third electrode 426 electrically coupled to the CMOS wafer 402. Applying alternating voltage through the first electrode 403 and the second electrode 405 can cause movement (e.g., flexural motion) of the piezoelectric layer 404, which can result in generated sound waves. Likewise, received sound waves that induce movement in the piezoelectric layer 404 can be sensed as changing voltages across the first electrode 403 and second electrode 405. One or more vias (vertical interconnect access) 410 may be formed to in the PMUTs. Each of the contacts may be wire bonded to an electronics board. In some embodiments, PMUTs may include a passivation layer 428 formed on a surface 420 and the contacts. The surface 420 or an adhesive coupling surface 430 on the surface of the passivation layer 428 may be coupled to a material layer of an ultrasound input device.

In some embodiments, the passive electrical layer 408 may comprise $SiO_2$ or any other suitable passive layer. The active piezoelectric layer 404 may be approximately 1 μm thick Aluminum Nitride, and the passive elastic layer may be approximately 1 μm thick single-crystal Silicon, although other sizes and materials may be used. In some embodiments, the active piezoelectric layer 404 may be Scandium-doped Aluminum Nitride. Alternatively, the active piezoelectric layer 404 may be another suitable piezoelectric ceramic such as PZT. Both the top and bottom electrodes 406 may comprise Molybdenum. In order to bond the PMUTs to the top metal 412 of CMOS wafer 402, fusion bonding via thru-silicon-via (TSV) as shown at via 410 may be used. This methodology results in significant parasitic reduction which in turn results in improved signal integrity and lower power consumption.

In some embodiments, cavity 414 may be formed with a vacuum or near vacuum to isolate the transducer from the processing electronics in the CMOS wafer 402. The sound generated by the PMUTs will not travel through the near vacuum of cavity 414 minimizing reflection and interference that may be caused by material interfaces with the CMOS wafer 402. The cavity 414 may cause ultrasound 416 to travel away from the PMUTs. Ultrasound 416 may travel through the adhesive coupling surface 430 and into the material layer of the ultrasound input device. The material layer may reflect ultrasound 416 causing a return echo to reflect back to the PMUTs. The return echo travels through the adhesive coupling interface and is received by the PMUTs.

In some embodiments, the CMOS wafer 402 may be an application specific integrated circuit (ASIC) that includes one or more devices necessary to drive the transducer. The drive voltage for an array of PMUTs may be less than 4 volts. In some cases, the drive voltage may be less than 1.8 volts. In some cases, the drive voltage may be at or less than 4, 3.5, 3, 2.5, 2, 1.9, 1.8, 1.7, 1.6, or 1.5 volts. The ASIC can be manufactured to meet size requirements associated with the size of an associated PMUT. In some embodiments, the ASIC may include one or more modules to receive measured signals. The ASIC may be configured to further process the signal. For example, the ASIC may include one or more rectifiers to generate an absolute value signal by taking the absolute value of the received signals, which may be an alternating current. The ASIC may also include an integrator and analog to digital converters (ADCs) to convert the reflected ultrasonic signal to a digital representation of the reflected signal. The integration of ASIC and PMUTs further allows for embedding gain amplifiers and ADC in an ASIC and eliminating the standalone ADC-sensor controller chip. This opens up space on associated circuit boards and reduces touch input sensor implementation cost. In some embodiments, the ASIC may transmit the digital signal to at least one or more of a memory, a processor, and a remote device. In other embodiments, the ASIC may include one or more signal processing modules.

The PMUT arrays can be compatible with CMOS semiconductor processes. In some embodiments, PMUT materials and dimensions can be compliant with Semiconductor Equipment and Materials International (SEMI) standard specifications. Because PMUTs can be compliant with SEMI specifications, the transducer arrays can be used with existing CMOS semiconductor fabrication tools and methods. For example, photolithography may be used to form one or more PMUTs. In contrast, current piezoelectric ultrasound transducer arrays are formed using a die saw that cannot match the precision of photolithography. As a result, PMUTs can be smaller, operate at lower voltages, and have lower parasitics.

C. Integration with Circuit Board

Figure 5:
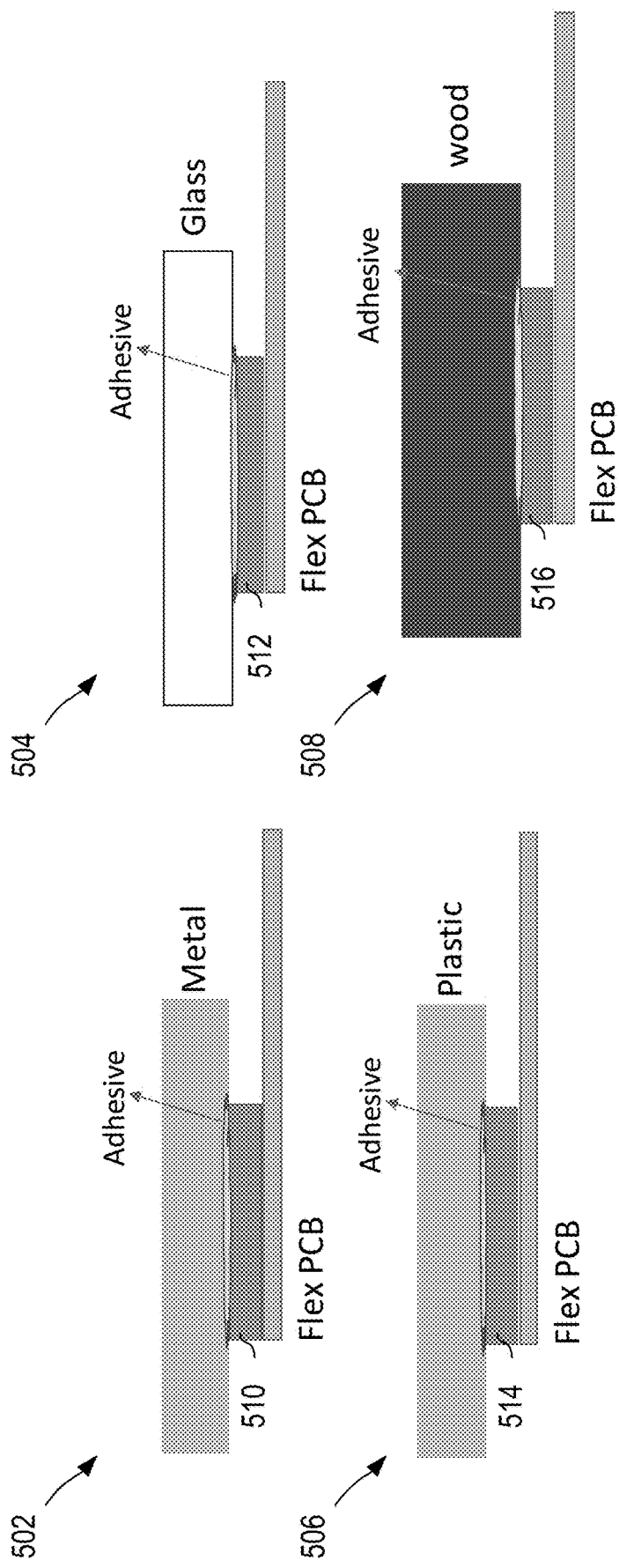
FIG. 5 is a set of schematic diagrams depicting an ultrasound input device coupled to a variety of surfaces according to certain aspects of the present disclosure.

FIG. 5 is a set of schematic diagrams 502, 504, 506, 508 depicting an ultrasound input device 510, 512, 514, 516 coupled to a variety of surfaces according to certain aspects of the present disclosure. Diagram 502 depicts an ultrasound input device 510 coupled to a metal surface via an adhesive. Diagram 504 depicts an ultrasound input device 512 coupled to a glass surface via an adhesive. Diagram 506 depicts an ultrasound input device 514 coupled to a plastic surface via an adhesive. Diagram 508 depicts an ultrasound input device 516 coupled to a wooden surface via an adhesive. Any suitable material can be used as a sensing surface, such as non-porous materials or a semi-porous materials. Porous materials may be useable for sensing surfaces, although better results can be achieved with smaller pores, higher density, and more consistent density.

Additionally, an ultrasound input device 510, 512, 514, 516 can be coupled to a flexible PCB, such as on a side opposite where the ultrasound input device 510, 512, 514, 516 is coupled to the sending surface. The ultrasound input device 510, 512, 514, 516 can act as a mechanical coupler between the sensing surface and the PCB, with the PCB not being elsewhere attached to the sensing surface, although that need not always be the case. In some cases, a flexible PCB can be used.

The use of a PCB can permit additional components to be integrated with the ultrasound input device 510, 512, 514, 516 to extend the functionality of the ultrasound input device 510, 512, 514, 516, such as described with reference to FIG. 6.

Figure 6:
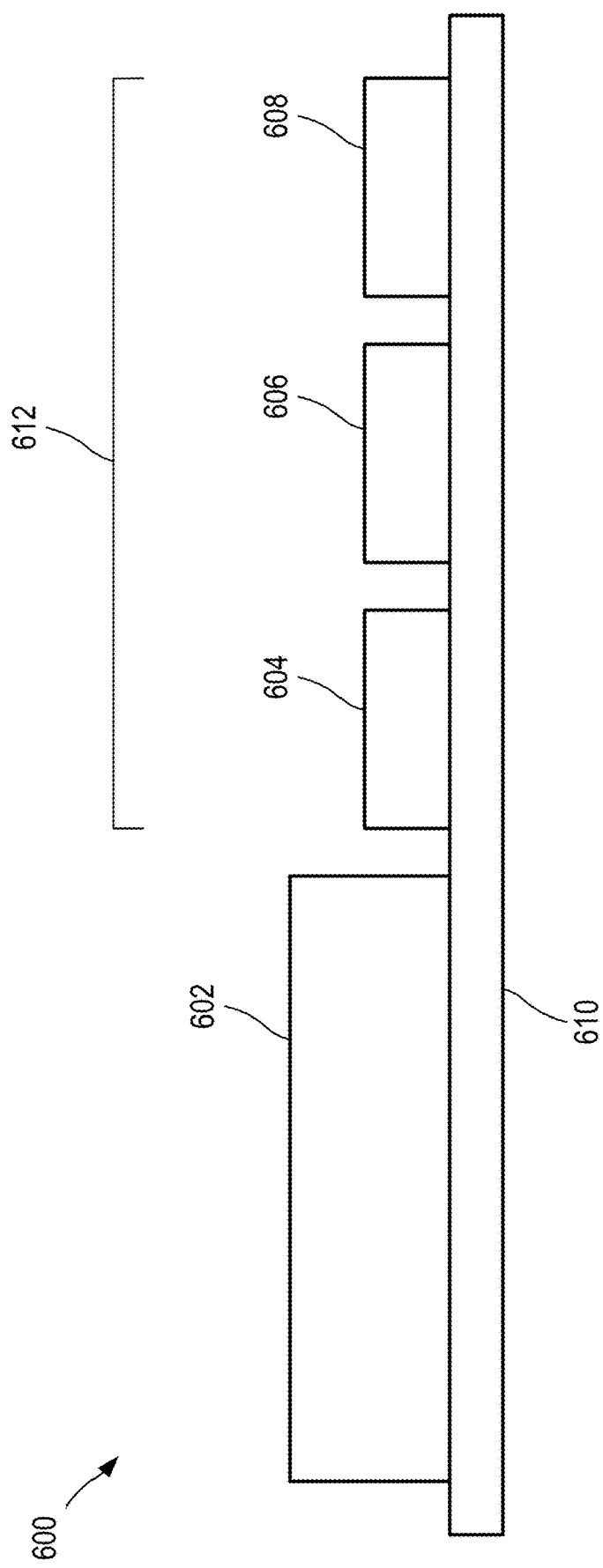
FIG. 6 is a schematic side view diagram depicting an ultrasound input system with shared-board components according to certain aspects of the present disclosure.

FIG. 6 is a schematic side view diagram depicting an ultrasound input system 600 with shared-board components according to certain aspects of the present disclosure. The ultrasound input system 600 can include an ultrasound input device 602 electrically coupled to a circuit board 610, and any number of shared-board components 612. Each shared-board component can be electrically coupled to the circuit board 610. In some cases, the ultrasound input device 602 can be mechanically coupled to the circuit board 610, such as using electrical couplings (e.g., solder points) or other mechanical supports. In some cases, one, some, or all of the shared-board components 612 can be mechanically coupled to the circuit board 610. In some cases, the circuit board can be a printed circuit board, such as a flexible PCB, although that need not always be the case.

The entire ultrasound input system 600 can be contained within a single, shared housing, within multiple housing, or may not be contained within a housing. In some cases, two or more of the shared-board components 612 can be contained within a single housing, with or without the ultrasound input device 602. In some cases, all of the shared-board components 612 can be located on the same side of the circuit board 610 as the ultrasound input device 602, although that need not always be the case. When located on the same side as the ultrasound input device 602, the shared-board components 612 can be selected or designed to have a height that is less than the height of the ultrasound input device 602.

In some cases, an ultrasound input system 600 can comprise a power component 604. The power component 604 can provide power to the ultrasound input device 602 and/or any of the other shared-board components 612. Examples of power components 604 include batteries, transformers (e.g., transformers coupled to a mains line), capacitors (e.g., ultra-capacitors), solar cells, fuel cells, or any other suitable source of power.

In some cases, an ultrasound input system 600 can comprise a processor 606. The processor 606 can enable various processing functions to be performed within the ultrasound input system 600 based on signals received from the ultrasound input device 602. Examples of suitable processors 606 include microcontrollers, central processing units, or other suitable devices. The processor 606 can be further coupled to memory to access processing routines, access stored data, and/or store data.

In some cases, an ultrasound input system 600 can comprise a communication component 608. The communication component 608 can interact with the ultrasound input device 602 and/or a processor 606 to send or receive signals to or from an external device. Examples of suitable communication components 608 include wireless radios (e.g., Bluetooth, WiFi, Zigbee, Z-wave, or others), audio devices (e.g., microphones or speakers), visual devices (e.g., cameras, lights, or displays), tactile devices (e.g., haptic feedback devices such as motors and vibrators), or other devices suitable for sending or receiving signals.

In some cases, an ultrasound input system 600 can comprise shared-board components 612 that include a power component 604, a processor 606, and a communication component 608. In some cases, an ultrasound input system 600 can include more or fewer shared-board components, including different types of components.

II. Ultrasound Signal Processing

Reflected ultrasonic signals can be processed to produce images and determine a range to an object. Embodiments described herein can process reflected ultrasonic signals to determine if an object is in contact with a surface.

A. Detecting Touch Input by Digitizing Reflected Signal

Figure 7:
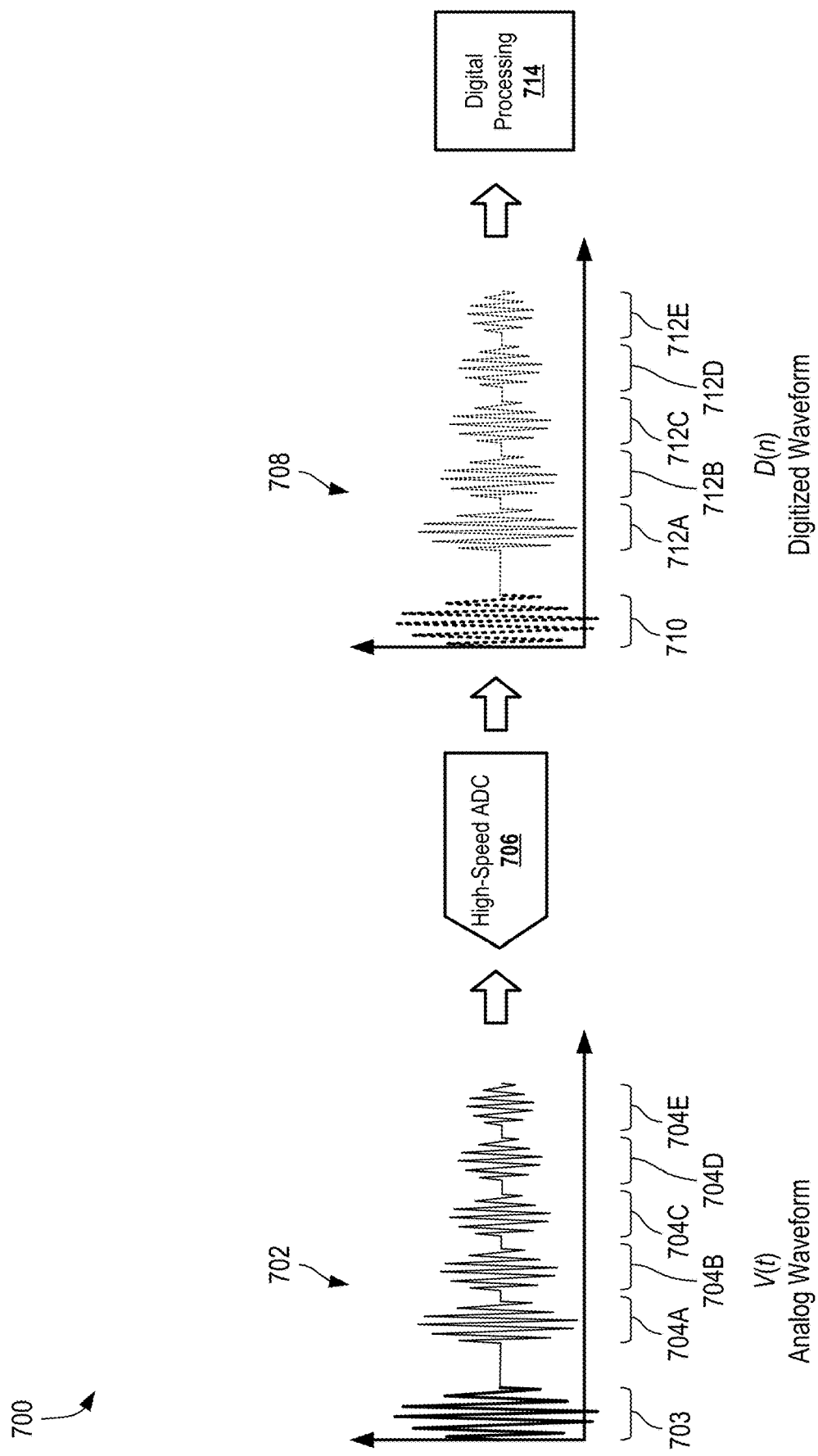
FIG. 7 is a schematic diagram of a flow for digitally processing ultrasound signals emitted and received by an ultrasound input device according to certain aspects of the present disclosure.

FIG. 7 is a schematic diagram of a flow 700 for processing ultrasound signals emitted and received by an ultrasound input device according to certain aspects of the present disclosure. The flow 700 includes emitting and receiving an ultrasonic signal as illustrated in a first plot 702. The first plot 702 shows an analog measurement of a first signal 703 for an emitted ultrasonic signal and a set of subsequent signals 704A, 704B, 704C, 704D, 704E for a set of reflected ultrasonic signals associated with an ultrasound input device. The first signal 703 and the subsequent signals 704 can be measured using a high-speed ADC 706 to digitize the signal.

The output of the high-speed ADC 706 is shown in a second plot 708. The second plot 708 includes a first digital representation 710 of the emitted ultrasonic signal and a subsequent digital representations 712A, 712B, 712C, 712D, 712E of the reflected ultrasonic signals associated with the ultrasound input device. The first digital representation 710 and the subsequent digital representations 712A, 712B, 712C, 712D, 712E can be processed by a digital processing module in 714 embedded in the ultrasound input device and/or a system coupled to the ultrasound input device. The digital processing module 714 can demodulate the digital representations of the data to extract touch input information. For example, the digital processing module can process one or more of the subsequent digital representations 712A, 712B, 712C, 712D, 712E to determine that an amplitude of the second digital representation is below a threshold value that is associated with an object being in contact with the surface of the ultrasound input device.

B. Detecting Touch Input Using Energy Integration

Figure 8:
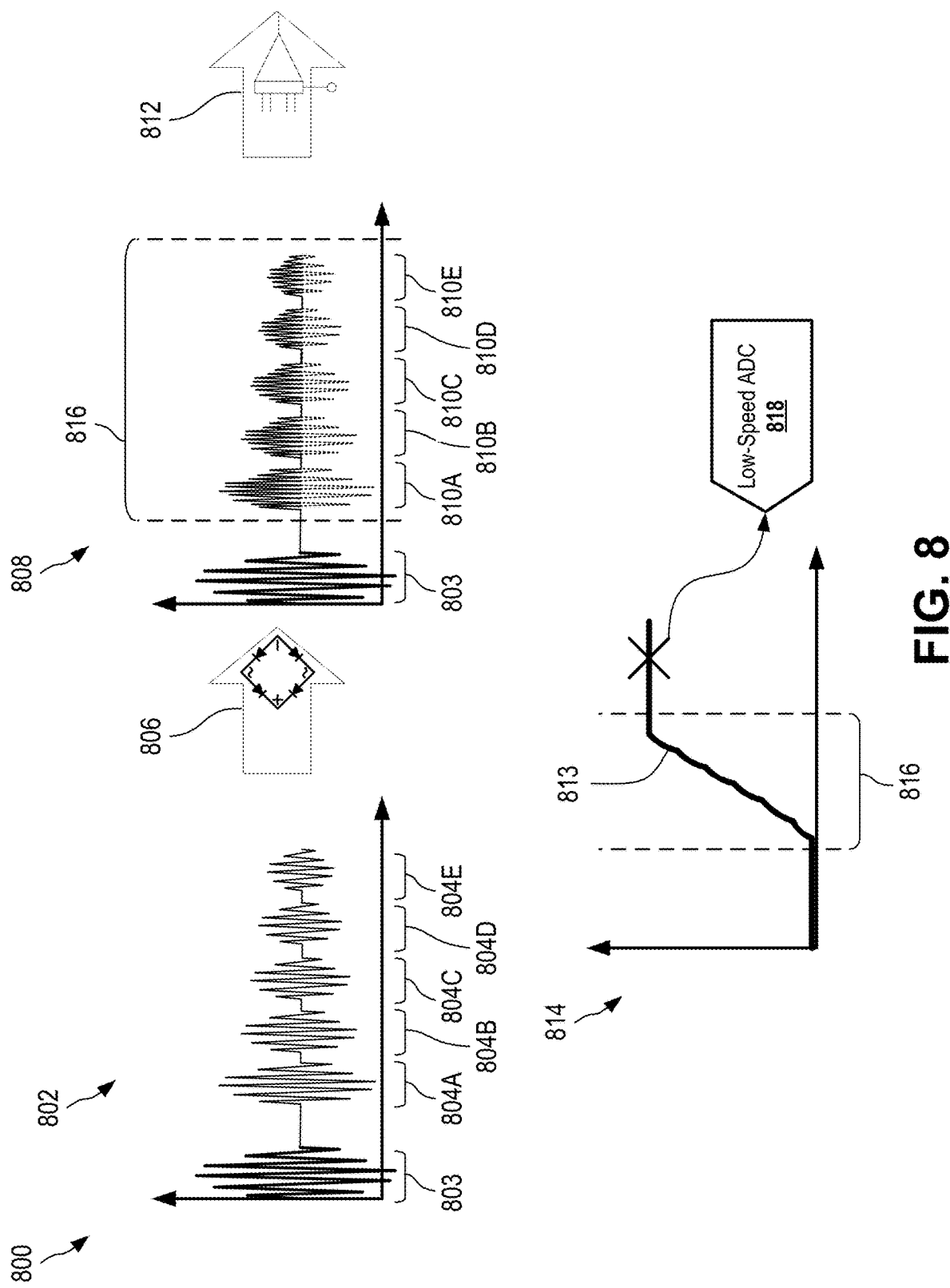
FIG. 8 is a schematic diagram of a flow for processing ultrasound signals emitted and received by an ultrasound input device using energy integration according to certain aspects of the present disclosure.

FIG. 8 is a schematic diagram of a flow 800 for processing ultrasound signals emitted and received by an ultrasound input device using energy integration according to certain aspects of the present disclosure. The flow 800 includes emitting and receiving an ultrasonic signal as illustrated in a first plot 802. The first plot 802 shows an analog measurement of a first signal 803 for an emitted ultrasonic signal and a set of subsequent signals 804A, 804B, 804C, 804D, 804E for a set of reflected ultrasonic signals associated with an ultrasound input device. The flow 800 can include an ultrasound input device with an analog circuit including a rectifier 806 to rectify the subsequent signals 804A, 804B, 804C, 804D, 804E.

A second plot 808 shows the first signal 803 and a set of rectified signals 810A, 810B, 810C, 810D, 810E each corresponding to respective ones of the set of reflected ultrasonic signals. The rectified signals 810A, 810B, 810C, 810D, 810E can be processed by an analog integrator 812 to output a direct current (DC) signal 813, shown in a third plot 814, which is directly proportional to an amplitude of the reflected ultrasonic signal. The DC signal 813 can be determined using an energy measurement window 816. The DC signal 813 can represent an energy value associated with the energy of the received signal measured during the energy measurement window 816. The DC signal 813 can be processed by a low-speed ADC 818. The DC signal 813 output by the rectifier 806 and the integrator 812 remove the need to generate a high frequency digital output and, as a result, the low-speed ADC can use less power and can be fabricated on a smaller chip area.

Figure 9:
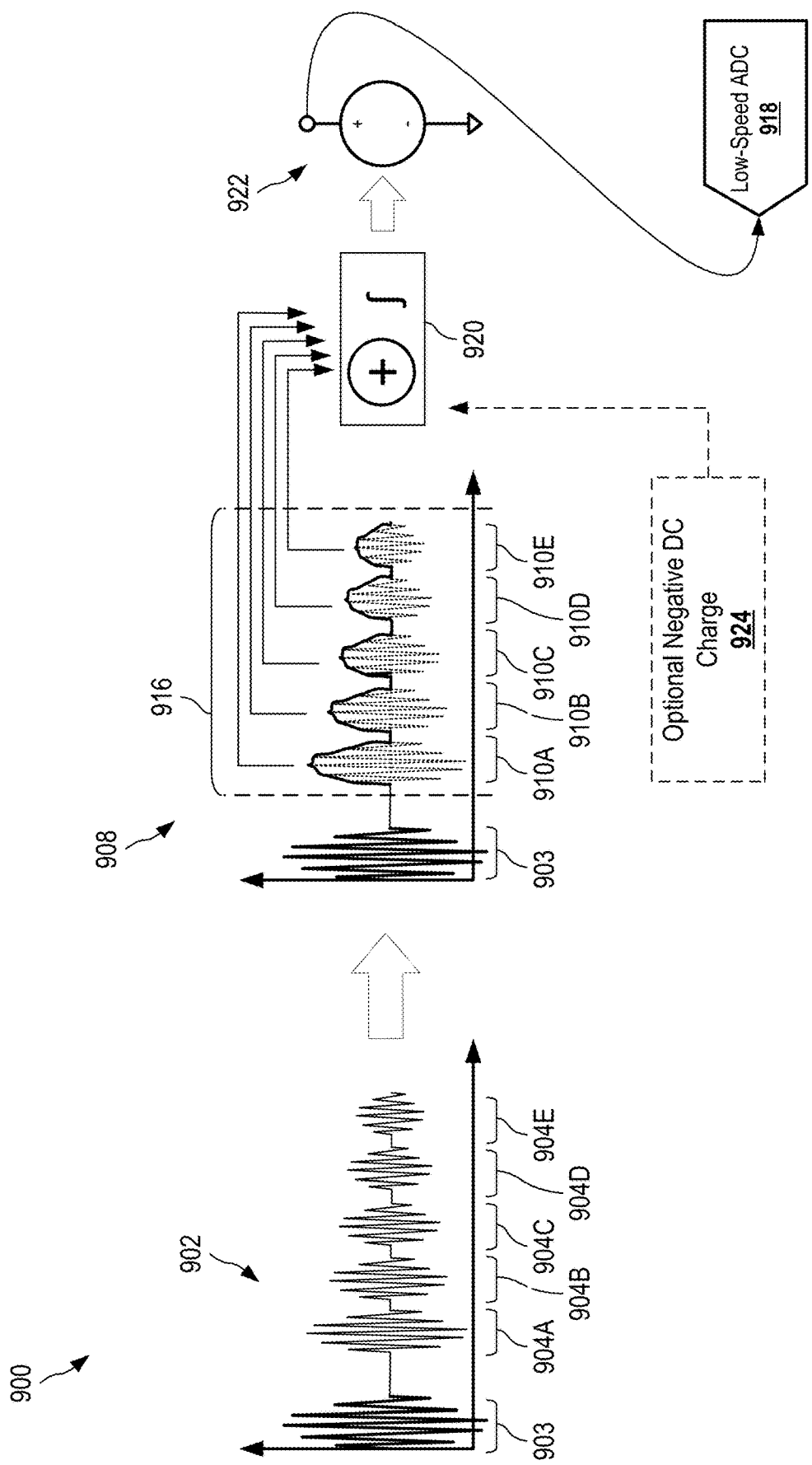
FIG. 9 is a schematic diagram of an example of a flow for processing ultrasound signals emitted and received by an ultrasound input device using energy integration according to certain aspects of the present disclosure.

FIG. 9 is a schematic diagram of an example of a flow 900 for processing ultrasound signals emitted and received by an ultrasound input device using energy integration according to certain aspects of the present disclosure. The flow 900 includes emitting and receiving an ultrasonic signal as illustrated in a first plot 902. The first plot 902 shows an analog measurement of a first signal 903 for an emitted ultrasonic signal and a set of subsequent signals 904A, 904B, 904C, 904D, 904E for a set of reflected ultrasonic signals associated with an ultrasound input device. The flow 900 can include an ultrasound input device with an analog summation or integration circuit 920 and a summed voltage output 922.

A second plot 908 shows the first signal 903 and a set of energy signals 910A, 910B, 910C, 910D, 910E each corresponding to the energy of respective ones of the set of reflected ultrasonic signals. For illustrative purposes, the set of energy signals 910A, 910B, 910C, 910D, 910E is depicted in solid line overlaid with the set of subsequent signals 904A, 904B, 904C, 904D, 904E from the first plot 902 shown in dotted line.

A summation or integration circuit 920 can received the set of energy signals 910A, 910B, 910C, 910D, 910E from within an energy measurement window 916. The summation or integration circuit 920 can generate a voltage output 922 that is an analog value representing the summed/integrated energy within the energy measurement window 916.

In some cases, an optional negative DC charge circuit 924 can be applied to the summation or integration circuit 920 to offset information not associated with a touch event. Since touch events are identified based on differences between received signals during a non-contacting state and received signals during a contacting state, there is some amount of information within the set of subsequent signals 904A, 904B, 904C, 904D, 904E that is not associated with those differences (e.g., a baseline signal). Removing such baseline signals can result in more effective range to sample during analog-to-digital conversion. Since removing such a baseline signal in analog in the set of subsequent signals 904A, 904B, 904C, 904D, 904E would require precise phase alignment, it can be difficult to apply such corrections. However, as depicted in FIG. 9, and optional negative DC charge circuit 924 applied to the summation or integration circuit 920 can offset a particular amount of energy associated with the baseline signal or a portion thereof, thus improving the amount of effective range available for analog-to-digital conversion. In such cases, the voltage output 922 can be proportional to the energy of the signal minus the energy of the negative DC charge circuit 924.

The voltage output 922 can be processed by a low-speed ADC 918. The voltage output 922 of the summed/integrated energy within the energy measurement window 916 can remove the need to generate a high frequency digital output and, as a result, the low-speed ADC can use less power and can be fabricated on a smaller chip area.

Figure 10:
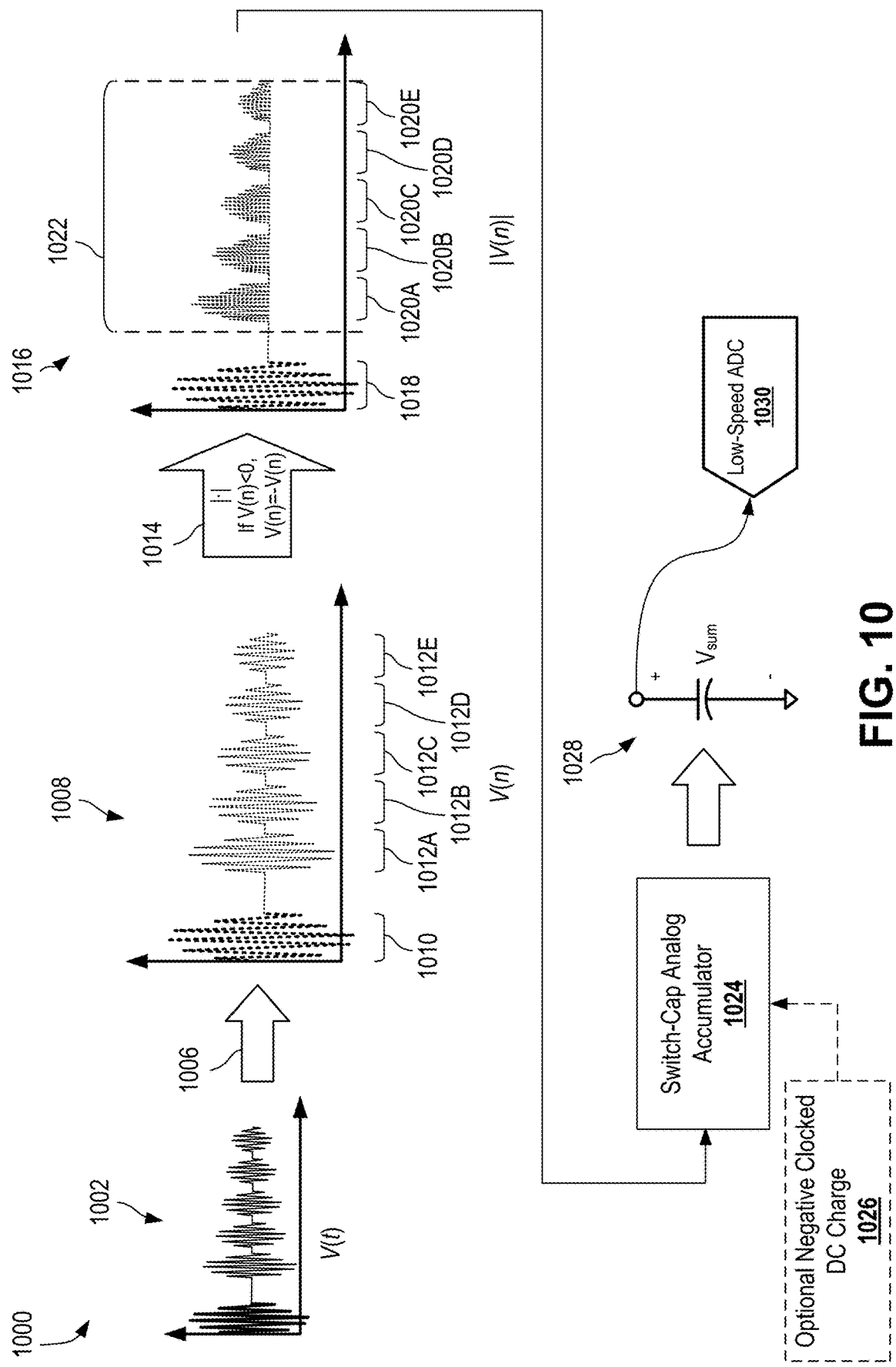
FIG. 10 is a schematic diagram of a flow for processing ultrasound signals emitted and received by an ultrasound input device using energy integration via absolute value accumulation according to certain aspects of the present disclosure.

FIG. 10 is a schematic diagram of a flow 1000 for processing ultrasound signals emitted and received by an ultrasound input device using energy integration via absolute value accumulation according to certain aspects of the present disclosure. Flow 1000 can be one technique for implementing flow 900 of FIG. 9. The flow 1000 includes emitting and receiving an ultrasonic signal as illustrated in a first plot 1002. The first plot 1002 shows an analog measurement of a first signal for an emitted ultrasonic signal and a set of subsequent signals for a set of reflected ultrasonic signals associated with an ultrasound input device. The first plot 1002 can depict voltage as a function of time (e.g., V(t)). The first plot 1002 can be first plot 902 of FIG. 9. The flow 1000 can include an ultrasound input device with an analog sampling circuit 1006, and absolute value circuit 1014, an analog accumulator 1024, and a summed voltage output 1028.

The set of subsequent signals from the first plot 1002 can be passed through an analog sampling circuit 1006 to result in a sampled first signal 1010 and a set of sampled subsequent signals 1012A, 1012B, 1012C, 1012D, 1012E as depicted in second plot 1008. First signal 1010 can correspond to the initially emitted ultrasonic wave. The second plot 1008 can depict voltage as a function of sample (e.g., V(n) where n is the sample number). The sampled subsequent signals 1012A, 1012B, 1012C, 1012D, 1012E can be passed to an absolute value circuit 1014 that can generate a set of energy signals 1020A, 1020B, 1020C, 1020D, 1020E as depicted in third plot 1016. The third plot 1016 can depict an absolute value of voltage as a function of sample (e.g., |V(n)|). The absolute value circuit 1014 can pass all zero or positive values of the set of sampled subsequent signals 1012A, 1012B, 1012C, 1012D, 1012E and reverse the polarity of all negative values. The sampled first signal 1018 is also shown in the third plot 1016, the sampled first signal 1018 can be similar to the sampled first signal 1010.

A switch-capacitor analog accumulator 1024 can be used to sum the set of energy signals 1020A, 1020B, 1020C, 1020D, 1020E from within the energy measurement window 1022. The switch-capacitor analog accumulator can generate a voltage output 1028 that is an analog value representing the sum of the energy within the energy measurement window 1022. In some cases, an analog integrator can be used instead of an accumulator.

In some cases, an optional negative clocked DC charge circuit 1026 can be applied to the switch-capacitor analog accumulator 1024 to offset information not associated with a touch event. Since the sampling circuit 1006 is clocked according to a sample rate, the optional negative clocked DC charge circuit 1026 can be clocked at the same rate to ensure the biasing voltage is applied at the appropriate intervals corresponding to the samples of the sampled subsequent signals 1012A, 1012B, 1012C, 1012D, 1012E. When an optional negative clocked DC charge circuit 1026 is used, the voltage output 1028 can be proportional to the energy of the signal minus the energy of the negative clocked DC charge circuit 1026.

The voltage output 1028 can be processed by a low-speed ADC 1030. The voltage output 1028 of the summed energy within the energy measurement window 1022 can remove the need to generate a high frequency digital output and, as a result, the low-speed ADC can use less power and can be fabricated on a smaller chip area.

Figure 11:
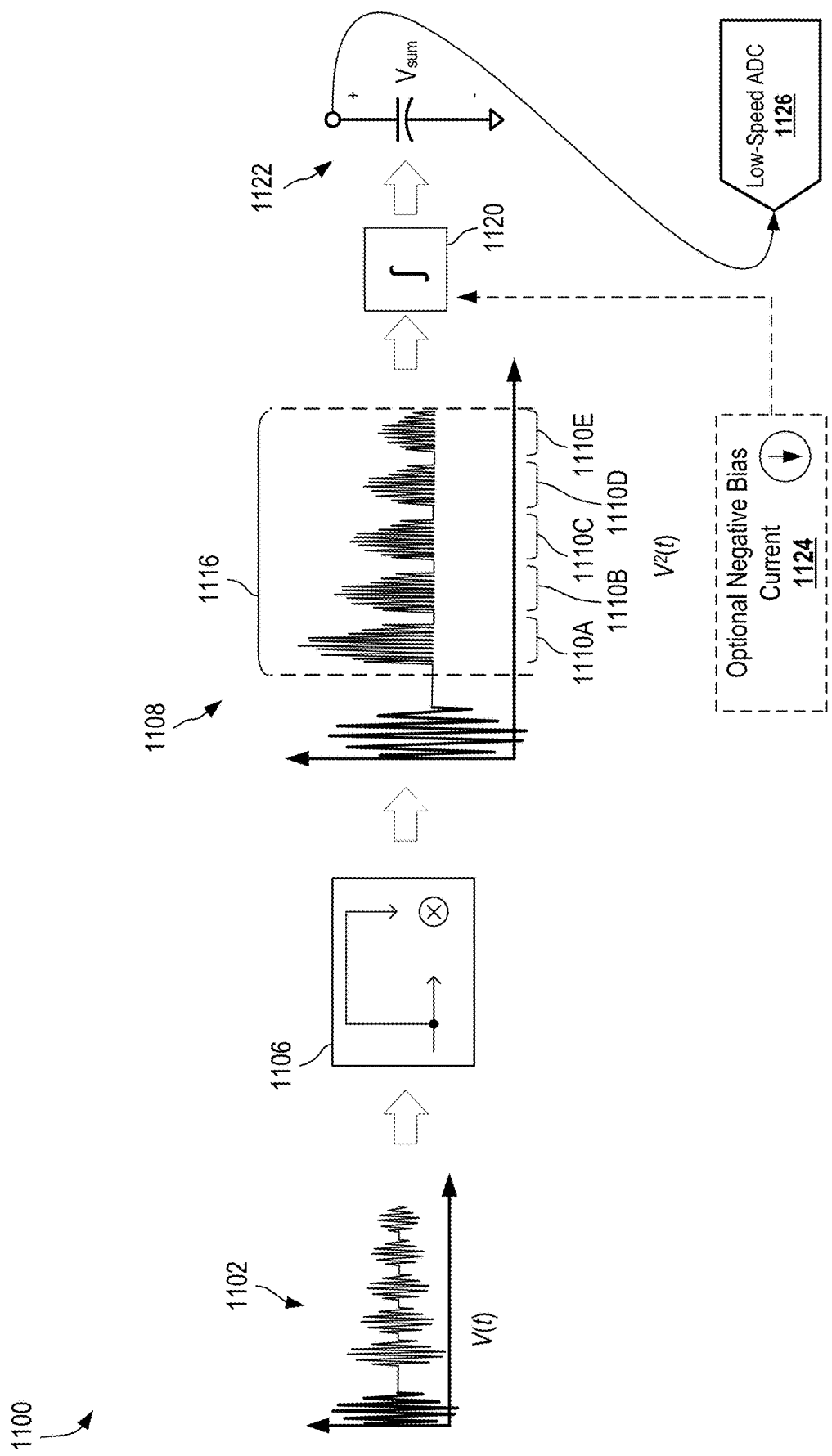
FIG. 11 is a schematic diagram of a flow for processing ultrasound signals emitted and received by an ultrasound input device using energy integration via self-mixing and integration according to certain aspects of the present disclosure.

FIG. 11 is a schematic diagram of a flow 1100 for processing ultrasound signals emitted and received by an ultrasound input device using energy integration via self-mixing and integration according to certain aspects of the present disclosure. Flow 1100 can be one technique for implementing flow 900 of FIG. 9. The flow 1100 includes emitting and receiving an ultrasonic signal as illustrated in a first plot 1102. The first plot 1102 shows an analog measurement of a first signal for an emitted ultrasonic signal and a set of subsequent signals for a set of reflected ultrasonic signals associated with an ultrasound input device. The first plot 1102 can depict voltage as a function of time (e.g., V(t)). The first plot 1102 can be first plot 902 of FIG. 9. The flow 1100 can include an ultrasound input device with a self-mixing circuit 1106, an analog integrator circuit 1120, and an integrated voltage output 1126.

The set of subsequent signals from the first plot 1102 can be passed through the self-mixing circuit 1106 to generate a set of squared subsequent signals 1110A, 1110B, 1110C, 1110D, 1110E as depicted in the second plot 1108. The self-mixing circuit 1106 can effectively multiply every analog value by itself over time. As a result, the second plot 1108 can depict squared voltage as a function of time (e.g., $V^2(t)$). Due to the nature of squares, and thus the nature of self-mixing circuit 1106, the set of squared subsequent signals 1110A, 1110B, 1110C, 1110D, 1110E will always be positive.

The set of squared subsequent signals 1110A, 1110B, 1110C, 1110D, 1110E can be passed to an analog integrator circuit 1120. The analog integrator circuit 1120 can integrate the set of squared subsequent signals 1110A, 1110B, 1110C, 1110D, 1110E within the energy measurement window 1116 to generate an integrated voltage output 1122. The integrated voltage output 1122 can be an analog representation of the total energy within the energy measurement window 1116 over time. In some cases, an accumulator can be used instead of an analog integrator circuit 1120.

In some cases, an optional negative bias current circuit 1124 can be applied to the analog integrator circuit 1120 to offset information not associated with a touch event. The negative bias current circuit 1124 can constantly drain charge out of the analog integrator circuit 1120 during integration. When an optional negative bias current circuit 1124 is used, the voltage output 1122 can be proportional to the energy of the signal minus the energy of the negative bias current circuit 1124.

The voltage output 1122 can be processed by a low-speed ADC 1126. The voltage output 1122 of the integrated energy within the energy measurement window 1116 can remove the need to generate a high frequency digital output and, as a result, the low-speed ADC can use less power and can be fabricated on a smaller chip area.

Figure 12:
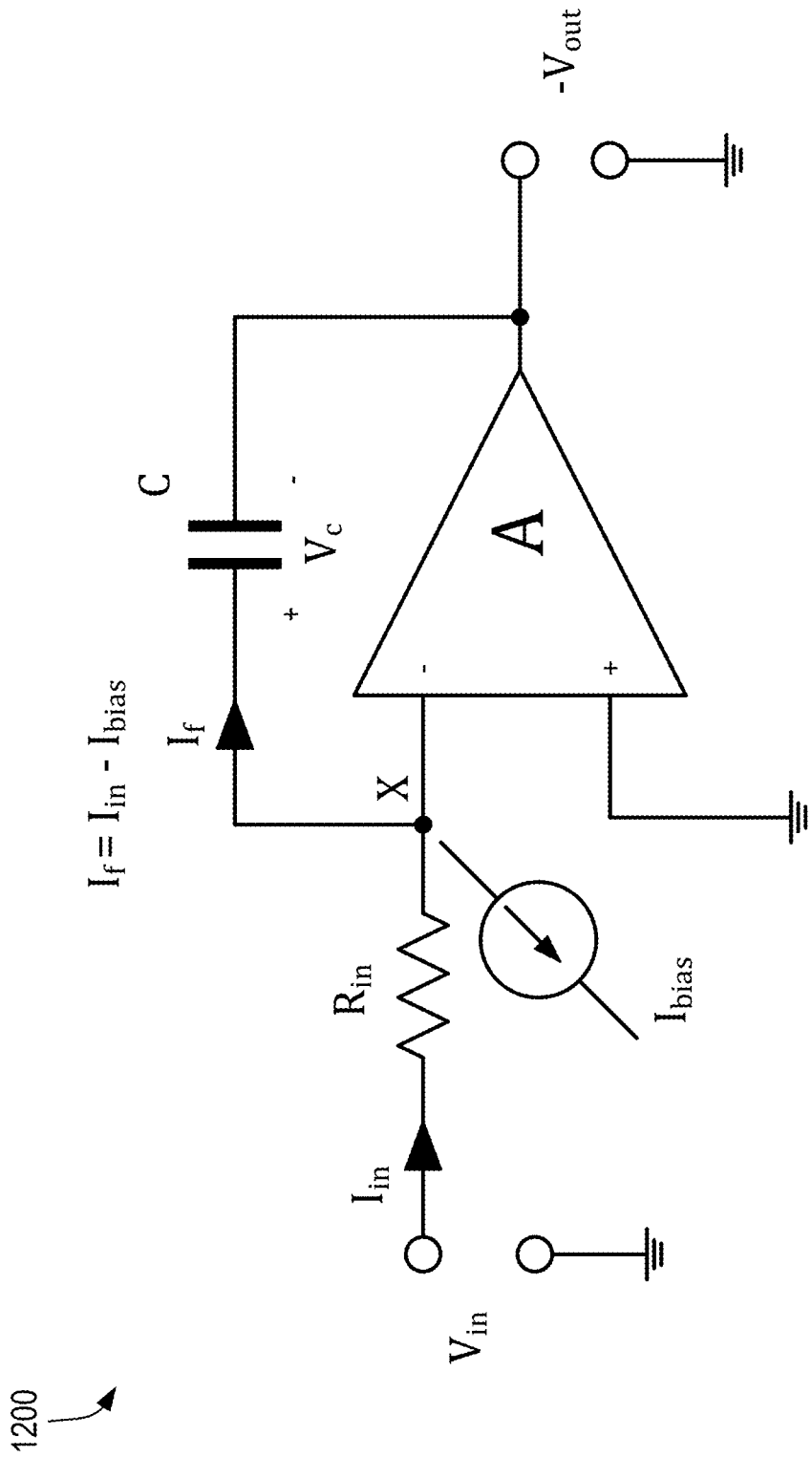
FIG. 12 is a schematic circuit diagram depicting an analog integrator with a negative bias current circuit according to certain aspects of the present disclosure.

FIG. 12 is a schematic circuit diagram depicting an analog integrator 1200 with a negative bias current according to certain aspects of the present disclosure. The analog integrator 1200 negative bias can be the analog integrator circuit 1120 and optional negative bias current circuit 1124 of FIG. 11.

The analog integrator 1200 can receive an input voltage ($V_{in}$) through a resistor ($R_{in}$) to obtain an input current ($I_{in}$). A capacitor (C) can be charged by a charging current ($I_f$) to generate the integrated signal, which can feed the voltage output ($V_{out}$). Item (A) is an op-amp. A negative biasing current ($I_{bias}$) can be applied at point X to drain charge out of the analog integrator 1200, thus resulting in a reduced charging current ($I_f$). Therefore, the charging current can be calculated as $I_f = I_{in} - I_{bias}$.

C. Energy Measurement Windowing

Figure 13:
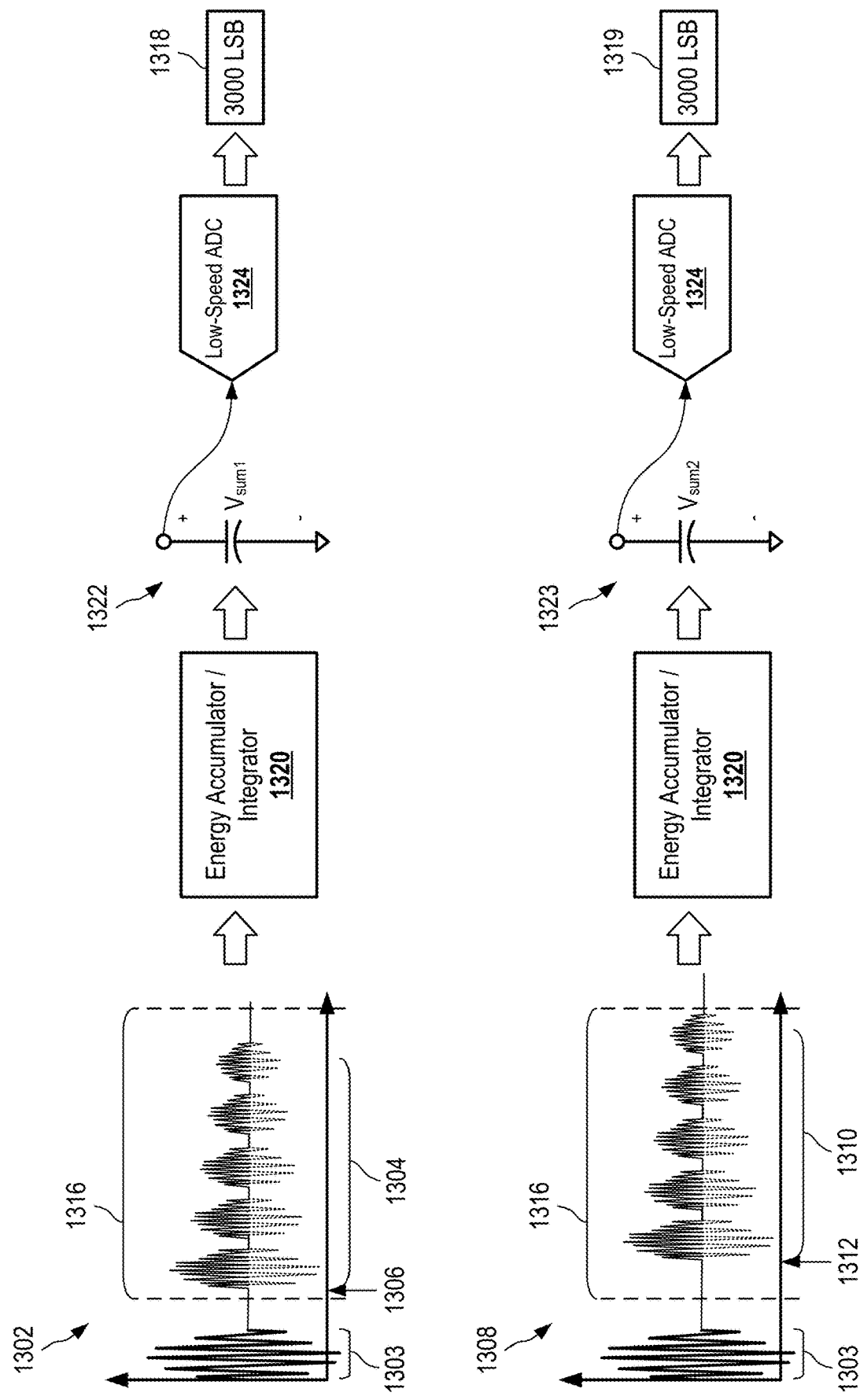
FIG. 13 is a schematic diagram of a flow for processing ultrasound signals depicting the reduced effects of reflected ultrasonic signal time-of-flight changes on touch input detection within an energy measurement window according to certain aspects of the present disclosure.

FIG. 13 is a schematic diagram of a flow for processing ultrasound signals depicting the reduced effects of time-of-flight changes on touch input detection within an energy measurement window according to certain aspects of the present disclosure. In an ultrasound imaging system or proximity detection system, an accurate time-of-flight is critical to determine the distance of objects in a field of view from an ultrasonic transducer. In contrast with imaging and proximity systems, the distance to the first and second surface of the material layer in the ultrasound input device can be provided and a touch input can be detected without accounting for changes in time-of-flight. FIG. 13 shows a first plot 1302 where a first set of reflected ultrasonic signals 1304 is received starting at a first time 1306 and a second plot 1308 where a second set of reflected ultrasonic signals 1310 is received at a second time 1312. A first signal 1303 can be associated with an emitted ultrasonic signal, which occurs prior to the first time 1306 and the second time 1312 of the first plot 1302 and the second plot 1308, respectively. The first set of reflected ultrasonic signals 1304 is passed through an energy accumulator or integrator circuit 1320 to generate an output voltage 1322 (e.g., $V_{sum1}$) that can be fed into a low-speed ADC 1324 and processed to obtain an output value 1318 (e.g., 3000 LSB where LSB stands for least-significant bit). The second set of reflected ultrasonic signals 1310 is passed through an energy accumulator or integrator circuit 1320 to generate an output voltage 1323 (e.g., $V_{sum2}$) that can be fed into a low-speed ADC 1324 and processed to obtain an output value 1319 (e.g., 3000 LSB where LSB stands for least-significant bit). The output values 1318, 1319 can be representative of the pulse reflection energy during the energy measurement windows 1316 of plots 1302, 1308. Despite the different starting times of the first set of reflected ultrasonic signals 1304 and the second set of reflected ultrasonic signals 1310 (e.g., first time 1306 and second time 1312), the output values 1318, 1319 can be the same or substantially the same since the entire first set of reflected ultrasonic signals 1304 and entire second set reflected ultrasonic signals 1310 each fit within the energy measurement window 1316.

Thus, the ultrasound input device can be insensitive to time-of-flight, at least to a degree (e.g., within the energy measurement window). In some cases, advanced windowing techniques, such as those disclosed herein, can further improve the ultrasound input device's insensitivity to time-of-flight. As a result, the surface of the ultrasound input device (e.g., material layer) need not be entirely flat and/or the alignment of the ultrasound input device against a material (e.g., material layer) need not be exactly at 90° (e.g., the angle between the propagation direction of the ultrasonic transducer and the surface of the material layer). Further, the insensitivity to time-of-flight can permit some insensitivity to varying indexes of refraction through which the ultrasonic signals pass (e.g., a material layer having somewhat inconsistent indices of refraction throughout).

As shown in FIGS. 8-11 and 13, the energy of the reflected ultrasonic signals (e.g., reflected echoes and standing waves) is summed or integrated over an energy measurement window. This energy is correlated to the condition of a touch input and thus can be used for input touch detection. The energy measurement window 1316 can be sized to include the pulse time of the ultrasonic signal and account for changes in the time-of-flight due to temperature, stack variations (e.g., variations in the materials making up the ultrasound input device), etc. The energy measurement window 1316 can reduce errors due to variations in the time-of-flight. The ultrasonic touch device can determine input touch contact based on a specific threshold.

Figure 14:
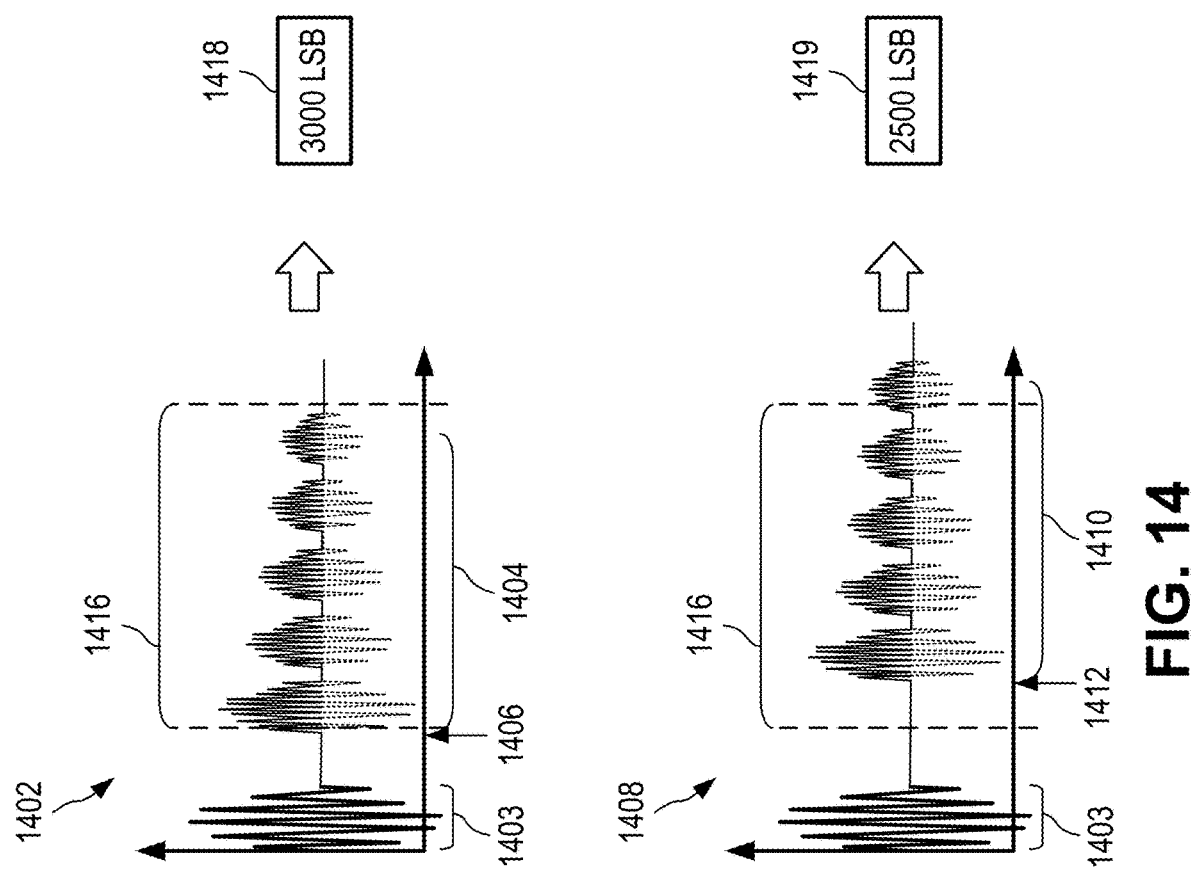
FIG. 14 is a schematic diagram of an abbreviated flow for processing ultrasound signals depicting the heightened effects of reflected ultrasonic signal time-of-flight changes on touch input detection outside of an energy measurement window.

FIG. 14 is a schematic diagram of an abbreviated flow for processing ultrasound signals depicting the heightened effects of reflected ultrasonic signal time-of-flight changes on touch input detection outside of an energy measurement window. FIG. 14 shows a first plot 1402 where a first set of reflected ultrasonic signals 1404 is received starting at a first time 1406 and a second plot 1408 where a second set of reflected ultrasonic signals 1410 is received at a second time 1412. A first signal 1403 can be associated with an emitted ultrasonic signal, which occurs prior to the first time 1406 and the second time 1412 of the first plot 1402 and the second plot 1408, respectively. The first set of reflected ultrasonic signals 1404 can be processed as disclosed herein to obtain an output value 1418 (e.g., 3000 LSB where LSB stands for least-significant bit). The second set of reflected ultrasonic signals 1410 can be processed as disclosed herein to obtain an output value 1419 (e.g., 2500 LSB where LSB stands for least-significant bit). The output values 1418, 1419 can be representative of the pulse reflection energy during the energy measurement windows 1416 of plots 1402, 1408.

As depicted in FIG. 14, because nearly all of the first set of reflected ultrasonic signals 1404 fits within the energy measurement window 1416, but a smaller portion of the second set of reflected ultrasonic signals 1410 fits within the energy measurement window 1416, output value 1418 is greater than output value 1419. As depicted in FIG. 14, the output values 1418, 1419 differ by 500 LSB. If the reflected ultrasonic signals fall outside of the energy measurement window 1416, some of the measured pulses may be cut off from being measured and thus the ultrasound input device may be susceptible to time-of-flight variations (e.g., variations that would cause a difference in first time 1406 and second time 1412).

Figure 15:
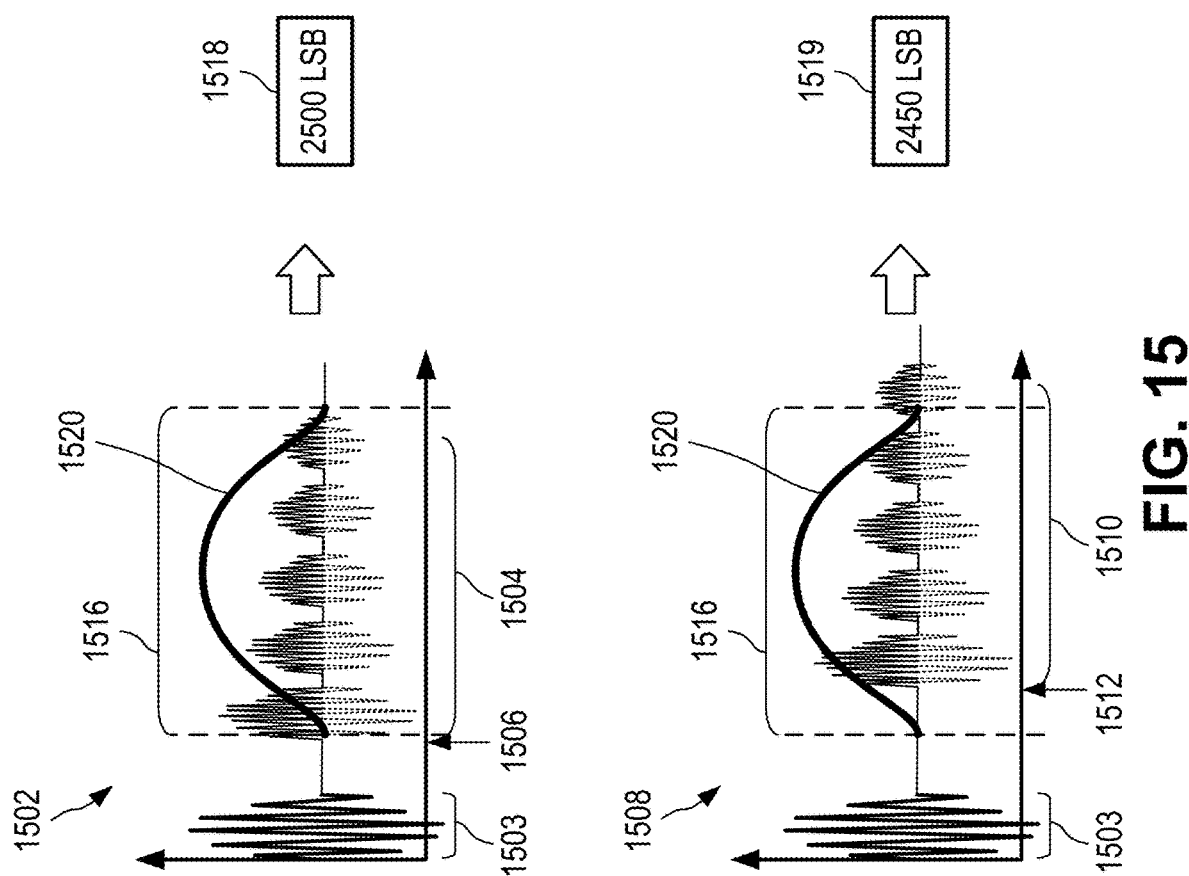
FIG. 15 is a schematic diagram of a flow for processing ultrasound signals depicting the minimal effects of reflected ultrasonic signal time-of-flight changes on touch input detection outside of an energy measurement window when window shaping is used according to certain aspects of the present disclosure.

FIG. 15 is a schematic diagram of a flow for processing ultrasound signals depicting the minimal effects of reflected ultrasonic signal time-of-flight changes on touch input detection outside of an energy measurement window when window shaping is used according to certain aspects of the present disclosure. FIG. 15 shows a first plot 1502 where a first set of reflected ultrasonic signals 1504 is received starting at a first time 1506 and a second plot 1508 where a second set of reflected ultrasonic signals 1510 is received at a second time 1512. A first signal 1503 can be associated with an emitted ultrasonic signal, which occurs prior to the first time 1506 and the second time 1512 of the first plot 1502 and the second plot 1508, respectively. The first set of reflected ultrasonic signals 1504 can be processed as disclosed herein to obtain an output value 1518 (e.g., 2500 LSB where LSB stands for least-significant bit). The second set of reflected ultrasonic signals 1510 can be processed as disclosed herein to obtain an output value 1519 (e.g., 2450 LSB where LSB stands for least-significant bit). The output values 1518, 1519 can be representative of the pulse reflection energy during the energy measurement windows 1516 of plots 1502, 1508.

Unlike FIG. 14, an energy measurement window envelope 1520 is used in conjunction with the energy measurement window 1516. The energy measurement window envelope 1520 scales portions of the signal within the energy measurement window 1516 such that portions near the edges of the energy measurement window 1516 are given less weight than portions near the center of the energy measurement window 1516. Thus, despite small variations near the ends of the energy measurement window 1516, the resultant output values will be mostly based on the signals measured within the center of the energy measurement window 1516. The energy measurement window envelope 1520 is depicted in FIG. 15 as having a particular flared bell shape, although any suitable shape can be used, including symmetrical and non-symmetrical shapes. The vertical extent of the energy measurement window envelope 1520 as depicted in FIG. 15 can represent any suitable scale, such as 0% to 100%. In some cases, the energy measurement window envelope 1520 can include amplifying signals near the center of the energy measurement window 1516, such as to values above 100% of the original signal at that time.

As depicted in FIG. 15, because of the use of an energy measurement window envelope 1520, the signals (e.g., first set of reflected ultrasonic signals 1504 and second set of reflected ultrasonic signals 1510) are weighted so the portions of the signals nearest the center of the energy measurement window 1516 are given more weight than the portions nearest the edges of the energy measurement window 1516, thus de-emphasizing any portions cut off by the start or end of the energy measurement window 1516. As a result, the output values 1518, 1519 are much closer than output values 1418, 1419 of FIG. 14. As depicted in FIG. 15, the output values 1518, 1519 only differ by 50 LSB. Thus, as a result of an energy measurement window envelope 1520, the ultrasound input device can become less susceptible to time-of-flight variations.

Figure 16:
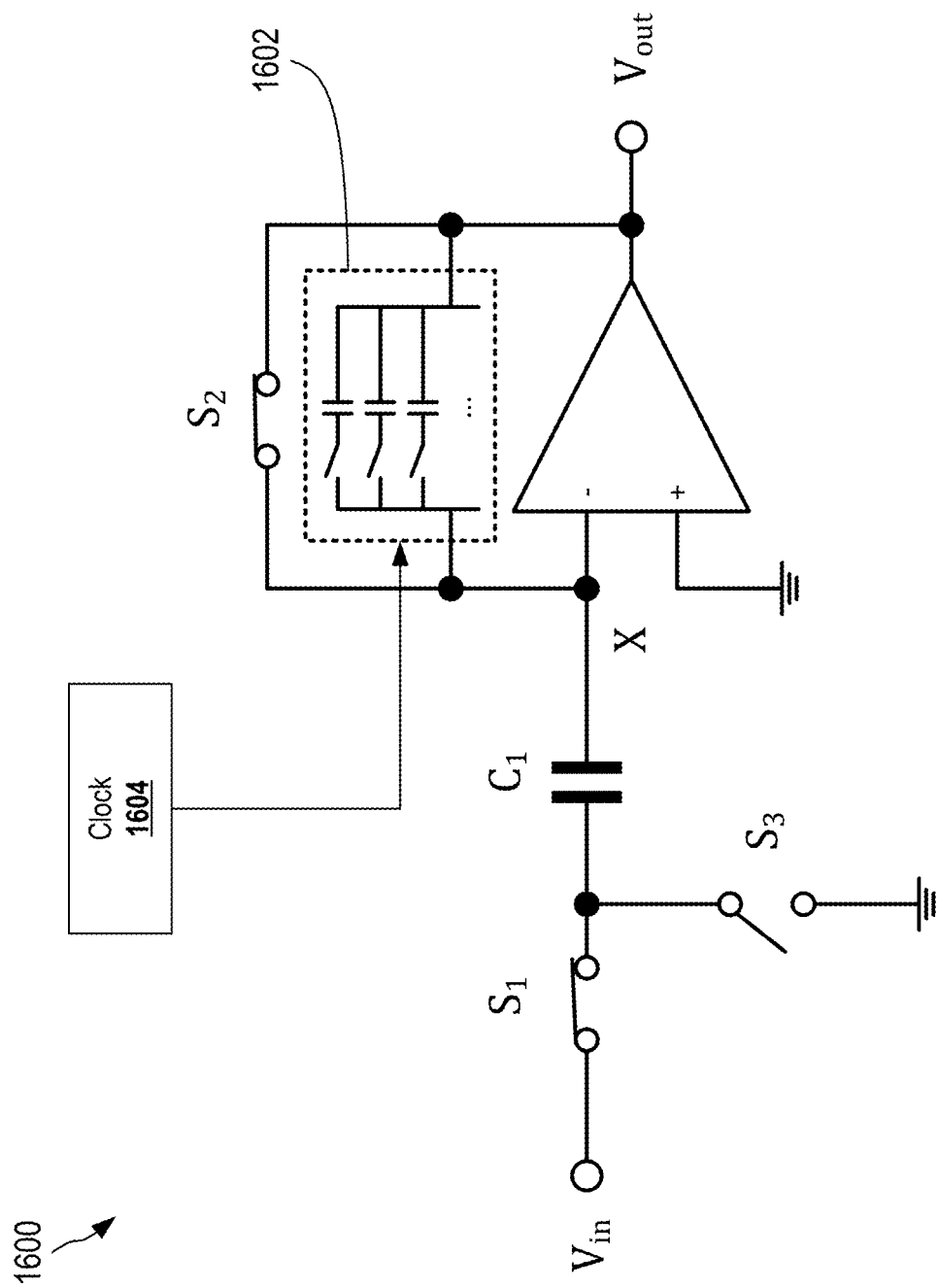
FIG. 16 is a schematic circuit diagram depicting a window shaping circuit according to certain aspects of the present disclosure.

FIG. 16 is a schematic circuit diagram depicting a window shaping circuit 1600 according to certain aspects of the present disclosure. The window shaping circuit 1600 can generate an energy measurement window having an energy measurement window envelope (e.g., energy measurement window 1516 having energy measurement window envelope 1520 of FIG. 15). The window shaping circuit 1600 can operate as a traditional analog accumulator circuit with the addition of an adjustable capacitor 1602. The adjustable capacitor 1602 can take any suitable form, such as a switched ladder of different sized capacitors. The choice of capacitor size for adjustable capacitor 1602 over time can result in an adjustment of gain on the analog accumulator circuit over time. In some cases, the adjustable capacitor 1602 can be driven by a clock 1604 or other source to determine when to chance capacitance. In some cases, the adjustable capacitor 1602 can be used with an analog sampling circuit, such as analog sampling circuit 1006 of FIG. 10, and the adjustable capacitor 1602 can be changed with different sample numbers (e.g., n of V(n)).

Figure 17:
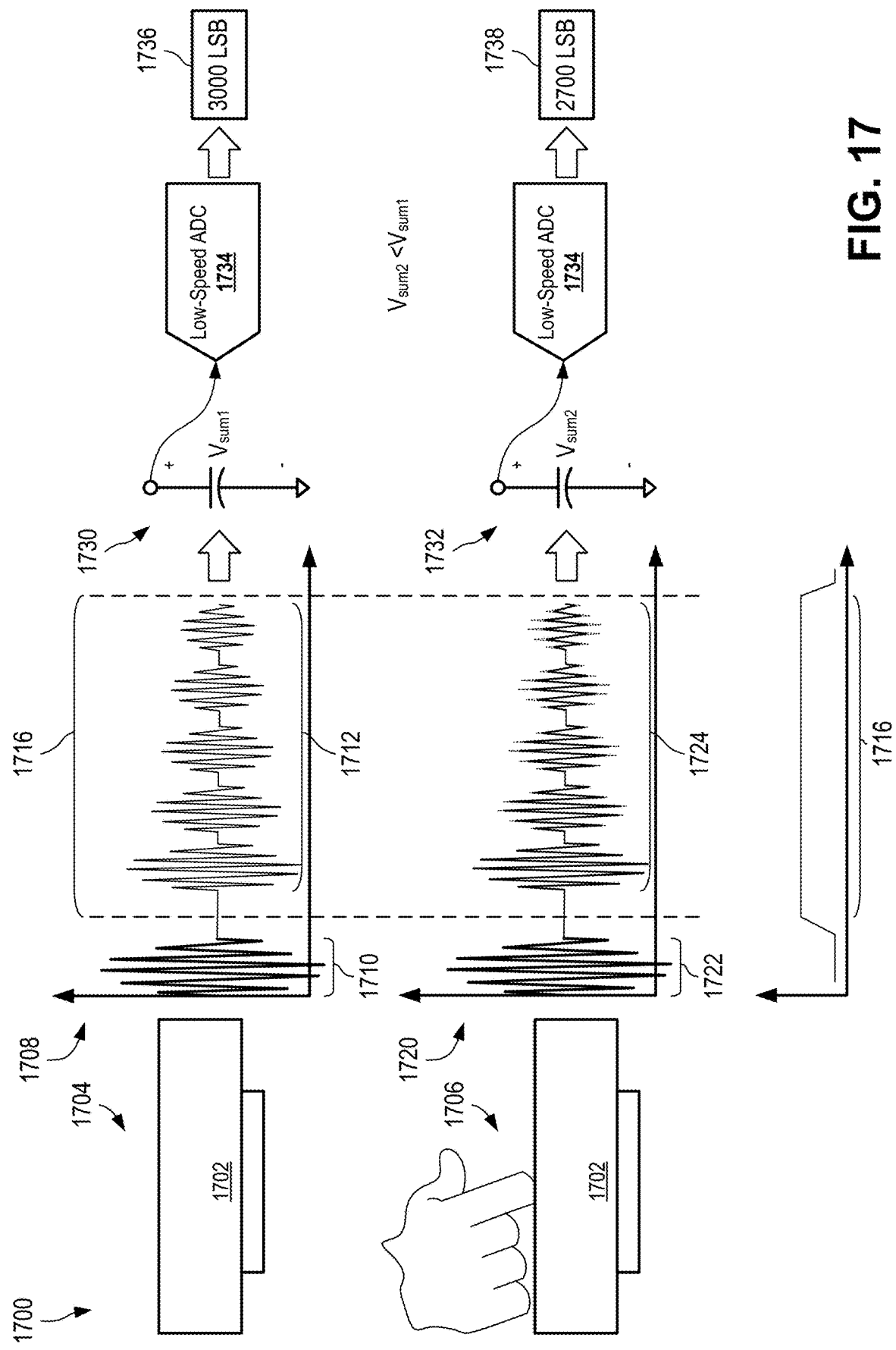
FIG. 17 is a schematic diagram depicting a flow for processing ultrasound signals to detect a touch input using the amplitude of reflected ultrasonic signals according to certain aspects of the present disclosure.

FIG. 17 is a schematic diagram depicting a flow 1700 for processing ultrasound signals to detect a touch input using the amplitude of reflected ultrasonic signals according to certain aspects of the present disclosure. FIG. 17 shows an ultrasound input device 1702 with no touch input 1704 and with a touch input 1706. A first plot 1708 associated with the ultrasound input device 1702 with no touch input 1704 shows a transmitted signal 1710 and a first set of reflected signals 1712. The first set of reflected signals 1712 can be processed to generate an output voltage 1730 (e.g., $V_{sum1}$) associated with the first set of reflected signals 1712, which can be provided to a low-speed ADC 1734 and further processed to generate a first output 1736. The first output 1736 can be representative of the energy of the first set of reflected signals 1712 within the energy measurement window envelope 1716. A second plot 1720 shows a transmitted signal 1722 and a second set of reflected signals 1724. The second set of reflected signals 1724 can be processed, as disclosed herein, to generate an output voltage 1732 (e.g., $V_{sum2}$), which can be provided to a low-speed ADC 1734 and further processed to generate a second output 1738. The second output 1738 can be representative of the energy of the second set of reflected signals 1724 within the energy measurement window envelope 1716.

An energy measurement window envelope 1716 (e.g., an envelope similar to energy measurement window envelope 1520 of FIG. 15) can be applied to the first set of reflected signals 1712 and the second set of reflected signals 1724. In some embodiments, the energy measurement window envelope 1716 can be applied to the first set of reflected signals 1712 and the second set of reflected signals 1724 to de-emphasize signals at the edges of the energy measurement window envelope 1716.

The first output 1736 and the second output 1738 can be compared to determine whether a touch input (e.g., touch event) has occurred. For example, if the second output 1738 is lower than the first output 1736 by a predetermined amount and/or if the second output 1738 is lower than a threshold value, the ultrasound input device 1702 can generate a signal indicating a touch input is present on a surface. Since the output voltages 1730, 1732 are indicative of the first output 1736 and second output 1720, respectively, the output voltages 1730, 1732 can be used to determine whether a touch input has occurred. In some embodiments, only a single output, such as the first output 1718, can be compared to a reference value. The reference value can be established at the time of manufacturing and/or be updated based on background characteristics measured by or communicated to the device, such as temperature.

The techniques described with reference to FIG. 17 can be used to generate an output signal from an ultrasound input device 1702, although other techniques can be used. Any technique that can convert the signals associated with the first set of reflected signals 1712 or the second set of reflected signals 1724 to a measurement of total energy can be used.

D. Touch Input Error Prevention

Figure 18:
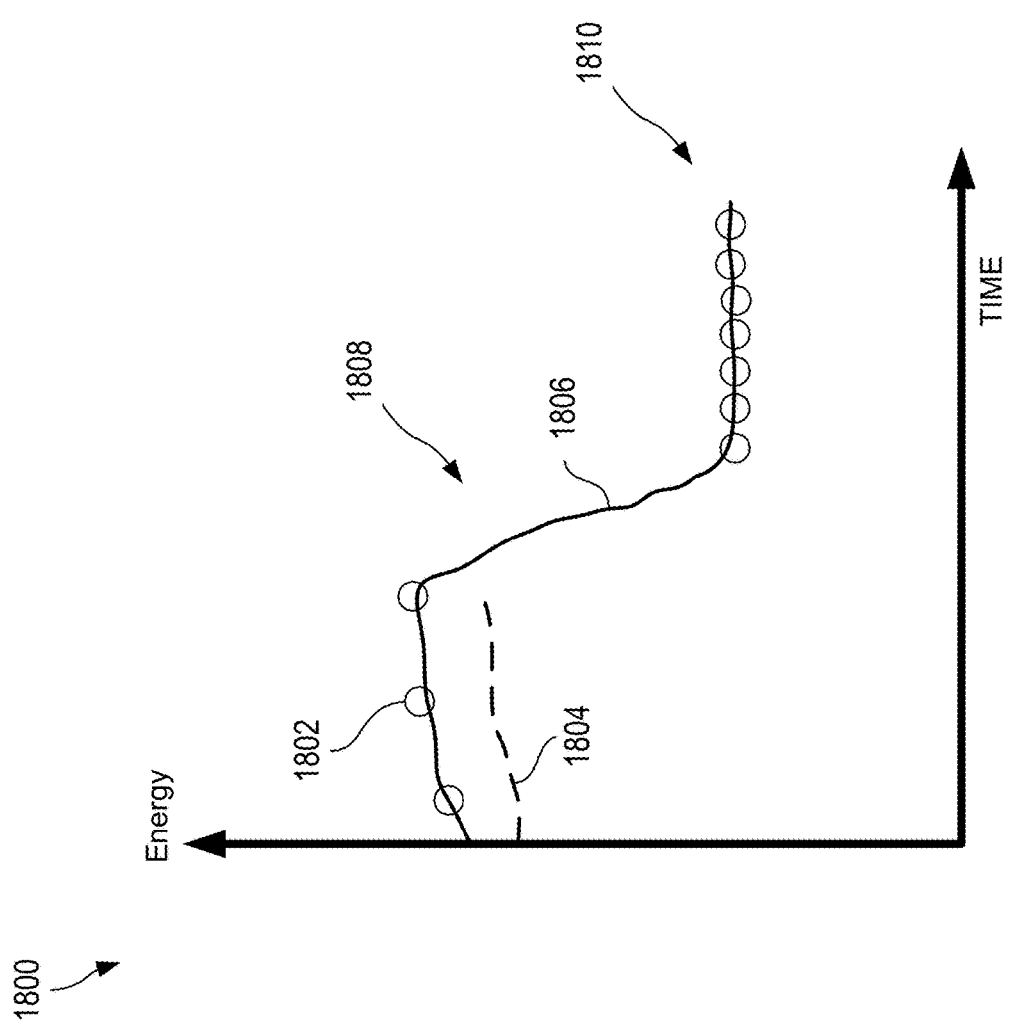
FIG. 18 is a chart depicting reflected ultrasonic signal measurements made using an ultrasound input device and illustrating techniques to improve touch input detection according to certain aspects of the present disclosure.

FIG. 18 is a chart 1800 depicting reflected ultrasonic signal measurements made using an ultrasound input device and illustrating techniques to improve touch input detection according to certain aspects of the present disclosure. The sensor readout (e.g., DC signal or other sensor data) determined by the ultrasound input device can be measured continuously or at a specific frequency depending on the application. In some embodiments, the sensor readout can be measured at a frequency of 100 Hz. An individual measurement 1802 can correspond to the energy measurement within an energy measurement window. One or more individual measurements can be used to determine a current state 1806. The current state can be defined by the current individual measurement 1802 or by a best-fit line based on two or more individual measurements. In some embodiments, the best-fit line can be calculated using a least-squares method. A plurality of individual measurements can be used to determine a moving average threshold 1804.

The current state 1806 and the moving average threshold 1804 can be used to detect a touch event. The moving average threshold 1804 can be used to determine a sudden signal drop that can trigger a touch input event. For example, the system can detect a "hand-touch" effect only if a "rapid signal change" 1808 from a current state 1806 is detected. A rapid signal change 1808 can be associated with a sudden signal drop on all or many channels, and can be considered a touch input event. A threshold to detect the rapid signal change 1808 can be the moving-average threshold 1804 when no hand-touch event is detected. (Dynamic threshold). In some embodiments, the rapid signal change 1808 can be a pre-programmed static threshold. The rapid signal change 1808 event can trigger a touch input event and cause the ultrasound input device to generate a signal indicating a touch input on a surface of the device. For a rapid signal change 1808 event, multiple measurements 1810 are made to ensure signal did actually drop and does not jump back up, such as to its original value. For example, a hard press by a user may result in a dropping sensor readout, but will still provide a continuous signal. During the multiple measurements 1810, if the signal rapidly returns to a higher value, such as the value previously seen before the suspected touch event, the ultrasound input device can recognize the temporary signal drop as a false touch event and not classify it as a touch event. Multiple measurements 1810 can occur over a very short timeframe (e.g., on the order of tens or hundreds of milliseconds). In some embodiments, a "gradual signal change" can be treated as temperature change but not hand touch event because the moving average will adjust with each individual measurement 1802 at a rate based on the number of measurements used to determine the moving average.

In some cases, a threshold 1804 can be based on a calculation other than a moving average calculation. In some cases, the threshold 1804 is simply some function of past history (e.g., historical measurements), such as a function of the past x number of measurements. In some cases, past measurements can be weighted, such as more recent measurements being weighted higher than measurements taken longer ago. In such cases, the response time of the ultrasound input device can be adjusted based on the weightings of the past x measurements. For example, a threshold can be calculated as a function of historical values according to Threshold=$f(X[n-1], X[n-2], \ldots, X[n-m])$ where $X[n]$ is the n-th sensor readout (or the current sensor readout). In another example, the threshold can be calculated as a function of weighted historical values according to Threshold=$w_1 X[n-1]+w_2 X[n-2], \ldots, w_m X[n-m]$ where $w_n$ is a weighting parameter for the n-th sensor readout. In some cases, weighting parameters can be trained using machine learning, such as described in further detail herein.

In some cases, in addition to or instead of determining a rapid signal change 1808 based on measurements themselves, the determination can be made using a slope of a set of measurements, such as a slope of the current measurement and some number of past measurements.

Figure 19:
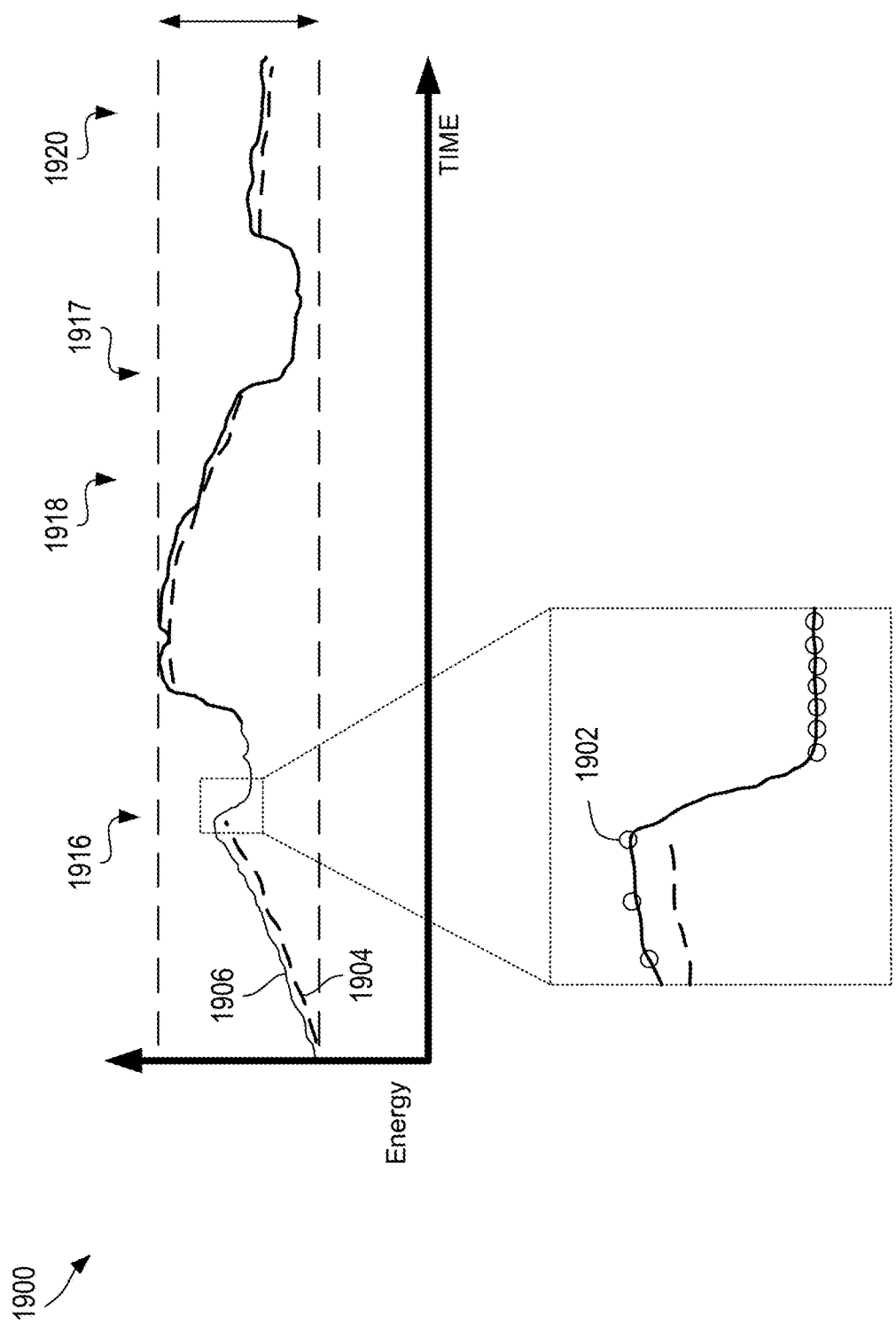
FIG. 19 is a chart depicting reflected ultrasonic signal measurements made using an ultrasound input device and illustrating additional techniques to improve touch input detection according to certain aspects of the present disclosure.

FIG. 19 is a chart 1900 depicting reflected ultrasonic signal measurements made using an ultrasound input device and illustrating additional techniques to improve touch input detection according to certain aspects of the present disclosure. A portion of chart 1900 is depicted as chart 1800 of FIG. 18. Chart 1900 shows that signal variation over time may occur due to various factors, such as temperature changes, however the ultrasound input device may be able to discern that these variations are not touch events. However, sudden signal drops between consecutive measurements can be indicative of a touch event. Current state 1906 can be similar to current state 1806 of FIG. 18. The moving average threshold 1904 can be similar to threshold 1804 of FIG. 18. This threshold 1904 can be based in part on a moving average of previous measurements of the current state 1906, such as a moving average of previous measurements offset by a given amount. This type of threshold 1904 can be known as a dynamic threshold, although other threshold techniques can be used.

At region 1916, a touch event occurs. When the touch event occurs, the current state 1906 quickly drops. As depicted in the callout portion of chart 1900, various measurements 1902 are shown. Each measurement 1902 can be separated in time based on a measurement frequency. For example, each measurement 1902 can be 0.01 seconds apart (e.g., at 100 Hz), although other frequencies can be used. A sudden drop can be detected between two or more consecutive measurements 1902. When the sudden drop in current state 1906 falls below the threshold 1904, a touch event can be considered to have occurred. Region 1917 depicts another touch event.

At region 1918 and region 1920, gradual changes in temperature of the ultrasonic sensor and surface to which the sensor is coupled can result in gradual changes in current state 1906. Because of the relatively slow changes in the current state 1906, the threshold 1904, which is based on a moving average of the current state 1906, will make changes as well. Since the threshold 1904 is able to compensate for slow changes in the current state 1906, such as those that occur due to temperature changes, these slow changes in current state 1906 do not pass the threshold 1904 and therefore do not trigger touch events. Furthermore, since the threshold 1904 is dynamically updating, the threshold 1904 is able to operate properly at different temperatures. In some cases, changes in current state 1906 due to temperature variation can be even larger than contrast resulting from an actual hand touch, but since these temperature variations are much slower than the changes in current state 1906 due to a touch event, they are not detected as touch events.

III. Multifrequency Touch Detection

FIG. 20 is a chart depicting a temperature dependence of reflected ultrasonic signals according to certain aspects of the present disclosure. The reflected ultrasonic signals received by an ultrasound input device can include the main signal 2002 and any unwanted signals 2004. The main signal travels a first path through the material layer and is associated with a first time-of-flight (TOF) and any unwanted signals 2004 travel a second path through the material layer and are associated with a second TOF. The speed of sound in a material layer depends on the temperature of the material layer. Due to speed of sound changes as a result of temperature changes, the main signal 2002 and the unwanted signals 2004 travel through different acoustic paths, and the associated first TOF and second TOF change a different amount accordingly. This creates a net TOF difference $\Delta t(T)$ 2006 between the main signal 2002 and the unwanted signal 2004 which change with temperature T. This then translates into a phase delay difference $\Delta \phi(T)$ between the main signal 2002 and the unwanted signal 2004. And thus yields different integrated signal strength difference Dout(T) as depicted by line 2010.

Figure 21:
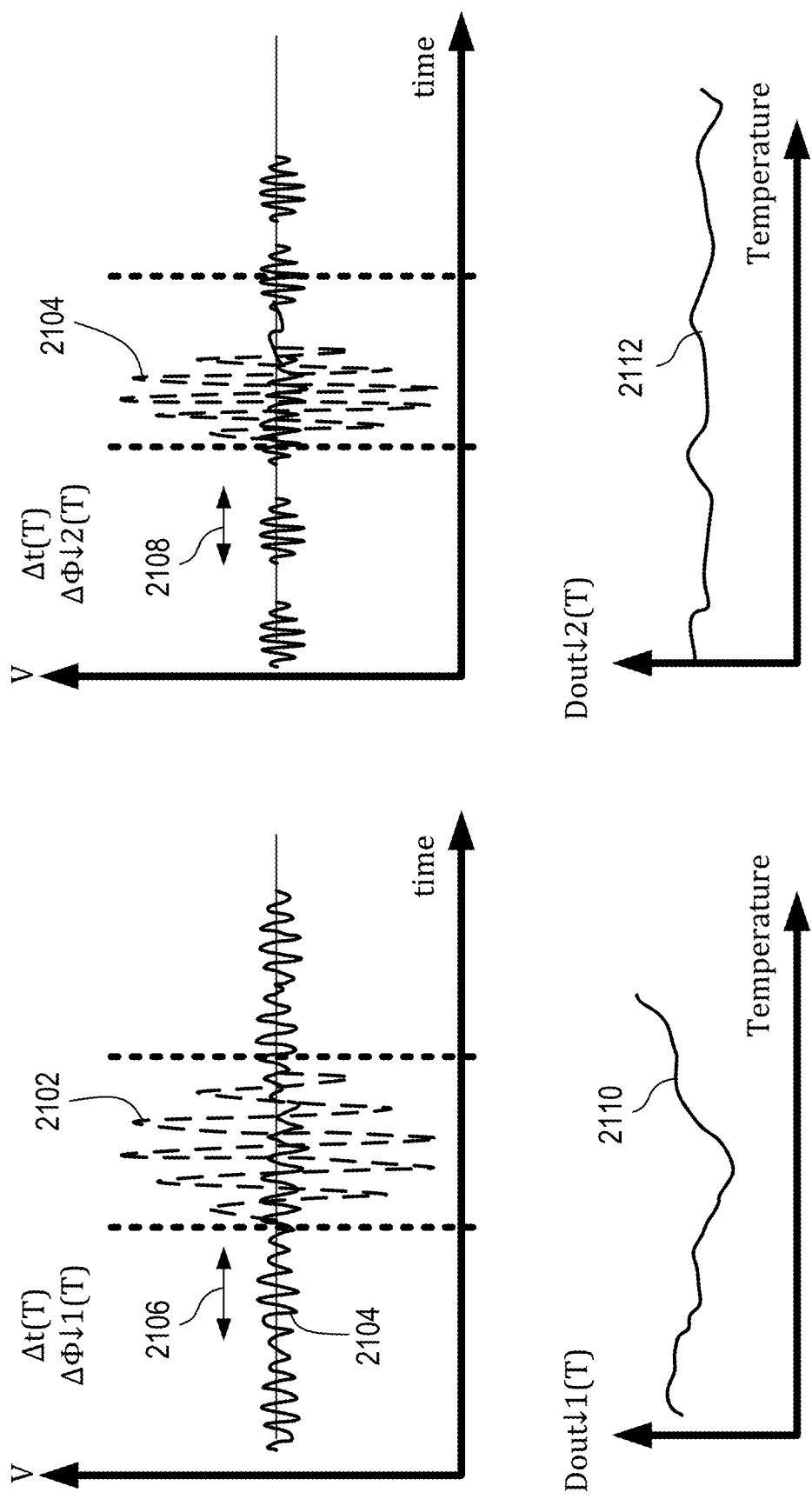
FIG. 21 is a set of charts depicting time-of-flight temperature dependence of a two frequency method of detecting a touch input according to certain aspects of the present disclosure.

FIG. 21 is a set of charts depicting TOF temperature dependence of a two frequency method of detecting a touch input according to certain aspects of the present disclosure. The charts can be similar to the charts of FIG. 20. In a multi-frequency ultrasound input device, different frequencies will have different temperature effects resulting in a different TOF for each signal. The multi-frequency ultrasound input device can process a "finger touch" (e.g., touch event) when a signal drop is detected in a threshold number of frequency channels. For example, two different methods can detect whether a finger touched the ultrasound touch input device, and the device can only process the touch event when both of the methods agree finger touch has been detected.

In a multi-frequency ultrasound touch input device, a first signal 2102 at a first frequency and a second signal 2104 at a second frequency have different background and temperature drift characteristics. For example, the first signal 2102 and the second signal 2104 experience the same $\Delta t(T)$ when temperature changes. As a result of the different temperature drift characteristics, the same $\Delta t(T)$ will translate to a different phase delay for each frequency. For example, the first signal 2102 will have a first phase delay of $\Delta \phi \downarrow 1(T)$ 2106 and the second signal 2104 will have a second phase delay $\Delta \phi \downarrow 2(T)$ 2108. The resulting difference in the phase delay can cause two different ADC output value patterns over temperature Dout$\downarrow 1(T)$ and Dout$\downarrow 2(T)$, as depicted by lines 2110, 2112, respectively.

Therefore, signal drop can be measured in multiple frequencies in order to increase touch detection reliability and reduce false trigger detection. A touch input event can be processed if all the frequency channels detect a sudden signal drop. The multiple measurements can occur very fast (<1 ms) to make sure the sudden signal drop is not due to temperature effects.

The multi-frequency ultrasound touch input device can avoid false triggers by reducing noise associated with environmental conditions. The touch input device can immediately execute a rapid pulse-echo test to ensure the touch event is real but not a false trigger due to noise. In some embodiments, the multiple tests can happen within 1 ms.

Figure 22:
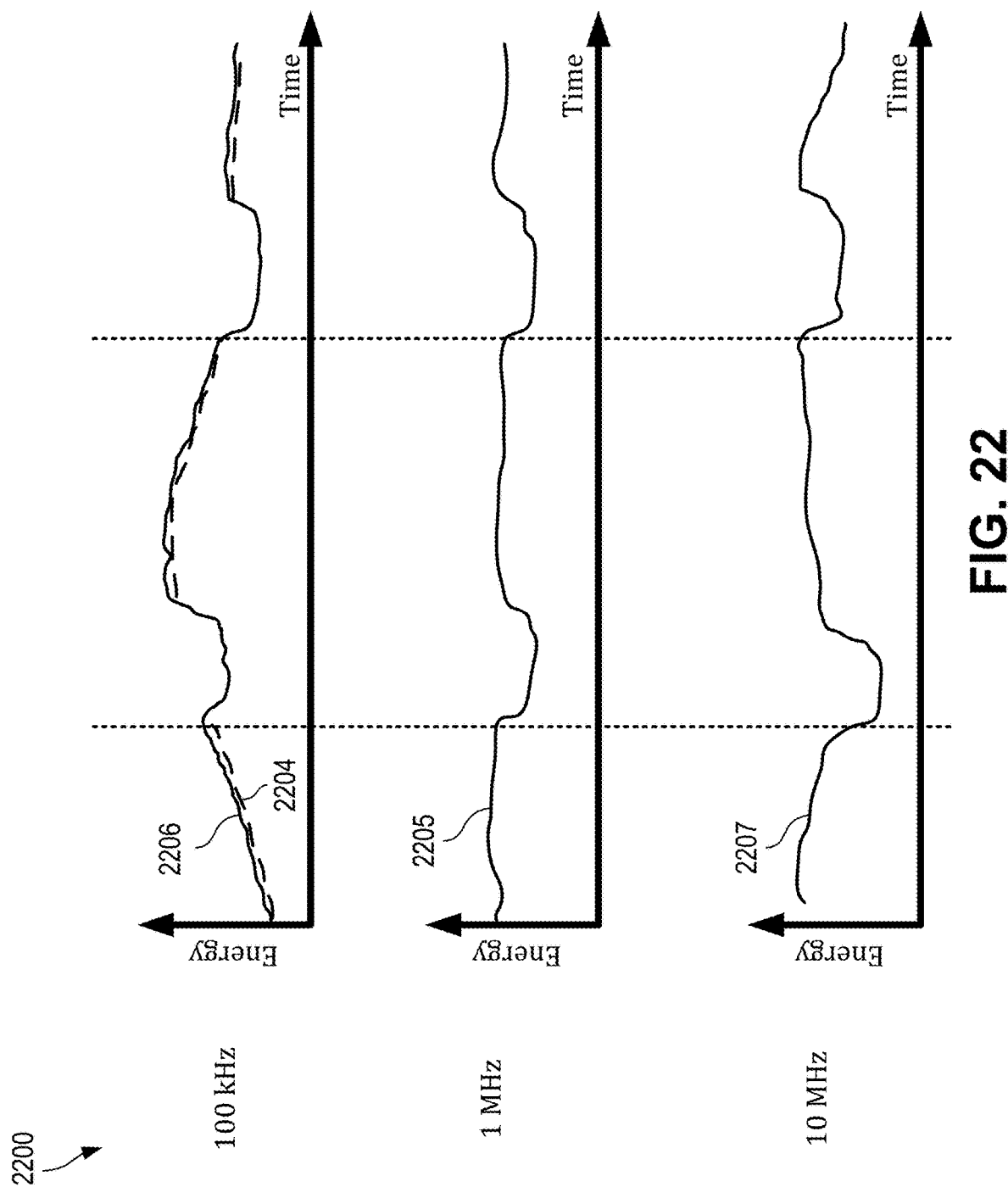
FIG. 22 is a chart depicting reflected ultrasonic signal measurements made across several frequencies using an ultrasound input device and illustrating techniques to improve touch input detection according to certain aspects of the present disclosure.

FIG. 22 is a multi-part chart 2200 depicting reflected ultrasonic signal measurements made across several frequencies using an ultrasound input device and illustrating techniques to improve touch input detection according to certain aspects of the present disclosure. Different frequencies of ultrasonic signals can exhibit different variation due to temperature changes. Thus, by sensing using multiple ultrasonic frequencies, the ultrasound input device can compare a suspected touch event with the data from one or more other frequencies to ensure the suspected touch event is confirmed by the one or more other frequencies. The use of multiple frequencies can reduce error rates.

Line 2206 can represent energy signals associated with a 100 kHz frequency, line 2205 can represent energy signals associated with a 1 MHz frequency, and line 2207 can represent energy signals associated with a 10 MHz frequency. Line 2204 can represent a moving average threshold, such as threshold 1804 from FIG. 18. For illustrative purposes, a moving average threshold is only depicted with respect to the 100 kHz frequency, but respective thresholds can exist for each frequency used (e.g., 1 MHz and 10 MHz). While the frequencies 100 kHz, 1 MHz, and 10 MHz are used with respect to FIG. 22, any other suitable frequencies can be used. While three different frequencies are used with respect to FIG. 22, any number of different frequencies, such as two or greater than three, can be used. A touch event may be registered only if the touch event is detected across all, a majority of, or at least a threshold percentage of different frequencies being used for detection.

In some cases, instead of or in addition to driving an ultrasound input device at different frequencies, the ultrasound input device can drive an ultrasonic array with different phase delays to generate different beampatterns. Since different beampatterns can have different temperature characteristics, different beampatterns can be used similar to different frequencies to reduce error and confirm suspected touch events.

Figure 23:
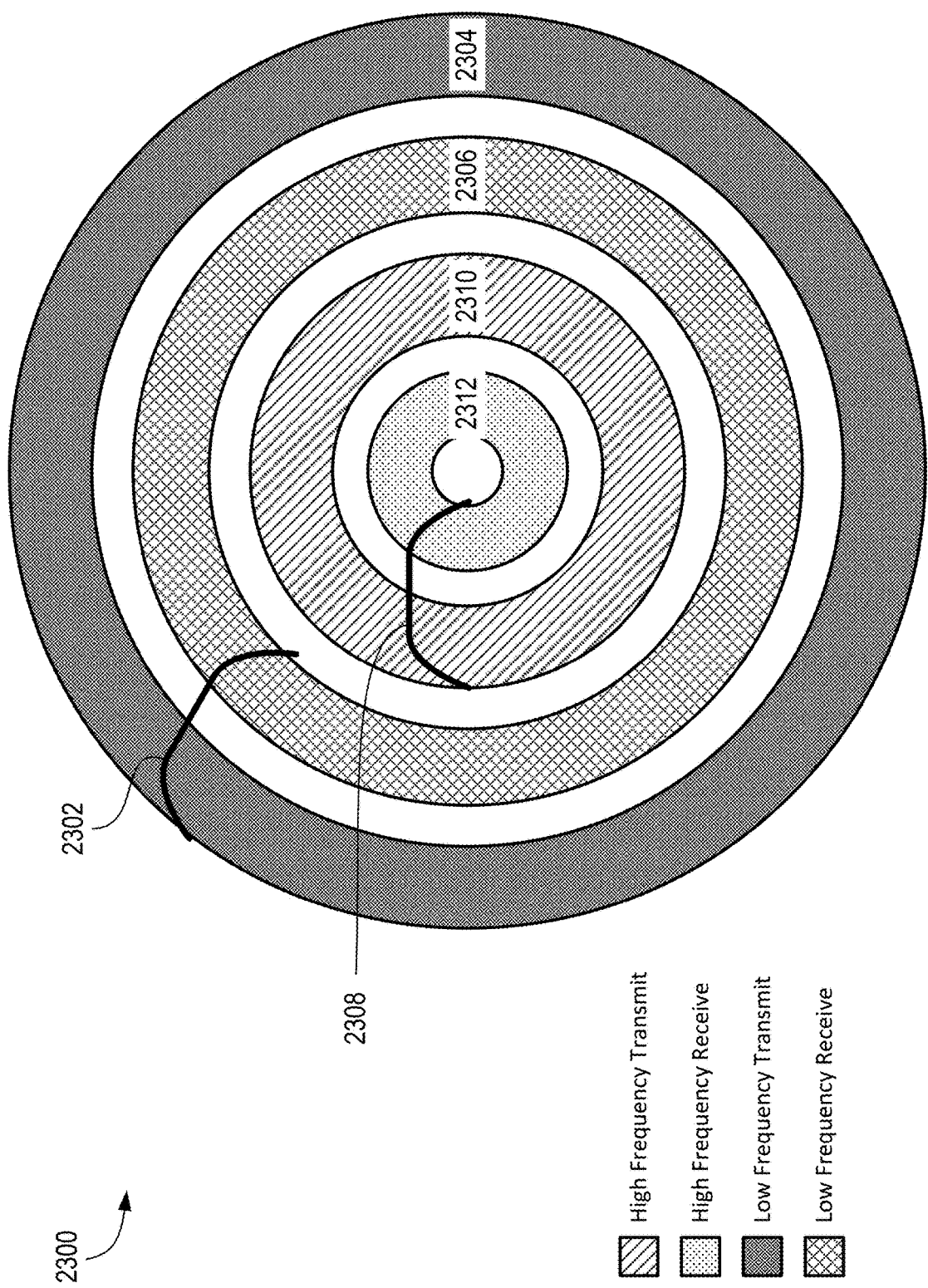
FIG. 23 is a schematic plan view depicting a two-frequency PMUT with a concentric-circular design according to certain aspects of the present disclosure.

FIG. 23 shows a plan view of a two-frequency PMUT 2300 according to certain aspects of the present disclosure. In some embodiments, a circular PMUT design can be fabricated to achieve multi-frequency transducers. The circular PMUT design can consist of multiple individual channels for transmit and receive per frequency. In some cases, the multiple channels or transducers can be arranged concentrically. For example, the two-frequency PMUT 2300 includes a first transmit/receive pair 2302 associated with a low frequency. The first transmit/receive pair 2302 can include a low frequency transmit ring 2304 and a low frequency receive ring 2306. The two-frequency PMUT 2300 also includes a second transmit/receive pair 2308 associated with a high frequency. The second transmit/receive pair 2308 can include a high frequency transmit ring 2310 and a low frequency receive ring 2312. In various embodiments, a circular PMUT design can include a range of multiple frequencies from 2 to 10. The range of frequencies can be from 1 MHz to 10 MHz. In some embodiments, frequencies less than 1 MHz can be used depending on the material layer and specific application. A second PMUT array can be added for TOF measurement at the 1-3 MHz range. In some cases, the ranges of frequencies used for any array can be from 30 kHz to 50 Mhz.

Figure 24:
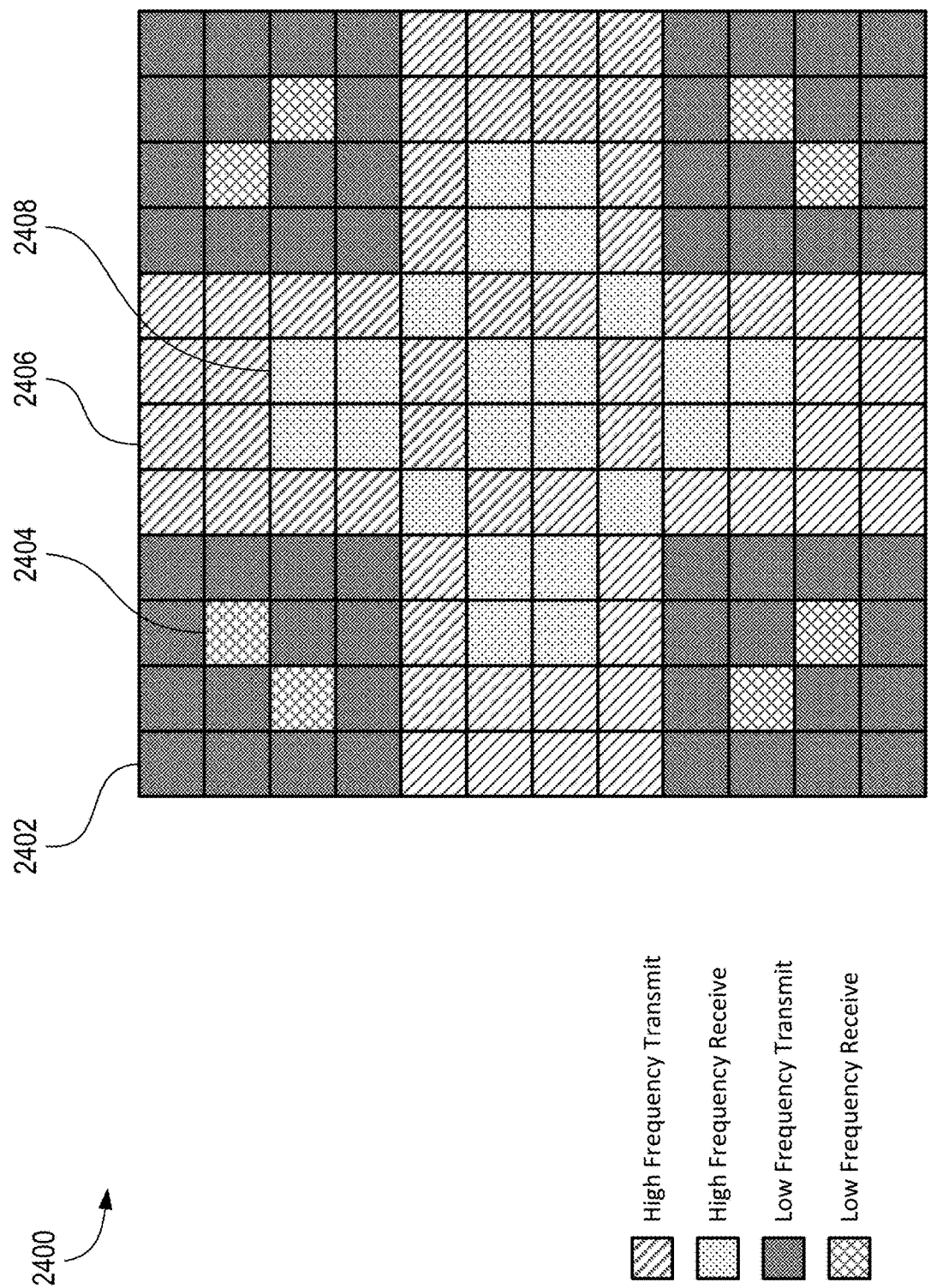
FIG. 24 is a schematic plan view depicting a multi-frequency ultrasound input device with a square design according to certain aspects of the present disclosure.

FIG. 24 is a schematic plan view depicting a multi-frequency ultrasound input device 2400 with a square design according to certain aspects of the present disclosure. The square sensor design can consist of a square grid of multiple individual channels for transmit and receive per frequency. In some cases, one or more receiving channels can be positioned between multiple transmitting channels. In such cases, the position of a receiving channel between multiple transmitting channels can facilitate receiving and detecting reflected signals. In an example, the multiple-frequency ultrasound input device 2400 can include various low-frequency transmitters 2402, low-frequency receivers 2404, high-frequency transmitters 2406, and high-frequency receivers 2408. The square design can include nested patterns, such as the cross-shaped nested pattern depicted in FIG. 24. Any other suitable pattern can be used. The various transmitters and receivers can be any suitable frequency, such as between 30 kHz to 50 MHz, 1 MHz to 10 MHz, or any other suitable range.

IV. Feature Extraction

Systems and methods, according to embodiments of the invention, can allow for the extraction of features from signals, for example, received by an ultrasound input device. The ultrasound input device can be capable of extracting features such as energy signals as well as physical characteristics.

A. Discernable Energy Signals

FIG. 25 is a set of three charts 2502, 2504, 2506 depicting example signals 2512, 2514, 2516 received by an ultrasound input system attributable to three different users according to certain aspects of the present disclosure. Each of the charts 2502, 2504, 2506 depicts energy measurements over time associated with reflected signals detected by an ultrasound input device.

Signal 2512 of chart 2502 is an example of a dry finger quickly pressing with a relatively small force. The dryness of the finger and the relatively small force show a relatively smaller dip in the energy measurements during the touch event. The speed of the press is seen in the relatively short duration of the dip in the energy measurements.

Signal 2514 of chart 2504 is an example of a wet finger moderately pressing with relatively hard force. The wetness of the finger and the intensity of the press can both lead to a greater dampening effect on the reflected signals, and thus a deeper dip in the energy measurements. The speed of the press is seen in the moderately wide dip in the energy measurements. Further, the more noticeable presence of an initial drop and subsequent drop when the energy measurements first dip is indicative of a small amount of time spent in contact with the surface before the full force of the press is initiated.

Signal 2516 of chart 2506 is an example of a touch event pattern where a user lightly touches the surface before pressing and initiating the full touch event. The initial dip and relatively long delay until the subsequent, full dip in the energy measurements is indicative that the user placed a finger on the surface and waited a short time before pressing the finger down.

While signals 2512, 2514, 2516 can each be used to indicate a desired touch event due to the presence of a sufficient dip in energy measurements, each of the signals 2512, 2514, 2516 contains various features that are discernable. Examples of discernable features include depth of the dip in energy measurements, width of the dip in energy measurements, the presence of an initial dip before a subsequent and deeper dip in energy measurements, the delay between an initial dip and a subsequent and deeper dip in energy measurements, velocity of decrease and/or increase of energy measurements into and out of the dip (e.g., velocity of change in energy signal at the edge of the dip), or any other features of the energy measurements.

By extracting various features from energy measurement signals, it can be possible to distinguish and even recognize different users, enabling additional user-based advanced functionality. For example, after a training session, an ultrasound input system may be able to distinguish a first user and a second user due to the particular ways the users interact with the ultrasound input device, such as the style of touch (e.g., quick tap or place and press), duration of the touch, characteristics of the skin (e.g., natural wetness or dryness of a finger), intensity of the touch (e.g., light press or hard press), or other characteristics discernable from the energy measurement signals. While there characteristics may be discernable from the energy measurement signals, they may not be readily perceivable to a user due to the high speeds at which the energy measurement signals can be taken. Therefore, the difference between a quick tap and a place and press may be easily discernable from the energy measurement signals, but may be non-discernable or not easily discernable from a visual inspection of the touching action.

Figure 26:
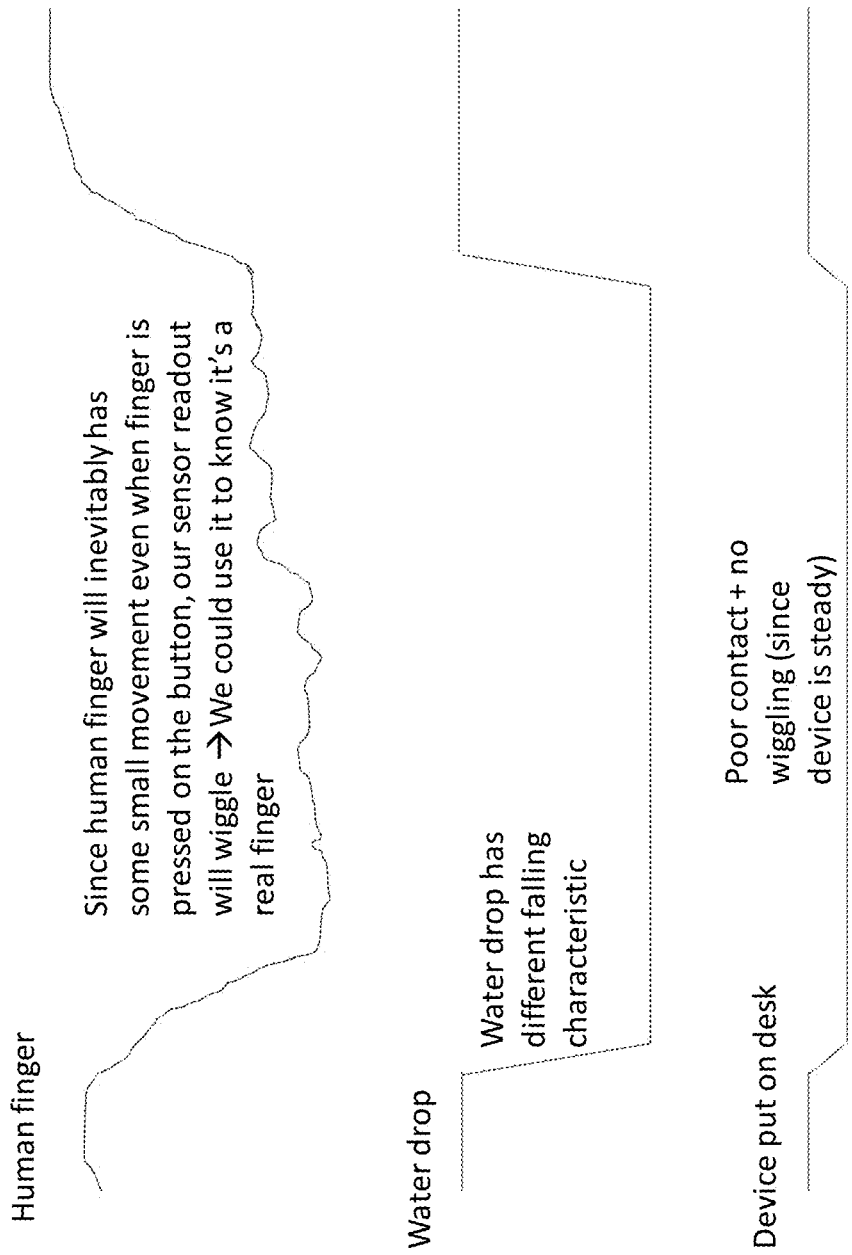
FIG. 26 is a set of charts depicting energy measurement signals associated with a human finger, a water drop, and placing a device on a desk (e.g., placing an object over a sensor).

FIG. 26 is a set of charts depicting energy measurement signals associated with a human finger, a water drop, and placing a device on a desk (e.g., placing an object over a sensor). For a human finger, the energy measurement signal inevitably has slight movements or variations, even for the duration of a touch event, which can be detected and identified to confirm that a human finger is initiating the touch event. For a liquid droplet or water droplet, the energy measurement signal has certain characteristics, such as a steep drop followed by a generally steady signal without much variation, if any. Detection of such characteristics can be used to discriminate between an actual intended touch event and accidental contact by other objects, such as falling water. Placing a device or other object on a sensor (e.g., a desk-mounted sensor) can have an energy measurement signal with certain characteristics, such as a relatively shallow drop followed by a generally steady signal without much variation, if any.

Accordingly, a system as described herein can determine an energy signal associated with a set of reflected ultrasound signals. The system can then extract feature information associated with the energy signal and then determine an inference associated with the object based on the extracted feature information. Determining the inference can comprise using the feature information to determine whether the touch event is associated with a human digit or a water drop. For example, as illustrated in FIG. 26, a water drop (i.e., water droplet) can induce a larger drop in the energy signal determined by the system than a human digit (i.e., finger). The finger can have peaks and valleys (i.e., fingerprint) that decreases the amount of surface area placed on the sensor and thus the amount of ultrasonic signals absorbed by the object.

Thus, a criteria of a magnitude of the energy signal (e.g., corresponding to a steep drop) can be used to distinguish between a finger touch and a water drop. Further, the energy signal is more consistent over time than the human finger. Thus, a criteria of the energy signal being within a specified range over a specified amount of time can be used to distinguish between a water drop and a human finger. Such a measurement can be performed using a variation (e.g., a standard deviation) of the energy signal over time. Accordingly, the feature information can include a magnitude of the energy signal and/or a variation of the energy signal. The determining of the inference can include comparing the magnitude and/or the variation to a respective threshold to determine whether the touch event is associated with a human digit or a water drop.

Figure 27:
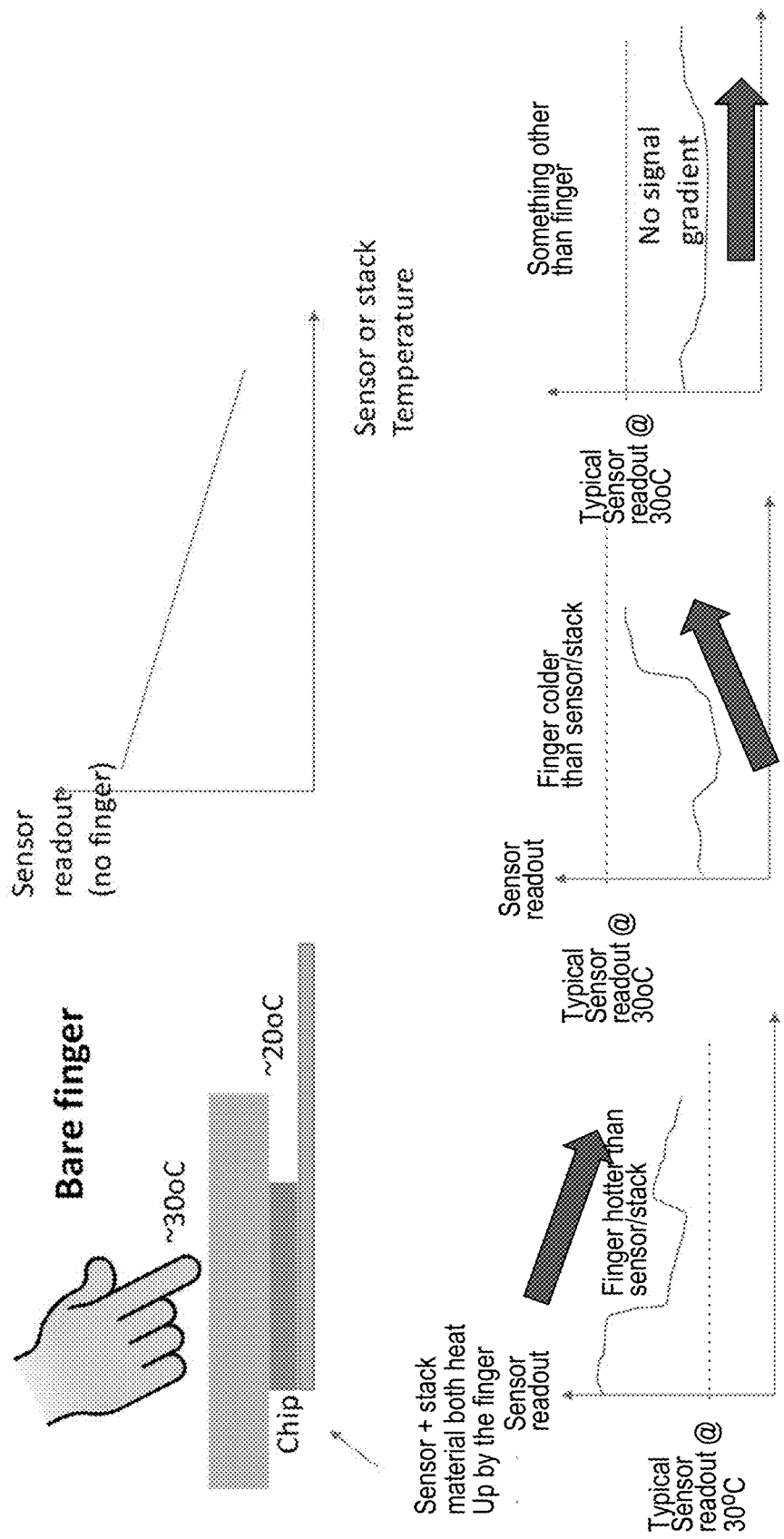
FIG. 27 is a combination schematic diagram and set of charts depicting how temperature can be leveraged to further identify whether a human finger is initiating a touch event.

FIG. 27 is a combination schematic diagram and set of charts depicting how temperature can be leveraged to further identify whether a human finger is initiating a touch event. The energy measurement signal output by the sensor (e.g., the sensor chip and/or substrate) is somewhat dependent on the temperature of the sensor. As the temperature increases, the energy measurement signal tends to decrease.

Generally, a chip will be at room temperature (e.g., at or around 20 or 21° C.), whereas a human finger will be at body temperature (e.g., at or around 30° C.). When living tissue (e.g., a human finger) initiates a touch event, heat will transfer between the tissue (e.g., finger) and the chip. When the finger is warmer, it may cause the chip to slightly increase in temperature. Since the energy measurement signal as a whole is partially dependent on the temperature of the chip and/or substrate, fluctuation in the temperature of the chip and/or substrate can be detected as an underlying steady increase or decrease in the energy measurement signal over time. As depicted in the chart at the bottom left of FIG. 27, when a warm finger is placed on a cooler sensor, the heat transfer will cause the energy measurement signal to take on a generally downward slope. As depicted in the chart at the bottom middle of FIG. 27, when a cool finger is placed on a warmer sensor, the heat transfer will cause the energy measurement signal to take on a generally upward slope. However, as depicted in the chart at the bottom right of FIG. 27, when something other than living tissue (e.g., a finger) is placed on a sensor and that other object has a temperature that is at or near the same temperature of the sensor (e.g., both at room temperature), the lack of heat transfer will cause the energy measurement signal to take on a generally flat slope. Overall, such temperature effects on the energy measurement signal can be used to identify when something that is touching the sensor is at or near body temperature, or at or near other temperatures. In some cases, it may be possible to discern an approximate temperature of the object initiating the touch event through analysis of the general slope of the energy measurement signal.

In some cases, one or more temperatures sensors can be used to measure the temperature of the chip and/or substrate. Knowledge of the temperature of the chip and/or substrate can help inform a determination of whether an object initiating a touch event is a human finger or not.

Figure 28:
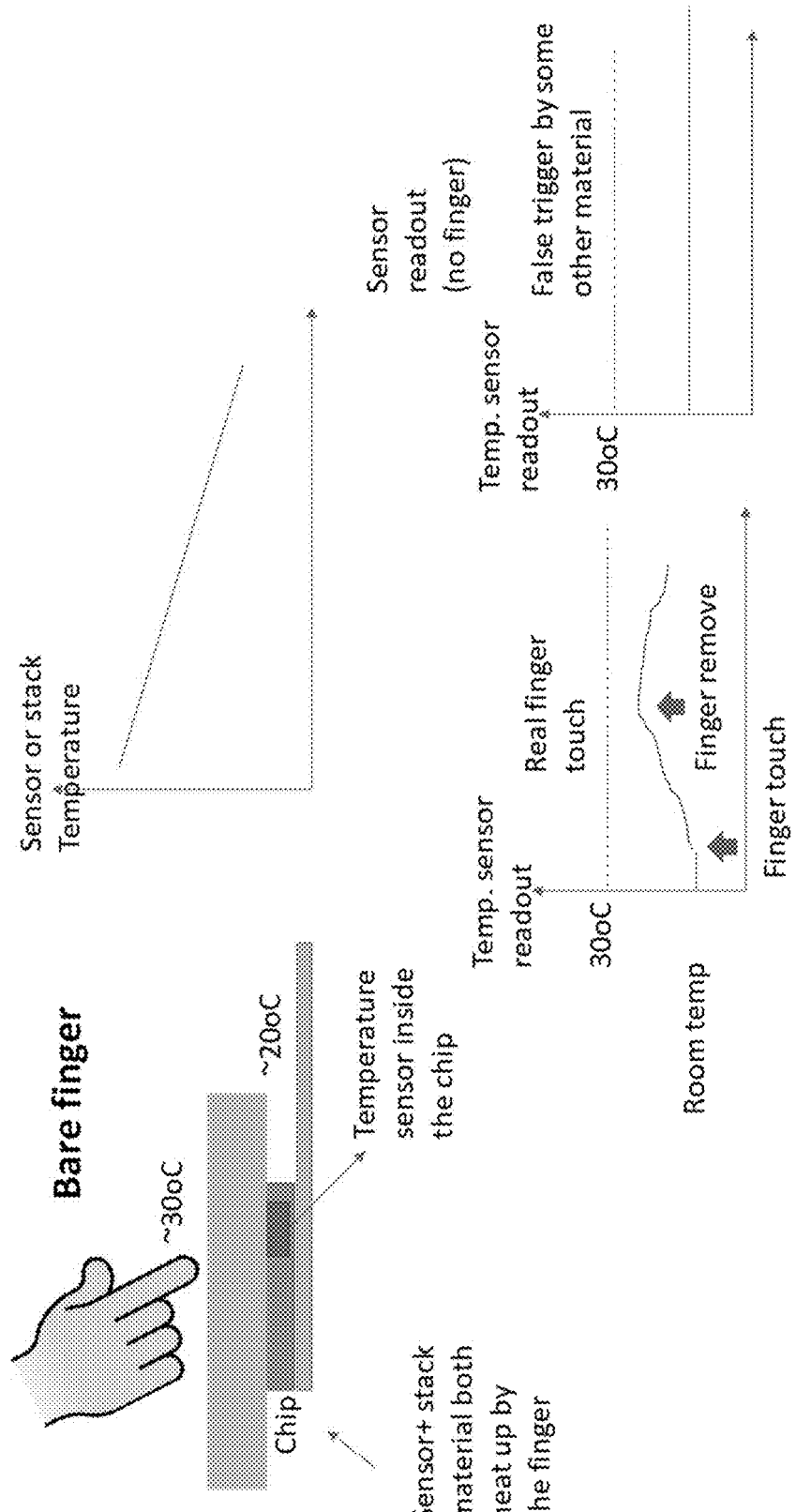
FIG. 28 is a combination schematic diagram and charts depicting a finger touch and associated temperature information according to certain aspects of the present disclosure.

FIG. 28 is a combination schematic diagram and charts depicting a finger touch and associated temperature information according to certain aspects of the present disclosure. In some cases, the ultrasound input system can include a temperature sensor, such as within, on, or proximate the chip. The temperature sensor can provide a temperature signal (e.g., temperature sensor readout) associated with the temperature of the ultrasound input system. Generally, when no touch event is being initiated, there would be minimal or no change in the temperature signal, as the ultrasound input system would maintain a temperature of at or near the ambient temperature, such as room temperature. However, if a touch event is initiated with a human finger, an expected change in temperature towards body temperature (e.g., rise in temperature from room temperature to body temperature) may occur. As depicted in the bottom left chart of FIG. 28, a human finger touch can be detected or confirmed by identifying a change in the temperature signal towards body temperature (e.g., at or around 30° C.). As depicted in the bottom right chart of FIG. 28, a touch event initiated by an object (e.g., room-temperature object) other than a human finger would not elicit a change in temperature of the ultrasound input system towards body temperature.

B. Discernable Physical Characteristics

Figure 29:
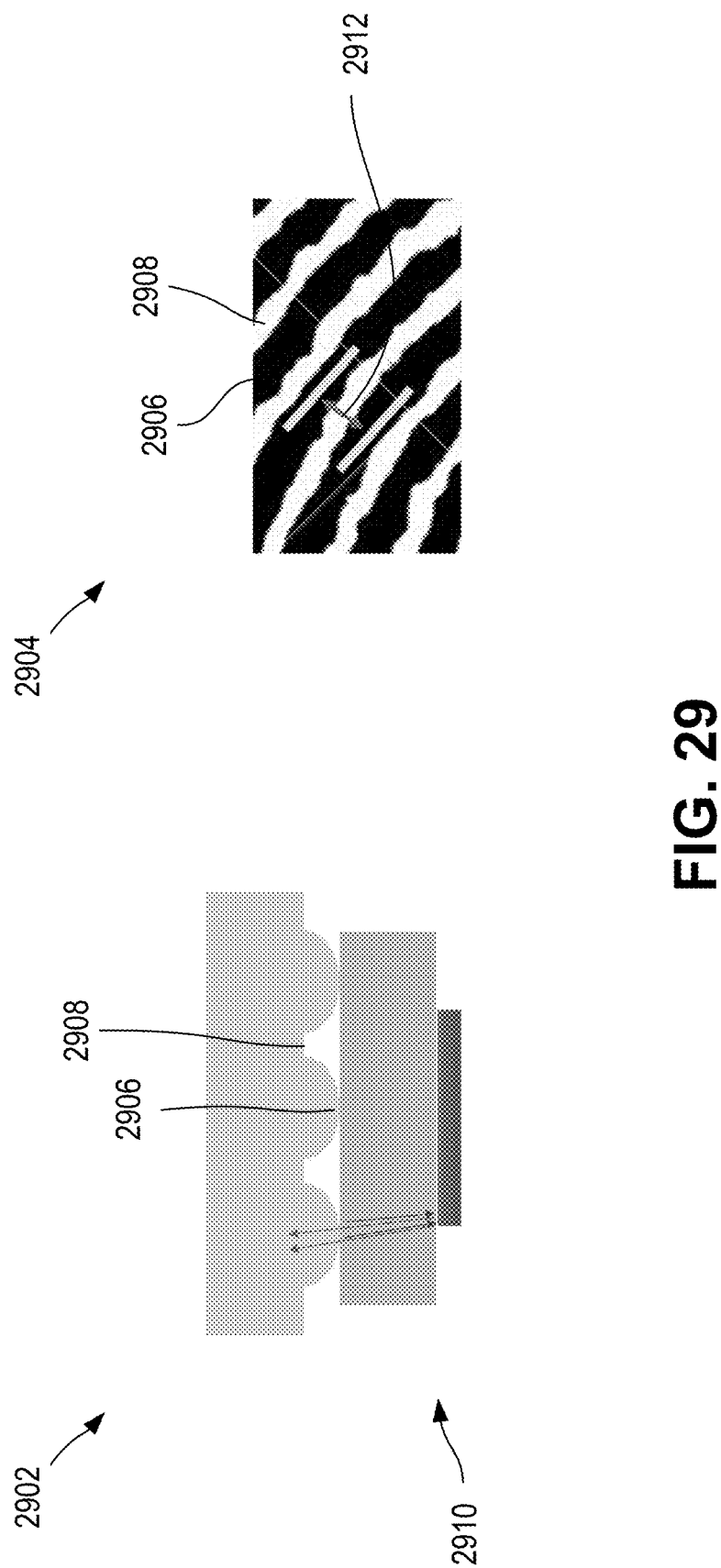
FIG. 29 is a combination schematic side view and signal map depicting ridges and valleys of a fingerprint initiating a touch event on an ultrasound input system according to certain aspects of the present disclosure.

FIG. 29 is a combination schematic side view 2902 and signal map 2904 depicting ridges 2906 and valleys 2908 of a fingerprint initiating a touch event on an ultrasound input device 2910 according to certain aspects of the present disclosure. When a user places a finger on a surface associated with an ultrasound input device 2910, the ultrasound input device 2910 may be able to detect a portion of the user's fingerprint. Generally, the ultrasound input device 2910 may sense a region that is smaller than a user's entire fingerprint, although that need not always be the case.

The ultrasound input device 2910 can identify ridges 2906 and valleys 2908 of the user's fingerprint (e.g., of the portion of the user's fingerprint). At ridges 2906, the ultrasound input device 2910 will detect a decrease in energy measurements of reflected signals due to the damping effect of the flesh of the ridge 2906. However, at valleys 2908, the same damping effect does not exist.

Therefore, an ultrasound input device 2910 measuring a finger as depicted in the schematic side view 2902 may generate a signal map 2904 showing ridges 2906 and valleys 2908. As seen in the signal map 2904, darker areas denote dips in energy measurements of reflected signals and lighter areas denote signals closer to a baseline energy measurement. While the entire fingerprint cannot be discerned from the field of view of the ultrasound input device 2910, a number of ridges 2906 and valleys 2908 can be discerned. By measuring the widths of ridges 2906 and valleys 2908, as well as inter-valley distances and inter-ridge distances (e.g., inter-ridge distance 2912), the ultrasound input device 2910 may be able to discern one finger from another finger. In an example case, a finger of an adult may show wider ridges 2906 and valleys 2908 than that of a youth. Thus, in a household with an adult and a child, the ultrasound input device 2910 may be able to discern between the two users based on discernable physical characteristics of the user's finger, such as fingerprint characteristics. In some cases, the presence of a repeating line pattern (e.g., a pattern of ridges 2906 and valleys 2908) can be used to confirm or make a determination as to whether or not the object initiating the touch event is a human finger.

In some cases, discernable physical characteristics, like fingerprints, can be used along with discernable energy signals to further identify users.

Figure 30:
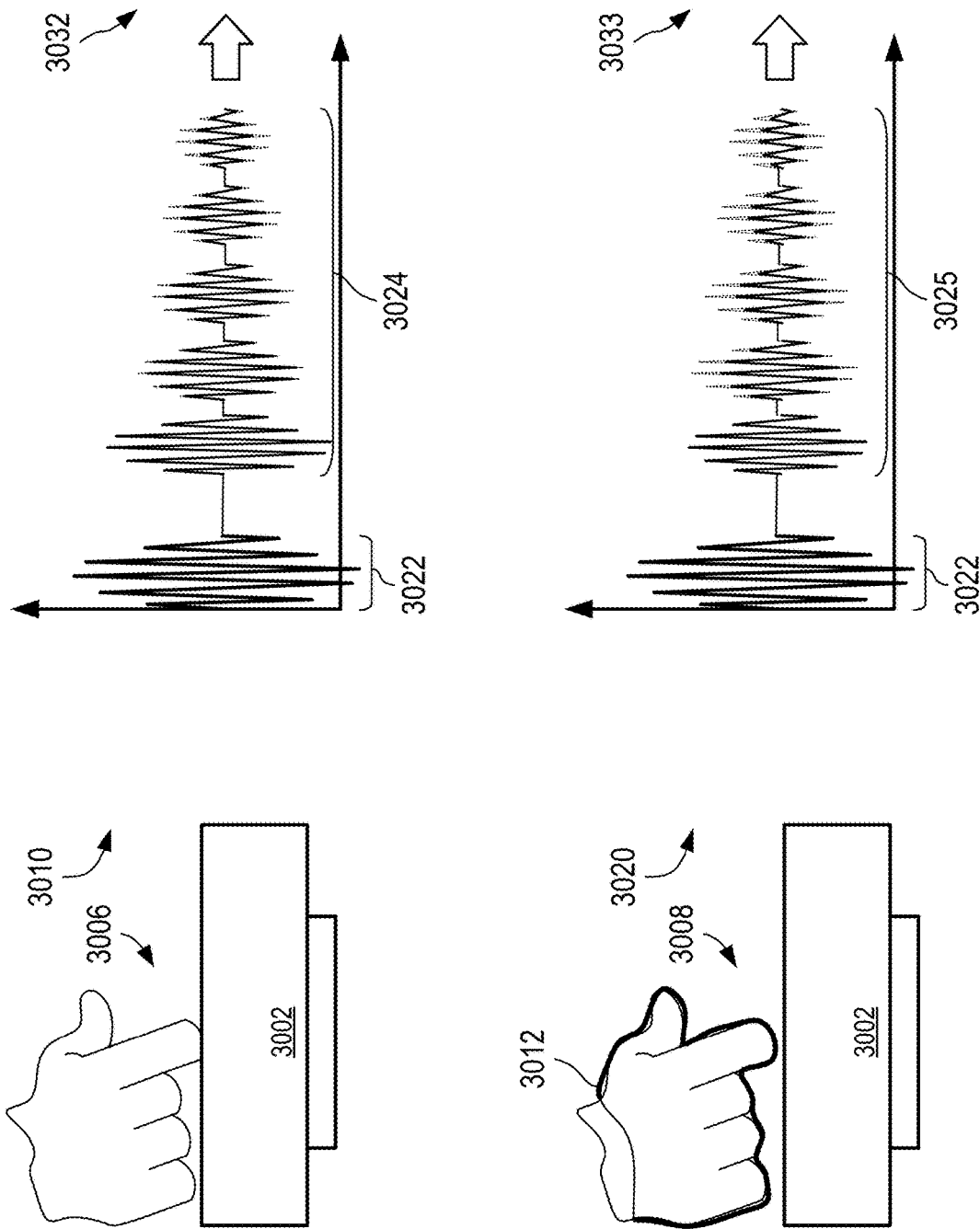
FIG. 30 is a schematic diagram depicting example signals received by an ultrasound input system attributable to the same user initiating touch events with and without a glove according to certain aspects of the present disclosure.

FIG. 30 is a schematic diagram depicting example reflected signals 3024, 3025 received by an ultrasound input system 3002 attributable to the same user initiating touch events with a glove 3008 and without a glove 3006 according to certain aspects of the present disclosure. A first plot 3010 associated with the ultrasound input device 1702 with touch input from a user not wearing a glove 3006 shows a transmitted signal 3022 and a first set of reflected signals 3024. The first set of reflected signals 3024 show a characteristic dampening of the reflected signals associated with a touch event. A second plot 3020 associated with the ultrasound input device 1702 with touch input from a user wearing a glove 3008 shows a transmitted signal 3022 and a second set of reflected signals 3025. The second set of reflected signals 3025 show a characteristic dampening of the reflected signals associated with a touch event that is somewhat similar to the first set of reflected signals 3025, but may have additional dampening due to the presence of the glove 3012. The first set of reflected signals 3024 can be processed to generate a first output voltage 3032. Similarly, the second set of reflected signals 3025 can be processed to generate a second output voltage 3033.

Thus, an ultrasound input system 3002 can distinguish between a gloved hand and a non-gloved hand. In some cases, certain actions may be available or not available depending on whether or not the user is wearing a glove. For example, in a medical office, certain functions associated with an ultrasound input system may be unavailable unless the user is wearing a glove to ensure proper protection is in place.

C. Extracting and Using Features

Figure 31:
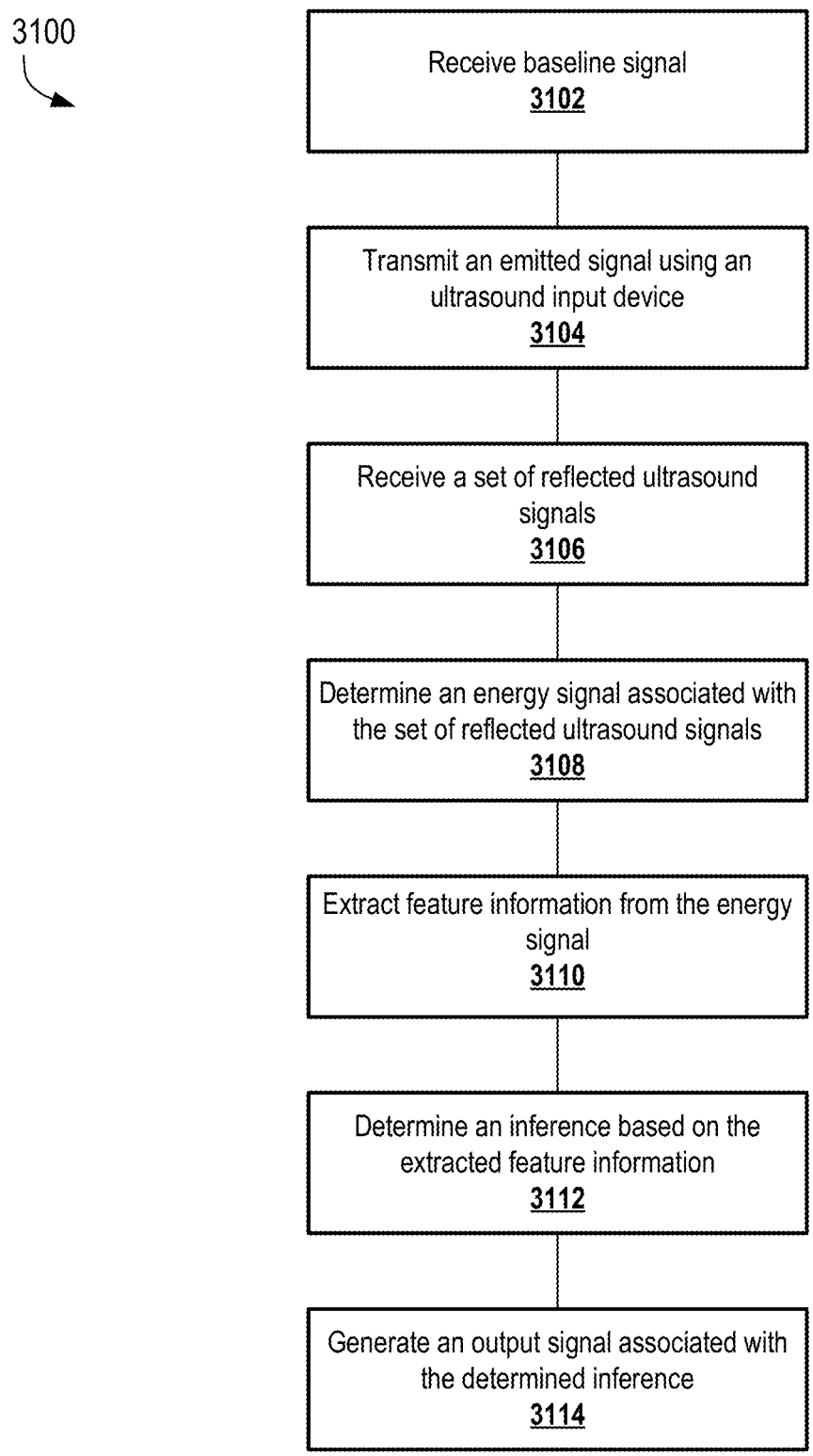
FIG. 31 is a flowchart depicting a process for extracting features from a signal of an ultrasound input system according to certain aspects of the present disclosure.

FIG. 31 is a flowchart depicting a process 3100 for extracting features from a signal of an ultrasound input system according to certain aspects of the present disclosure. The method illustrated in FIG. 31 will be described in the context of a system comprising an ultrasound input device and one or more data processor determining an energy signal from a touch event. It is understood, however, that embodiments of the present disclosure can be applied to other circumstances.

At optional block 3102, a baseline signal can be received by an ultrasound input system. The baseline signal can be energy measurements associated with no touch event (e.g., when no user is touching the surface coupled to the ultrasound input device). Removing such baseline signals can result in more effective range to sample during analog-to-digital conversion, for example, as described herein in reference to at least FIG. 9. For example, the ultrasound input system can emit a first signal. Any suitable number of reflected ultrasonic signals and reflected-emission signals can then be measure pattern can be identified in any suitable manner d by the ultrasound input system. The signal can be determined not to be associated with a touch event (e.g., a finger touching an external surface) based on the characteristics of the received signals. For example, the received signals can indicate a baseline signal associated an air signal. Further example details of a baseline signal are described herein.

At block 3104, the system can transmit an emitted signal using an ultrasound input device. The ultrasound input device can be coupled to a material layer having an external surface located opposite the material layer from the ultrasound input device. The emitted signal can pass through the material layer towards the external surface. Any number of reflected ultrasonic signals and reflected-emission signals can result from an initial emitted ultrasonic signal until the signals become too attenuated to be reflected and/or detected, as described in detail herein.

At block 3106, a signal associated with a touch event is received. For example, the system can receive a set of reflected ultrasound signals associated with the emitted signal. The received signal can be a measurement of energy associated with reflected ultrasonic waves. The signal received at block 3104 can depend on how the touch event is initiated (e.g., timing of the touch, style of touch, amount of force of the touch, physical characteristics of the object initiating the touch).

At block 3108, the one or more data processors of the system can determine an energy signal associated with a set of reflected ultrasound signals associated with the touch event between an object and an external surface of a material layer coupled to the ultrasound input device.

As an example, in reference to FIG. 9, the flow 900 includes emitting and receiving an ultrasonic signal as illustrated in a first plot 902. The first plot 902 shows an analog measurement of a first signal 903 for an emitted ultrasonic signal and a set of subsequent signals 904A, 904B, 904C, 904D, 904E for a set of reflected ultrasonic signals associated with an ultrasound input device. The flow 900 can include an ultrasound input device with an analog summation or integration circuit 920 and a summed voltage output 922.

A second plot 908 shows the first signal 903 and a set of energy signals 910A, 910B, 910C, 910D, 910E each corresponding to the energy of respective ones of the set of reflected ultrasonic signals. For illustrative purposes, the set of energy signals 910A, 910B, 910C, 910D, 910E is depicted in solid line overlaid with the set of subsequent signals 904A, 904B, 904C, 904D, 904E from the first plot 902 shown in dotted line.

At block 3110, after determining the energy signal associated with the set of reflected ultrasound signals, features can be extracted from the signal associated with the touch event. Extracted features can be any suitable characteristic of the signal that can be discernable and/or able to inform an inference. The one or more data processor can be configured to extract feature information associated with the energy signal in any suitable manner.

In some embodiments, extracting the feature information can include identifying a pattern in the energy signal associated with a dip in energy measurements that is associated with the touch event. For example, when an individual places their finger upon the system, specifically the external surface, the individual's finger can absorb at least a portion of an emitted ultrasonic signal, thus causing a dip in the energy measurement.

The pattern can be identified in any suitable manner described herein. For example, in some embodiments, identifying the pattern in the energy signal can include identifying a depth of the dip, a duration of the dip, a presence of a subsequent dip after the dip, a delay between the dip and another dip, and/or a rate of change in the energy signal at an edge of the dip (e.g., during finger land or removal). In other embodiments, identifying the pattern can include identifying a change in the energy signal attributable to a temperature shift in the material layer, as described in detail herein.

In some cases, extracting features (i.e., feature information) at block 3110 can comprise comparing the signal to stored historical signal(s), such as to determine if the received signal at block 3110 matches a stored signal associated with a particular user. In some cases, extracting features at block 3110 can comprise identifying a pattern in the received signal, such as to identify that the received signal is attributable to a sharp tap or a place and press action. In some cases, extracting features at block 3110 can comprise measuring characteristics of the received signal. Any discernable characteristic of the received signal can be measured and used to make a determination or inference regarding the source of the touch event.

At block 3112, an inference can be determined based on the extracted feature information. The one or more data processor can be configured to determine an inference associated with an object based on the extracted feature information in any suitable manner.

For example, in some embodiments, determining the inference can include estimating a relative temperature of the object based on an identified change in the energy signal attributable to the temperature shift in the material layer. For example, an individual that touches the external surface of the material layer can have a body temperature that is higher than the ambient temperature and/or the temperature of the material layer. The determined energy signal can be influenced by temperature, as described herein, and thus allow for the one or more data processor to determine an inference of a temperature measurement and/or temperature shift (e.g., as measured by a temperature sensor as described below.

In other embodiments, the one or more data processors can determine the inference by comparing the identified pattern with stored data. The stored data can be associated with prior touch events of the external surface. For example, the prior touch events of the external surface may have been performed by an individual. The current touch event can be compared to the prior touch events to determine if the current touch event is also performed by the individual, as described herein.

In yet other embodiments, the one or more data processors can determine the inference by using the feature information to determine that the touch event is associated with a human digit, a bare human digit, a wet human digit, a dry human digit, and/or a gloved human digit. For example, as described herein, the determined energy signal can be affected by one or more than one characteristic(s) of the individual's digit(s) placed on the external surface of the material layer. The one or more data processors can also determine the inference by using the feature information to determine a style of touch (e.g., tap, double tap, place and press, etc.) of the touch event, a touch intensity associated with the touch event, and/or a physical characteristic of the object.

In some embodiments, determining the inference can include identifying that the object is associated with one out of a plurality of users based on associating the touch event with the style of touch of the touch event, the touch intensity associated with the touch event, and/or the physical characteristic of the object. The physical characteristic of the object can include a measurement associated with a portion of a fingerprint contacting the external surface.

In some embodiments, the one or more data processors can determine an additional signal associated with an additional sensor (e.g., a temperature sensor of FIG. 28) associated with the ultrasound input device. The one or more data processors can then determine the inference further using the additional signal. The additional sensor can include any suitable additional sensor associated with the ultrasound input device. For example, the additional sensor can include a temperature sensor, a pressure sensor, a charge-coupled device, etc.

For example, the system can include a temperature sensor. The temperature sensor can record temperature of, for example, the external surface of the system over time. Since the human fingertip has a certain physical size and temperature range, when a human touches the external surface the one or more data processors can determine that the touch event is caused by a human finger. As an illustrative example, the temperature sensor can record the temperature of at least one portion of the external surface at a predetermine interval (e.g., 1 ms, 0.1 s, 1 s, etc.). The temperature sensor can record the ambient temperature (e.g., 70° F.). When a user touches the external surface during a touch event, the system can record an energy signal which can include, for example, a dip in energy. During the touch event, the temperature sensor can continue to measure the temperature of the external surface. The human finger in contact with the external surface can increase the temperature of the external surface, thus leading the temperature sensor to record an increase in temperature. For example, the human finger can be approximately 98° F. The temperature sensor can record a temperature between the ambient temperature of 70° F. and the temperature of the human finger of 98° F., since the finger will heat up the external surface and the temperature sensor.

The temperature measured by the temperature sensor can be an additional signal associated with an additional sensor (e.g., the temperature sensor) associated with the ultrasound input device. The one or more data processors can determining an inference using the additional signal along with the energy signal. For example, the one or more data processors can determine that the dip of the energy signal as well as the rise in temperature from an ambient temperature to a higher temperature between the ambient temperature and an average human temperature indicates that the touch event is indicative of a human finger touching the external surface. In some cases, the one or more data processors can determine whether or not a signal change is a result of a human touch or from another object (e.g., table, pocket fabric, pen/stylus, etc.) coming into contact with the external surface using the temperature data from the temperature sensor. For example, the temperature sensor may not measure as large of an increase in temperature when touched with a table, pocket fabric, pen/stylus, etc. as when touched by a human finger.

In some cases, the temperature sensor may be a known (i.e., predetermined) distance from the finger. For example, the temperature sensor may be on the opposite side of the external surface from the finger. In this case, during processing of the additional signal associated with an additional sensor (e.g., temperature sensor), a heat transfer problem with known boundary conditions and initial values can be solved to determine what the temperature is at the external surface.

In some embodiments, the additional sensor can include a pressure sensor and/or a strain gauge. For example, a typical touch from a human finger can impose a certain force and strain on the external surface which can be propagated to the additional sensor. The pressure sensor and/or the strain gauge can measure the force and/or strain imparted into the system by the finger. The one or more data processors can determine that the force and/or strain measured by the pressure sensor and/or the strain gauge indicates a force and/or stain typical of a touch of a finger. The one or more data processors can also determine whether or not the energy signal is indicative of a touch of a finger. If both the additional signal, from the pressure sensor and/or the strain gauge, as well as the energy signal indicate a touch of a finger, then the one or more data processors can determine that the touch event was a touch of the finger.

In some cases, the additional sensor can include the strain gauge. The strain gauge can detect the deflection of the surface associated with the touch event and can output an electrical signal. The stronger the touch event (e.g., more force exerted on the external surface by the object such as a finger), the more deflection imparted onto the strain gauge. Thus, the strain gauge can output a larger electrical signal.

At block 3114, the one or more data processors can generate an output signal associated with the determined inference. The output signal can include any suitable output generated based on the determined inference. In some embodiments, the output signal can indicate a particular action that can be performed by the one or more data processors and/or an external devices.

In some embodiments, the one or more data processors can perform an action based on the extracted feature(s). The action can include any suitable process that can occur based on the output signal. In an example, if the extracted features are used to identify a particular use, the action performed can be to authenticate or authorize the user to access a resource. In another example, if multiple users have preset customizations for a particular ultrasound input system, the extracted feature information can be used to determine which user is interacting with the ultrasound input system and therefore perform the customized actions for that particular user. In some cases, performing actions can include permitting or denying access to a resource, such as denying access to a room or a tool when the extracted features indicate that a user is not wearing gloves when gloves are required.

V. Machine Learning Decision Algorithm

Figure 32:
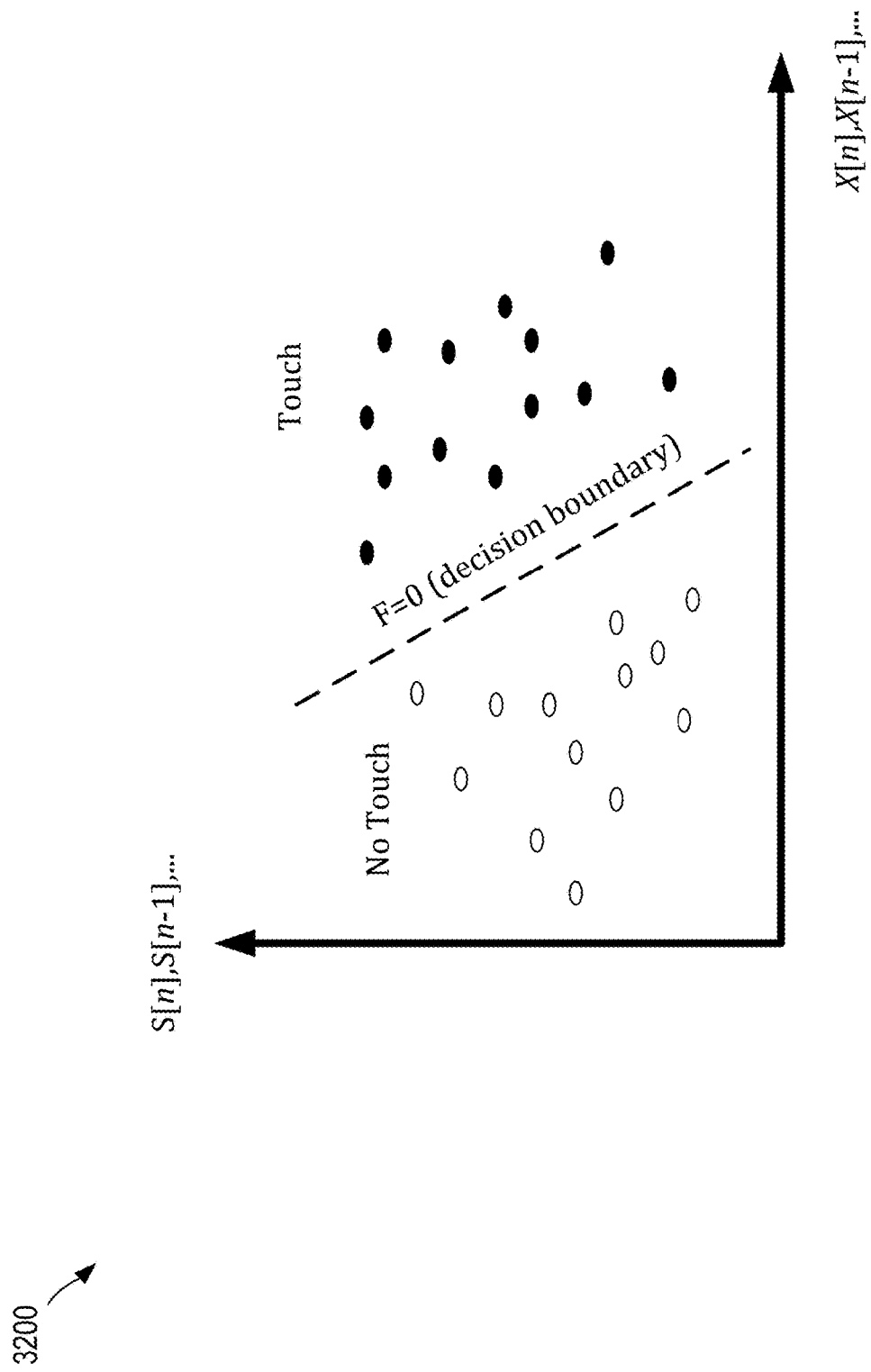
FIG. 32 is a chart depicting a machine learning decision algorithm used to improve touch detection according to certain aspects of the present disclosure.

FIG. 32 is a chart 3200 depicting a machine learning decision algorithm used to improve touch detection according to certain aspects of the present disclosure. As described with reference to FIG. 18, weighting parameters can be used to drive various decisions regarding when a touch event is detected or not detected. In some cases, a machine learning approach can take into account sensor output values and slopes between a sensor value and a previous sensor value to generate inferences that a touch event has occurred or not occurred. The machine learning approach can use a decision function (f), such as:

$$f = w_0 X[n] + w_1 X[n-1] + w_2 X[n-2] + \ldots + w_m X[n-m] + w_{s0} S[n] + W_{s1} S[n-1] + \ldots + w_{sm} S[n-m]$$

where $w_n$ and $w_{sn}$ are weighting parameters, $X[n]$ is the current sensor output, $X[n-1]$ is the previous sensor output, $X[n-m]$ is the m-th previous sensor output, $S[n]$ is the slope of the current sensor output (e.g., as compared to an immediately prior sensor output), $S[n-1]$ is the slope of the previous sensor output, and $S[n-m]$ is the slope of the m-th previous sensor output. In some cases, other parameters can be used in the decision function.

The weighting parameters of the decision function can be trained over a corpus of data to generate a decision boundary between inputs that are considered touch events and inputs that are not considered touch events, as depicted in chart 3200. Thus, for any given sensor outputs and slopes of sensor outputs, a point on chart 3200 can be identified, and if that point falls above the decision boundary, those sensor outputs and slopes of sensor outputs can be considered indicative of a touch event.

VI. Applications

Figure 33:
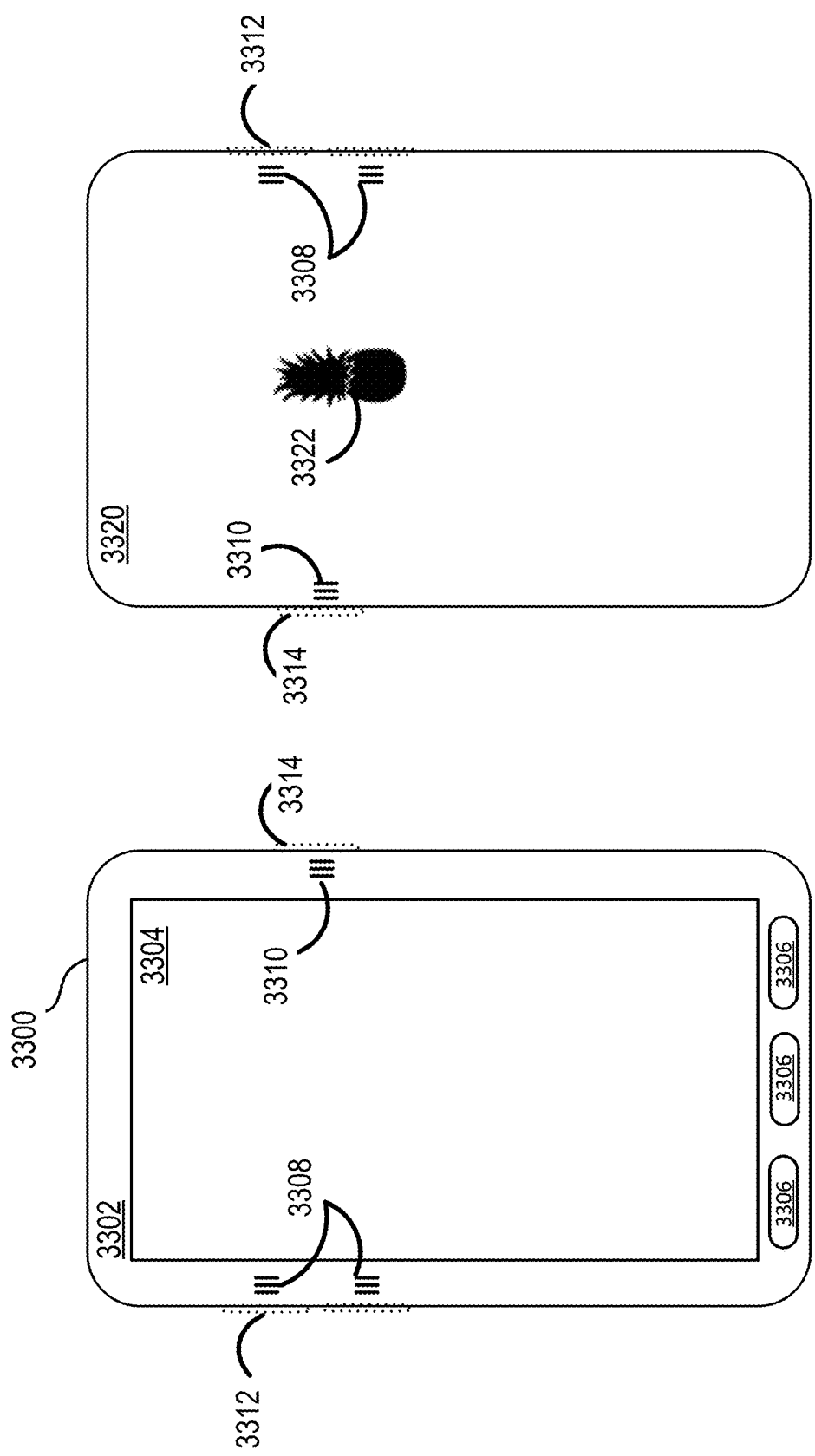
FIG. 33 is a schematic diagram depicting an electronic device with an ultrasound input device according to certain aspects of the present disclosure.

FIG. 33 is a schematic diagram depicting an electronic device with an ultrasound input device according to certain aspects of the present disclosure. The electronic device 3300 can include a case 3302, a screen 3304, one or more front facing buttons 3306, a pair of ultrasound input devices 3308, and an individual ultrasound input device 3310. The electronic device 3300 can include a processor, memory, and a network interface. In some embodiments, the ultrasound input devices can be coupled to the processor of the electronic device 3300.

In some embodiments, the pair of ultrasound input devices 3308 can define an input touch area 3312 to detect user inputs. For example, a user can contact the input touch area 3312 to adjust the volume, the brightness, etc. of the electronic device. In some embodiments, an array of ultrasound input devices can be positioned under the screen to detect touch inputs and replace or augment a capacitive touch or force touch capability of the electronic device. The individual ultrasound input device 3310 can define an input touch area 3314 to detect user inputs. The input touch area 3314 can be configured to control the device power, screen on/off, etc.

In some embodiments, an ultrasound input device can be used to detect a touch input at each of the one or more front facing buttons 3306. The ultrasound input device can replace the capacitive sensing used to detect a touch input on a fingerprint sensor. The ultrasound input device offers a low power solution to detect the touch input on the fingerprint sensor. In some embodiments, one or more ultrasound input devices can be positioned under a logo 3322 on the back 3320 of the case 3302 to detect user input.

Figure 34:
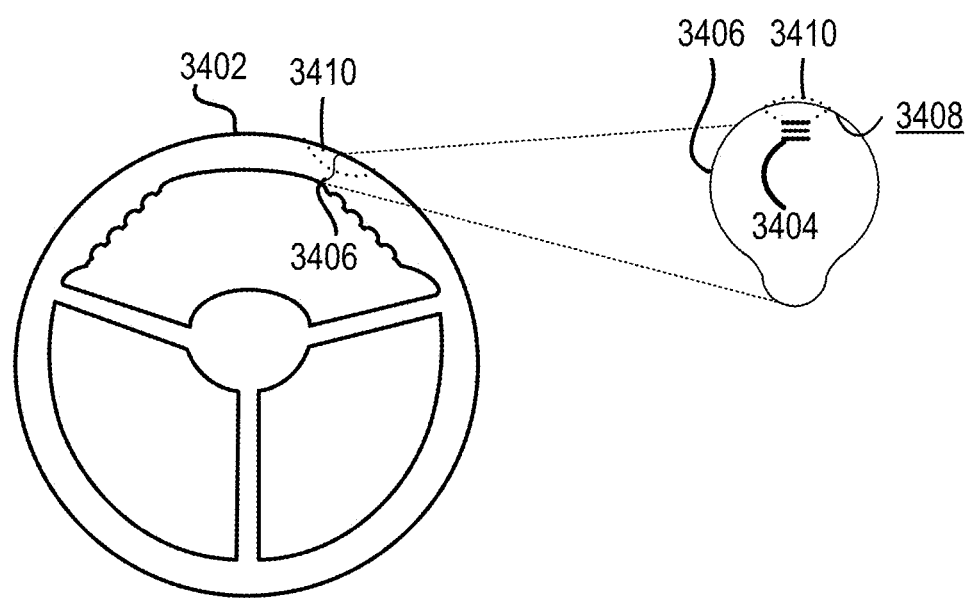
FIG. 34 is a schematic diagram depicting an automotive component with an ultrasound input device according to certain aspects of the present disclosure.

FIG. 34 is a schematic depiction of a steering wheel 3402 with an ultrasound input device 3404 according to certain aspects of the present disclosure. The ultrasound input device 3404 can be used to form a touch input area on the steering wheel 3402 to detect a touch input. The flexibility of the ultrasound input device 3404 facilitates detection of a touch input through a variety of materials used to manufacture a steering wheel such as plastic, leather, wood, etc. The cross section 3406 of the steering wheel 3402 shows the ultrasound input device coupled to a surface 3408 to form a touch input area 3410. The touch input area can be combined with a plurality of touch input areas for a applications such as cruise control, infotainment input control, cellular communications controls; and driver detection systems. For example, the ultrasound input device 3404 can be used in a driver detection system to determine if a driver's hands are in contact with the steering wheel.

Figure 35:
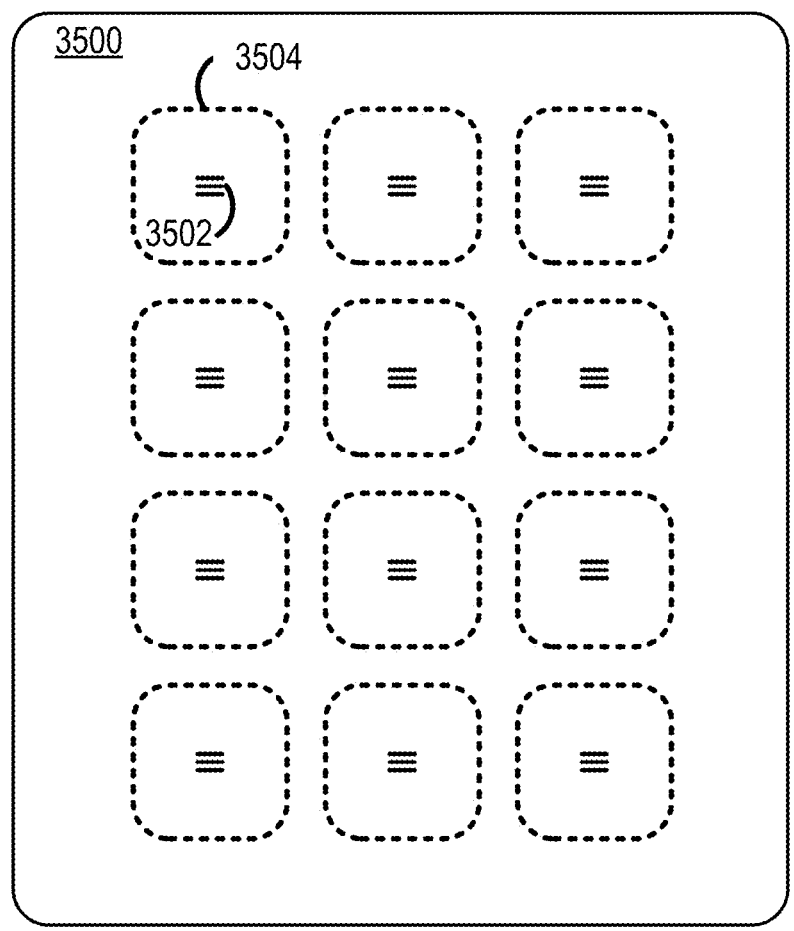
FIG. 35 is a schematic diagram depicting a keypad using an ultrasound input device according to certain aspects of the present disclosure.

FIG. 35 is a schematic depiction of a keypad 3500 using an ultrasound input device according to certain aspects of the present disclosure. The shape and materials that can be used to design a touch area with underlying ultrasound input devices are limited only be the creativity of the designer. For example, a 12-key standard telephone keypad is shown in FIG. 35. The keypad 3500 can include 12 ultrasound input devices 3502 to form a touch area 3504 for each key.

Figure 36:
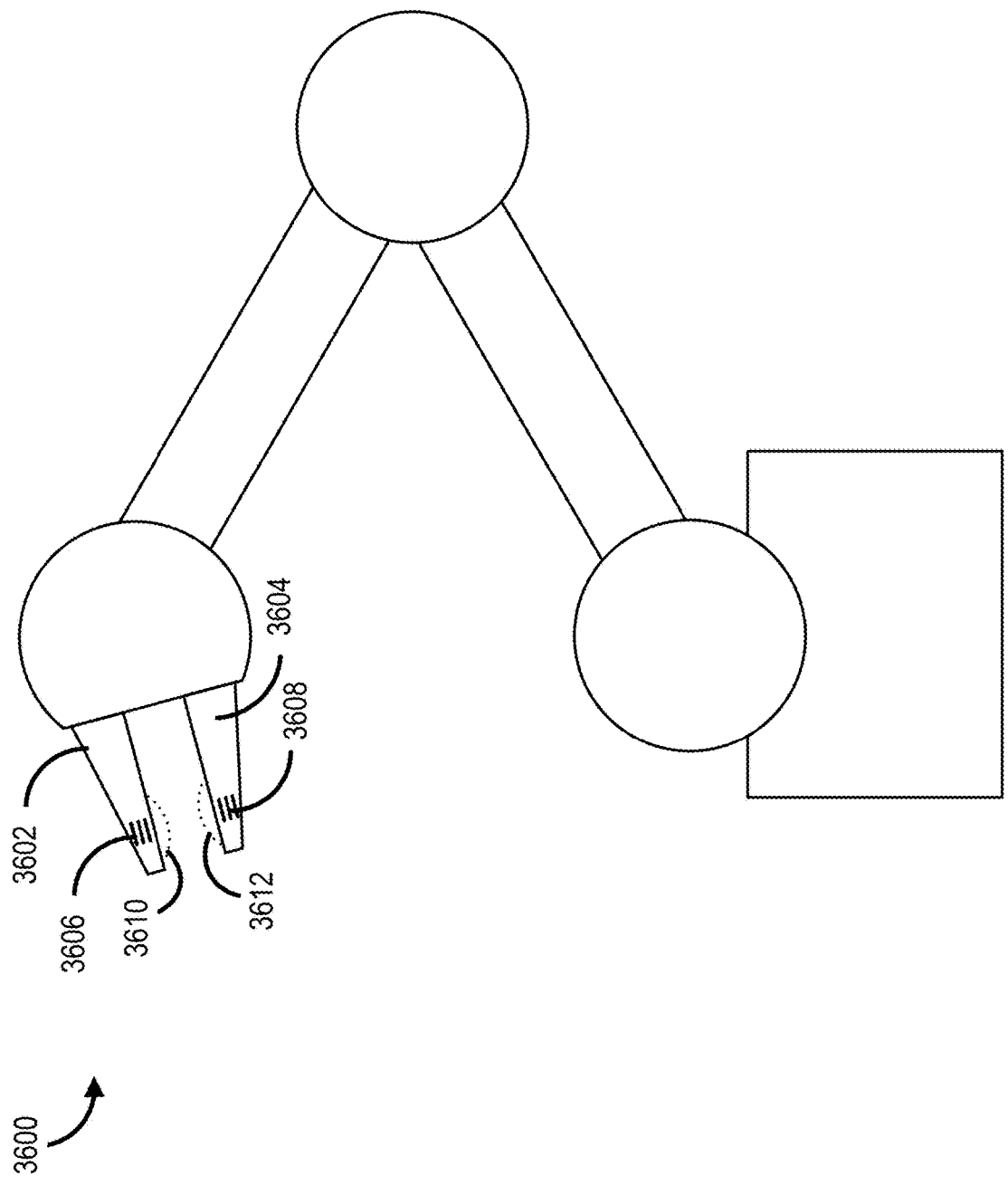
FIG. 36 is a schematic diagram depicting a robotic arm using an ultrasound input device according to certain aspects of the present disclosure.

FIG. 36 is a schematic diagram depicting a robotic arm using an ultrasound input device according to certain aspects of the present disclosure. The robotic arm 3600 can include a first finger 3602 and a second finger 3604. The ultrasound input device can be implemented as a robot finger input device. The first finger 3602 and the second finger 3604 can include a first ultrasound input device 3606 and a second ultrasound input device 3608 respectively. The first ultrasound input device 3606 can form a contact area 3610 on the surface of the first finger 3602 and the second ultrasound input device 3608 can form a second contact area 3612 on the second finger. The ultrasound input devices improve the detection capability of the robot arm because they can be integrated into fingers comprising any material. Further, the ultrasound input devices can detect a touch input without requiring a cutout and/or a different material being integrated into the finger.

In some cases, the ultrasound input device can identify the type of material being touched by analyzing the energy measurement signals. In some cases, the ultrasound input device can identify the elasticity of the object being grasped. For example, a less elastic object will generally absorb less ultrasonic waves than a more elastic object, thus resulting in a generally higher energy measurement signal. In some cases, a determination about the elasticity of the object can be used to adjust the behavior of the robot arm, such as to adjust the force with which the robot arm grasps the object. In some cases, the ultrasound input device may be capable of detecting texture or other mechanical properties of an object based on analyzing the energy measurement signals associated with the object. In some cases, analysis of energy measurement signals from an ultrasound input device can be combined with other inputs, such as machine vision, to confirm or make determinations about an object with which the robot arm is to interact or is interacting.

Figure 37:
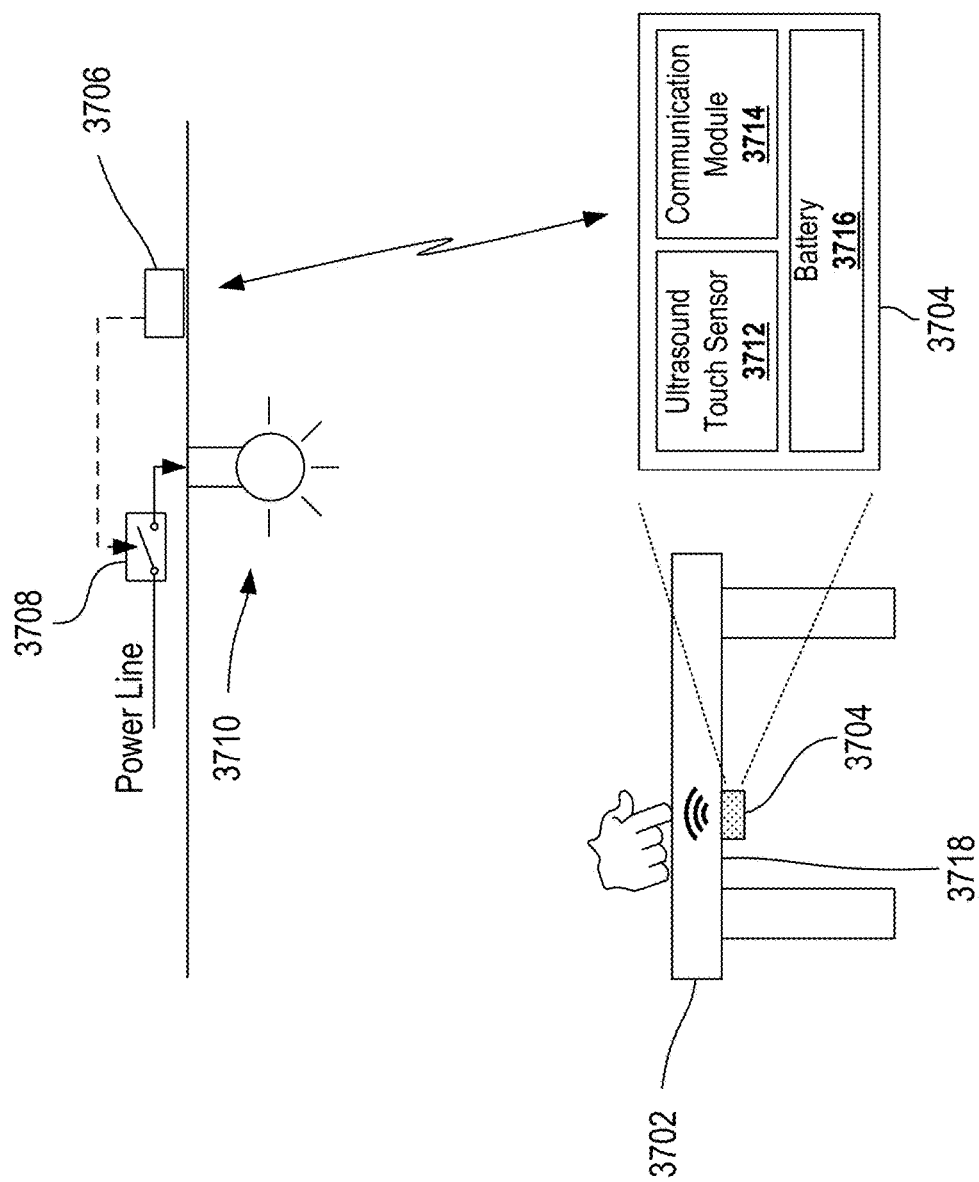
FIG. 37 is a schematic diagram depicting a piece of furniture using an ultrasound input device according to certain aspects of the present disclosure.

FIG. 37 is a schematic diagram depicting a piece of furniture 3702 using an ultrasound input device 3704 according to certain aspects of the present disclosure. The ultrasound input device 3704 can be coupled to the furniture 3702 in any suitable fashion. A user touching the furniture 3702 at or adjacent to the location of the ultrasound input device 3704 can be detected by the ultrasound input device 3704 (e.g., via ultrasound touch sensor 3712). Upon detecting touch, the ultrasound input device 3704 can perform any preprogrammed functions. For example, a communication module 3714 of the ultrasound input device 3704 can send a signal (e.g., a wireless signal) to a control module 3706 spaced apart from the ultrasound input device 3704 and/or the furniture 3702. The control module 3706 can control another device, such as a power switch 3708 coupled to a light bulb 3710. Thus, upon pressing a location on the furniture 3702 that is at or adjacent to the location of the ultrasound input device 3704, the light bulb 3710 can be turned on, be turned off, or otherwise be controlled. The device being controlled (e.g., light bulb 3710) can be in the same environment as the ultrasound input device 3704, although that need not always be the case. In some cases, the device being controlled can be in an adjacent environment or even a distant environment.

The ultrasound input device 3704 according to certain aspects of the present disclosure can operate on very low power, such as from an internal battery 3716. This battery-powered, low power operation can permit use of the ultrasound input device 3704 in otherwise inaccessible or inconvenient locations. For example, a light switch can be incorporated into a table or desk, or a television remote can be incorporated into an armrest of a chair.

In some cases, an ultrasound input device 3704 can be positioned on a hidden surface 3718 so as to hide the ultrasound input device 3704 from sight during normal operation. A hidden surface 3718 can be an underside of a table (e.g., furniture 3702), the inside of a piece of furniture, the inside of a wall, or any other suitable location hidden from view. Thus, the hidden ultrasound input device can be actuated only by those knowing its location, which would otherwise be hidden from view.

FIG. 38 is a set of charts depicting the energy measurement signals of an ultrasound input device demonstrating material detection according to certain aspects of the present disclosure. The characteristics of an energy measurement signal, such as shape, duration, slopes, or other characteristics, can be leveraged to make a determination as to the material interacting with the ultrasound input device. For example, a bare human finger may elicit a different energy measurement signal than a human finger wearing a plastic glove. The top chart depicts an example of an energy measurement signal from a bare human finger contacting an ultrasound input device, with a characteristic rapid drop and relatively quick increase back to a baseline signal as the finger is removed. The bottom chart, however, depicts an example of an energy measurement signal from a human finger wearing a plastic glove. When a plastic glove is worn, the energy measurement signal has different characteristics than when no plastic glove is worn. For example, the energy measurement signal when a plastic glove is worn has a discernably slower increase back to the baseline signal after the finger is removed. This relatively slower increase is in part due to the slight stickiness between the interaction of the plastic glove and the substrate of the ultrasound input device. While the human finger may be pulling away more quickly, the plastic glove around the finger will tend to remain on the substrate for a short duration longer, which can be discernable in the resultant energy measurement signal. This type of comparison can be used to make determinations as to the material initiating a touch event.

VII. Additional Piezoelectric Array Designs

Figure 39:
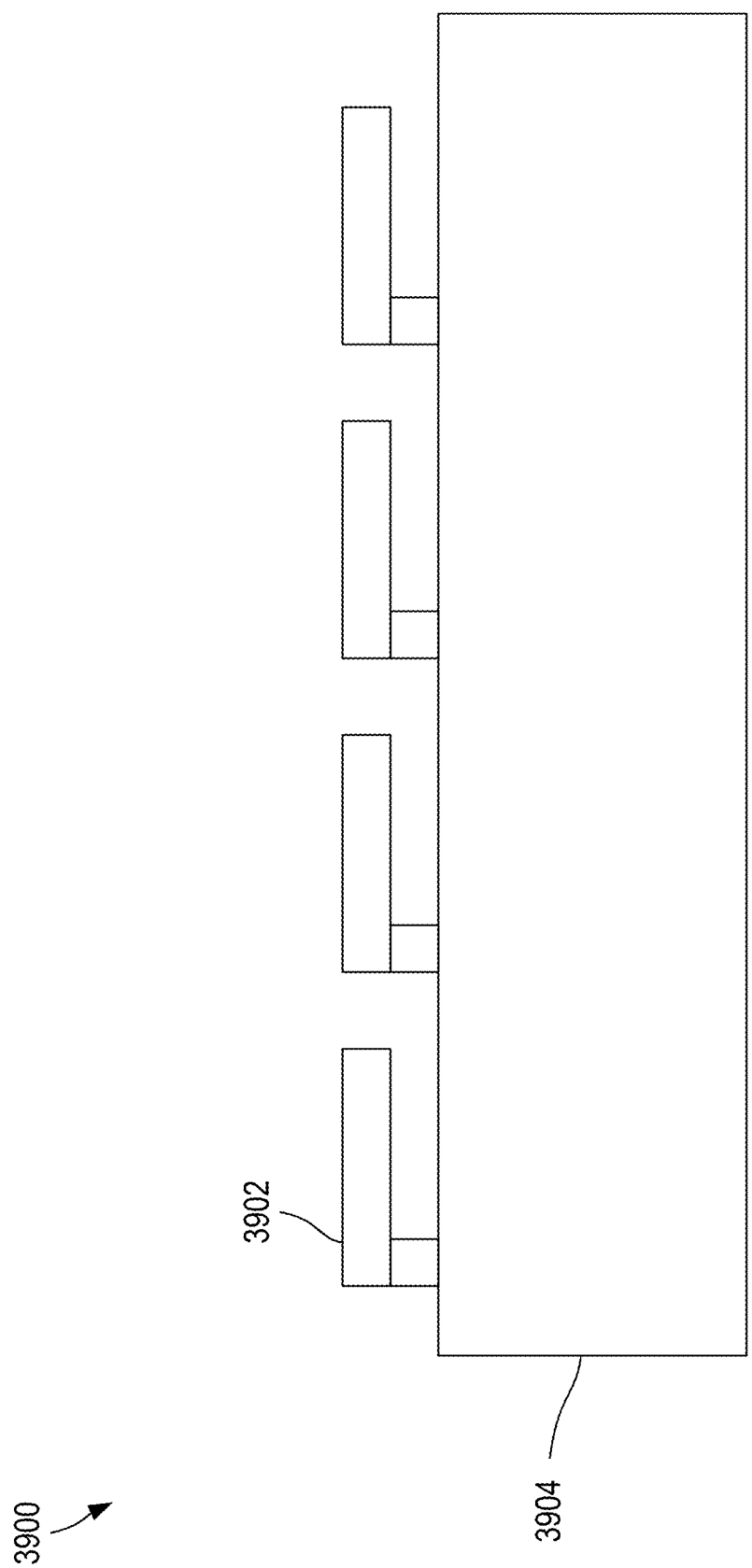
FIG. 39 is a schematic diagram of a piezoelectric resonator array containing piezoelectric cantilevers usable in an ultrasound input device according to certain aspects of the present disclosure.

FIG. 39 is a schematic diagram of a piezoelectric resonator array 3900 containing piezoelectric cantilevers 3902 usable in an ultrasound input device according to certain aspects of the present disclosure. The piezoelectric resonator array 3900 can contain a set of piezoelectric cantilevers 3902 on a base 3904. A piezoelectric resonator array 3900, when acoustically coupled to a material layer (e.g., material layer 102 of FIG. 1) can operate with a particular acoustic resonance. When a touch event is occurring, the touch event can cause the piezoelectric resonator array 3900 to resonate differently. This change in acoustic resonance due to the touch event can be detected and used as a sensor signal in an ultrasound input device, such as instead of a PMUT. Additionally, the piezoelectric cantilevers 3902 can be driven to flex and thus induce emitted signals.

Figure 40:
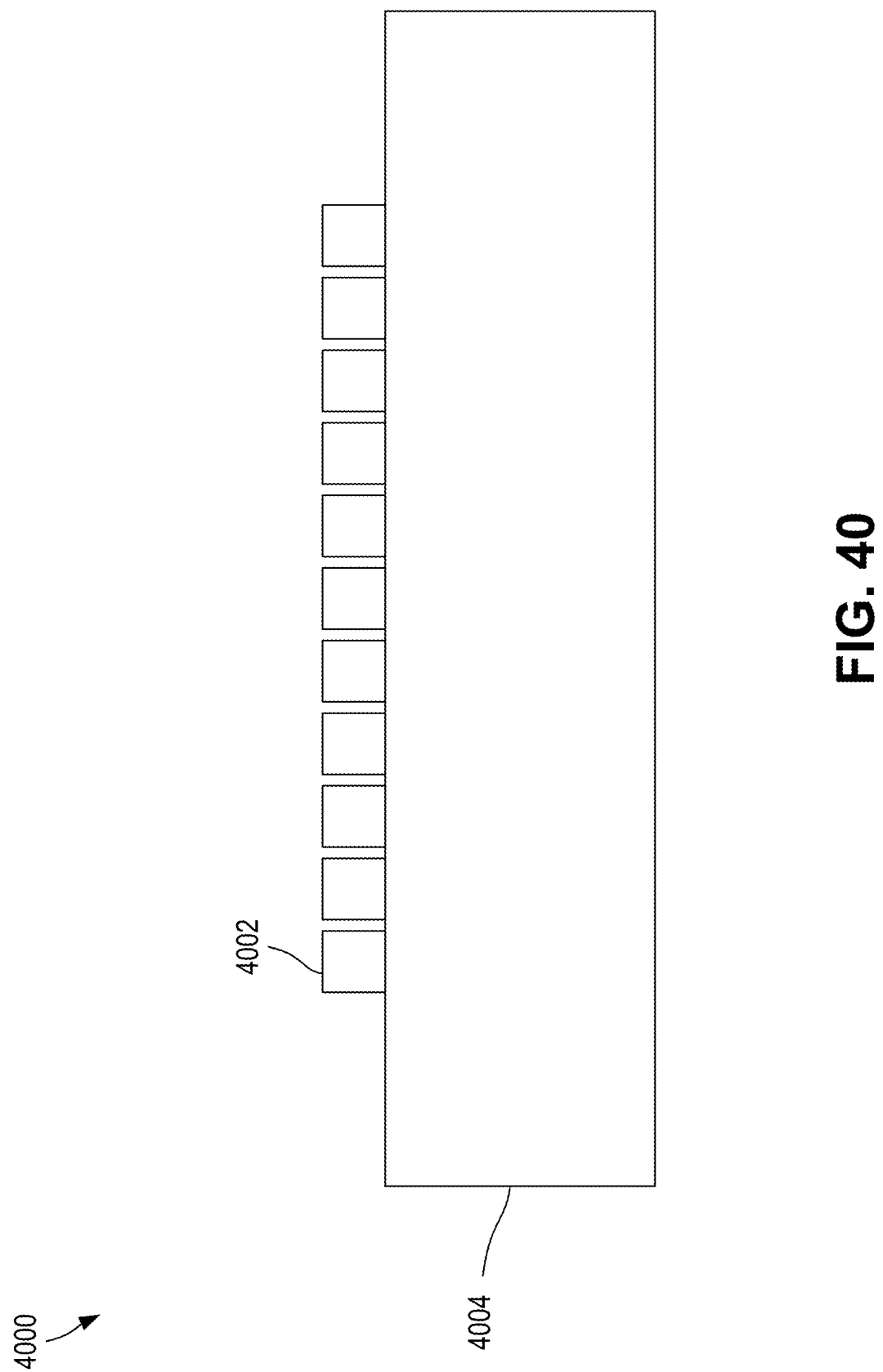
FIG. 40 is a schematic diagram of a piezoelectric resonator array containing piezoelectric pillars usable in an ultrasound input device according to certain aspects of the present disclosure.

FIG. 40 is a schematic diagram of a piezoelectric resonator array 4000 containing piezoelectric pillars 4002 usable in an ultrasound input device according to certain aspects of the present disclosure. The piezoelectric resonator array 4000 can contain a set of piezoelectric pillars 4002 on a base 4004. A piezoelectric resonator array 4000, when acoustically coupled to a material layer (e.g., material layer 102 of FIG. 1) can operate with a particular acoustic resonance. When a touch event is occurring, the touch event can cause the piezoelectric resonator array 4000 to resonate differently. This change in acoustic resonance due to the touch event can be detected and used as a sensor signal in an ultrasound input device, such as instead of a PMUT. Additionally, the piezoelectric pillars 4002 can be driven to flex and thus induce emitted signals. The piezoelectric pillars 4002 can be arranged in any suitable pattern, such as a hexagonal grid.

Aspects of embodiments can be implemented in the form of control logic using hardware circuitry (e.g., an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A system, comprising:
   an ultrasound input device coupled to a material layer having an external surface located opposite the material layer from the ultrasound input device, wherein the ultrasound input device is coupled to the material layer to transmit an emitted signal through the material layer towards the external surface and receive a set of reflected ultrasound signals associated with the emitted signal, wherein the set of reflected ultrasound signals comprises at least one reflected ultrasound signal, and wherein the set of reflected ultrasound signals is associated with a touch event between an object and the external surface of the material layer; and
   one or more data processors configured to:
   determine an energy signal comprising energy measurements over time, each energy measurement corresponding to a summed value derived from a portion of the set of reflected ultrasound signals;
   extract feature information associated with the energy signal;
   determine an inference associated with the object based on the extracted feature information; and
   generate an output signal associated with the determined inference.

2. The system of claim 1, wherein extracting the feature information comprises identifying a pattern in the energy signal associated with a dip in the energy measurements that is associated with the touch event.

3. The system of claim 2, wherein identifying the pattern comprises identifying one or more of a depth of the dip, a duration of the dip, a presence of a subsequent dip after the dip, a delay between the dip and another dip, and a velocity of change in the energy signal at an edge of the dip.

4. The system of claim 2, wherein identifying the pattern comprises identifying a change in the energy signal attributable to a temperature shift in the material layer, and wherein determining the inference comprises estimating a relative temperature of the object based on the identified change in the energy signal attributable to the temperature shift in the material layer.

5. The system of claim 2, wherein determining the inference comprises comparing the pattern with stored data, wherein the stored data is associated with prior touch events of the external surface.

6. The system of claim 1, wherein determining the inference comprises using the feature information to determine that the touch event is associated with one selected from the group consisting of a bare human digit, a wet human digit, a dry human digit, and a gloved human digit.

7. The system of claim 1, wherein the feature information includes a magnitude of the energy signal and/or a variation of the energy signal, and wherein determining the inference comprises:
   comparing at least one selected from (a) the magnitude and (b) the variation to a respective threshold to determine whether the touch event is associated with a human digit or a water drop.

8. The system of claim 1, wherein determining the inference comprises using the feature information to determine one or more of a style of touch of the touch event, a touch intensity associated with the touch event, or a physical characteristic of the object.

9. The system of claim 8, wherein determining the inference further comprises identifying that the object is associated with one out of a plurality of users based on associating the touch event with one or more of the style of touch of the touch event, the touch intensity associated with the touch event, or the physical characteristic of the object.

10. The system of claim 8, wherein the physical characteristic of the object is a measurement associated with a portion of a fingerprint contacting the external surface.

11. The system of claim 1, wherein the one or more data processors are further configured to:
   determine an additional signal associated with an additional sensor associated with the ultrasound input device, wherein determining the inference further comprises using the additional signal.

12. The system of claim 1, wherein the energy signal is representative of an energy of the set of reflected ultrasound signals occurring within an energy measurement window, and wherein determining the energy signal comprises determining the energy signal by integrating reflected ultrasound signals of the set of reflected ultrasound signals occurring within the energy measurement window.

13. The system of claim 12, wherein at least one of the one or more data processors includes a summation circuit or an integration circuit, wherein the summation circuit or the integration circuit is configured to:
generate, based on the set of reflected ultrasound signals, the energy signal comprising the energy measurements over time, wherein each energy measurement is the summed value of the set of reflected ultrasound signals within the energy measurement window.

14. A computer-implemented method, comprising:
transmitting an emitted signal using an ultrasound input device coupled to a material layer having an external surface located opposite the material layer from the ultrasound input device, wherein the emitted signal passes through the material layer towards the external surface;
receiving a set of reflected ultrasound signals associated with the emitted signal, wherein the set of reflected ultrasound signals comprises at least one reflected ultrasound signal, and wherein the set of reflected ultrasound signals is associated with a touch event between an object and the external surface of the material layer;
determining an energy signal comprising energy measurements over time, each energy measurement corresponding to a summed value derived from a portion of the set of reflected ultrasound signals;
extracting feature information associated with the energy signal;
determining an inference associated with the object based on the extracted feature information; and
generating an output signal associated with the determined inference.

15. The method of claim 14, wherein extracting the feature information comprises identifying a pattern in the energy signal associated with a dip in the energy measurements that is associated with the touch event.

16. The method of claim 15, wherein identifying the pattern comprises identifying one or more of a depth of the dip, a duration of the dip, a presence of a subsequent dip after the dip, a delay between the dip and another dip, and a velocity of change in the energy signal at an edge of the dip.

17. The method of claim 15, wherein identifying the pattern comprises identifying a change in the energy signal attributable to a temperature shift in the material layer, and wherein determining the inference comprises estimating a relative temperature of the object based on the identified change in the energy signal attributable to the temperature shift in the material layer.

18. The method of claim 15, wherein determining the inference comprises comparing the pattern with stored data, wherein the stored data is associated with prior touch events of the external surface.

19. The method of claim 14, wherein determining the inference comprises using the feature information to determine that the touch event is associated with one selected from the group consisting of a bare human digit, a wet human digit, a dry human digit, and a gloved human digit.

20. The method of claim 14, wherein determining the inference comprises using the feature information to determine one or more of a style of touch of the touch event, a touch intensity associated with the touch event, or a physical characteristic of the object.

21. The method of claim 20, wherein determining the inference further comprises identifying that the object is associated with one out of a plurality of users based on associating the touch event with one or more of the style of touch of the touch event, the touch intensity associated with the touch event, or the physical characteristic of the object.

22. The method of claim 14, further comprising determining an additional signal associated with an additional sensor associated with the ultrasound input device, wherein determining the inference further comprises using the additional signal.

23. A computer-program product tangibly embodied in a non-transitory machine-readable storage medium, including instructions configured to cause a data processing apparatus to perform operations including:
transmitting an emitted signal using an ultrasound input device coupled to a material layer having an external surface located opposite the material layer from the ultrasound input device, wherein the emitted signal passes through the material layer towards the external surface;
receiving a set of reflected ultrasound signals associated with the emitted signal, wherein the set of reflected ultrasound signals comprises at least one reflected ultrasound signal, and wherein the set of reflected ultrasound signals is associated with a touch event between an object and the external surface of the material layer;
determining an energy signal comprising energy measurements over time, each energy measurement corresponding to a summed value derived from a portion of the set of reflected ultrasound signals;
extracting feature information associated with the energy signal;
determining an inference associated with the object based on the extracted feature information; and
generating an output signal associated with the determined inference.

24. The computer-program product of claim 23, wherein extracting the feature information comprises identifying a pattern in the energy signal associated with a dip in the energy measurements that is associated with the touch event.

25. The computer-program product of claim 24, wherein identifying the pattern comprises identifying one or more of a depth of the dip, a duration of the dip, a presence of a subsequent dip after the dip, a delay between the dip and another dip, and a velocity of change in the energy signal at an edge of the dip.

26. The computer-program product of claim 24, wherein identifying the pattern comprises identifying a change in the energy signal attributable to a temperature shift in the material layer, and wherein determining the inference comprises estimating a relative temperature of the object based on the identified change in the energy signal attributable to the temperature shift in the material layer.

27. The computer-program product of claim 24, wherein determining the inference comprises comparing the pattern with stored data, wherein the stored data is associated with prior touch events of the external surface.

28. The computer-program product of claim 23, wherein determining the inference comprises using the feature information to determine that the touch event is associated with one selected from the group consisting of a bare human digit, a wet human digit, a dry human digit, and a gloved human digit.

29. The computer-program product of claim 23, wherein determining the inference comprises using the feature information to determine one or more of a style of touch of the touch event, a touch intensity associated with the touch event, or a physical characteristic of the object.

30. The computer-program product of claim 29, wherein determining the inference further comprises identifying that the object is associated with one out of a plurality of users based on associating the touch event with one or more of the style of touch of the touch event, the touch intensity associated with the touch event, or the physical characteristic of the object.

* * * * *